(12) United States Patent
Cousin et al.

(10) Patent No.: US 12,448,367 B2
(45) Date of Patent: Oct. 21, 2025

(54) PHTHALAZINE DERIVATIVES AS PYRUVATE KINASE MODULATORS

(71) Applicant: Sitryx Therapeutics Limited, Oxford (GB)

(72) Inventors: David Cousin, Nottingham (GB); Oscar Barba, Oxford (GB)

(73) Assignee: Sitryx Therapeutics Limited, Oxford (GB)

(*) Notice: Subject to any disclaimer, the term of this patent is extended or adjusted under 35 U.S.C. 154(b) by 0 days.

(21) Appl. No.: 19/058,521

(22) Filed: Feb. 20, 2025

(65) Prior Publication Data

US 2025/0230143 A1 Jul. 17, 2025

Related U.S. Application Data

(63) Continuation of application No. PCT/GB2023/052875, filed on Nov. 3, 2023.

(30) Foreign Application Priority Data

Nov. 4, 2022 (WO) ................ PCT/GB2022/052781

(51) Int. Cl.
| | | |
|---|---|---|
| *C07D 401/14* | (2006.01) | |
| *A61K 31/502* | (2006.01) | |
| *C07D 403/14* | (2006.01) | |
| *C07D 491/048* | (2006.01) | |
| *C07D 498/04* | (2006.01) | |

(52) U.S. Cl.
CPC .......... *C07D 401/14* (2013.01); *A61K 31/502* (2013.01); *C07D 403/14* (2013.01); *C07D 491/048* (2013.01); *C07D 498/04* (2013.01)

(58) Field of Classification Search
CPC ............................ C07D 401/14; C07D 403/14; C07D 491/048; C07D 498/04
See application file for complete search history.

(56) References Cited

U.S. PATENT DOCUMENTS

2024/0409542 A1 12/2024 Cousin
2025/0051313 A1 2/2025 Cousin

FOREIGN PATENT DOCUMENTS

| | | |
|---|---|---|
| CN | 103833646 A | 6/2014 |
| CN | 112156095 A | 1/2021 |
| WO | 2006138475 A2 | 12/2006 |
| WO | 2010042867 A2 | 4/2010 |
| WO | 2013005157 | 1/2013 |
| WO | 2020167976 A1 | 8/2020 |
| WO | 2021018951 A1 | 2/2021 |
| WO | 2022020424 A1 | 1/2022 |
| WO | 2023052783 A1 | 4/2023 |
| WO | 2023079294 A1 | 5/2023 |
| WO | 2023118875 A1 | 6/2023 |

OTHER PUBLICATIONS

Xin Minhang et al., Journal of Heterocyclic Chemistry, vol. 50, No. 1, pp. 169-174, Jan. 1, 2013.
Vela, Noemi et al., European Journal of Medicinal Chemistry, 97, (2015) 462-482, Nov. 25, 201.
Teran, Carmen et al., European Journal of Medicinal Chemistry, 161, (2019) 468-478, Oct. 25, 2019.
Guo, Chuangxing et al., Bioorganic and Medicinal Chemistry Letters, 23, (2013), 3358-3363, Apr. 1, 2013.
PubChem https://pubchem.ncbi.nlm.nih.gov/compound/142933162, Dec. 7, 2019.
International Search Report mailed on Mar. 11, 2024 for International Application No. PCT/GB2023/052875.
David Cousin et al., U.S. Appl. No. 18/707,418, filed May 3, 2024.

*Primary Examiner* — Brian E Mcdowell
(74) *Attorney, Agent, or Firm* — Faegre Drinker Biddle & Reath LLP

(57) ABSTRACT

The invention relates to a compound of formula (Ia):

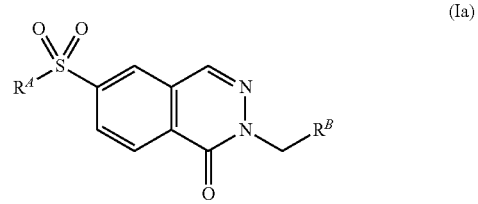

and related aspects.

26 Claims, No Drawings

PHTHALAZINE DERIVATIVES AS PYRUVATE KINASE MODULATORS

CROSS-REFERENCE TO RELATED APPLICATIONS

The present application is a Continuation Application of International Application No. PCT/GB2023/052875, filed Nov. 3, 2023, and claims benefit of International Application No. PCT/GB2022/052781.8 filed Nov. 4, 2022, each of which are incorporated by reference in its entirety.

FIELD OF THE INVENTION

The present invention relates to compounds and their use in treating or preventing an inflammatory disease, a disease associated with an undesirable immune response, cancer, obesity, a diabetic disease or a blood disorder, and to related compositions, methods and intermediate compounds.

BACKGROUND OF THE INVENTION

Pyruvate kinase (PK) is the enzyme responsible for the final rate-limiting step of glycolysis, catalyzing phosphoenolpyruvic acid (PEP) and ADP to pyruvate and ATP. Four PK isoforms exist in mammals from two separate genes (Alves-Filho et al., 2016). PKL and PKR, products of the Pklr gene, are expressed in the liver and red blood cells, respectively. PKM1 and 2 are alternatively spliced products of the Pkm gene. PKM1 is expressed in tissues with high energy demands such as heart, muscle, and brain, and PKM2 is expressed in embryonic tissues, cancer and normal proliferating cells such as lymphocytes and intestinal epithelial cells. Whereas PKM1 is a constitutively active enzyme, PKM2 is a low-activity enzyme that relies on allosteric activation by multiple endogenous regulators, for example, the upstream glycolytic intermediate, fructose-1,6-bisphosphate (FBP). Binding of these allosteric regulators induces conformational changes that promote tetramerization of PKM2 leading to an increase in the last rate-limiting step of glycolysis. Pyruvate will enter the TCA cycle in the mitochondria where it is used to generate ATP through oxidative phosphorylation. Without allosteric activation PKM2 takes on a dimeric or monomeric form with low enzymatic activity, leading to accumulation of glycolytic intermediates which meet the requirements for biosynthetic precursors of the activated or proliferating cell. Dimeric PKM2 can also translocate to the nucleus where it can further promote aerobic glycolysis and regulate transcriptional activity, acting as a protein kinase to target transcription factors and histones.

Cancer cells primarily use glycolysis to generate cellular energy and biosynthesis intermediates, termed the Warburg effect and PKM2 plays a dominant role in glycolysis to achieve the nutrient demands of cancer cell proliferation (Chhipa et al., 2018). PKM2 is overexpressed in almost all cancers and has been shown to promote proliferation and metastasis of tumour cells. In addition to controlling glycolytic flux, the non-metabolic role of PKM2 as a coactivator and protein kinase contribute to tumorigenesis (Dong et al., 2016). PKM2 binds directly to and phosphorylates histone H3 leading to expression of c-Myc and Cyclin D1 and the proliferation of cancer cells. Activation of PKM2 tetramer by small molecules could be an attractive therapy in cancer to contain tumour growth by preventing the non-metabolic functions of dimeric PKM2.

Following activation or an inflammatory stimulus, PKM2 is upregulated in many immune cells including macrophages and T cells (Palsson-McDermott et al., 2020). The non-metabolic roles of dimeric PKM2 have been shown to regulate immune responses: PKM2 acts as a transcriptional coactivator of Hif-1α, b-catenin and STAT3 leading to expression of pro-inflammatory cytokines such as IL-1β and TNFα. Activation of PKM2 by small molecules to prevent nuclear translocation could have therapeutic benefit in a range of inflammatory and auto-immune conditions, such as rheumatoid arthritis, inflammatory bowel diseases, inflammatory skin pathologies, coronary artery disease and multiple sclerosis.

In diabetes, PKM2 regulates glucose responsive pancreatic beta-cell function and protects from metabolic stress (Abulizi et al., 2020; Lewandowski et al., 2020). Dimeric PKM2 plays a role in aberrant glycolysis by promoting the accumulation of HIF-1a, and in diabetic nephropathy PKM2 is associated with a pathogenic role in glomerular injury and epithelial-to-mesenchymal transition leading to fibrosis (Liu et al., 2020). PKM2 activation has been shown to amplify insulin release and improve insulin sensitivity and protect against progression of diabetic glomerular pathology and kidney fibrosis (Liu et al., 2020; Abulizi et al., 2020; Lewandowski et al., 2020; Qi et al., 2017).

Obesity is defined as abnormal or excessive fat accumulation that presents a risk to health, and is linked to a higher incidence of type 2 diabetes and cardiovascular disease. This metabolic disorder is strongly associated with insulin resistance and the adverse impact on glucose metabolism and disposal in obese subjects (Barazzoni et al., 2018). Studies on 3T3-L1 adipocytes exposed to varying levels of insulin resulted in significant increases in PKM2 mRNA levels, independent of the levels of glucose in the media (Puckett et al., 2021). Work on the impact of altered PKM2 phosphorylation status and resulting decreased catalytic activity, has identified PKM2 as a potential contributor to insulin resistance in the adipose tissue and made an association with metabolic status in humans (Bettaieb et al., 2013). Restoring PKM2 activity with a small molecule allosteric activator has been shown to improve insulin sensitivity (Abulizi et al. 2020; Lewandowski et al. 2020) and warrants further investigation as a novel target for pharmacological intervention in obesity.

Pyruvate kinase deficiency (PKD) is one of the most common enzyme defects in erythrocytes, that presents as hemolytic anemia, the accelerated destruction of red blood cells (Bianchi et al., 2020). Mature red blood cells depend entirely on glycolysis for maintaining cell integrity and function, and so pyruvate kinase plays a crucial role in erythrocyte metabolism and survival. The inherited mutations in PKR enzymes lead to dysregulation of its catalytic activity and cause a deficit in cellular energy within the red blood cell, as evidenced by lower pyruvate kinase enzyme activity, a decline in ATP levels and a build-up of upstream metabolites. PKR decreased activity has also been linked to changes in the erythrocytes morphology and cell membrane surface suggesting a wider involvement of this enzyme in the entire lifespan of these cells (Cangado et al., 2018). PK-deficient erythrocytes are prematurely removed from the circulation by the spleen through accelerated hemolysis leading to iron accumulation. Increase and/or restoration of PKR activity to quasi-basal levels is thought to have potential to treat the PK deficiency-related complications. The current standard of care for PKD is supportive, including blood transfusions, splenectomy, chelation therapy to address iron overload and/or interventions for other treatment- and disease-related morbidities. There is no approved therapy to treat the underlying cause of PK deficiency. Activation of the PKR enzyme with a small molecule allosteric activator increases PK enzyme activity and enhanced glycolysis in erythrocytes from patients with PK deficiency (Kung et al., 2017).

Pharmacological intervention by using small molecules agonists such as TEPP-46 and DASA-58 have been utilised extensively in vitro and in vivo biological settings to demonstrate the several potential benefits provided by augmenting PK activity through allosteric modulation (Yi et al., 2021). Although these compounds show a good level of in vitro activity, their ADME and pharmacokinetic/pharmacodynamic profiles have prevented them from being developed for the treatment of human disease. The structure of TEPP-46 is as follows:

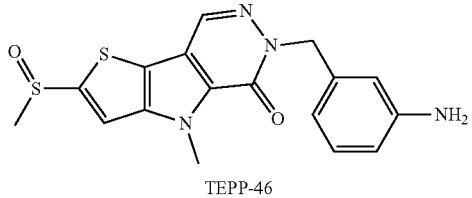

TEPP-46

The most advanced PK activator being extensively studied in clinical settings is Mitapivat (AG-348), a PKM2 and PKLR activator being investigated for the treatment of several blood disorders arising from PK mutant forms that exhibit lower catalytic activity than corresponding wild type red blood cells (Kung et al., 2017). This agent has shown an adequate level of efficacy when dosed in patients presenting PK deficiency by increasing basal haemoglobin levels. However, despite the promising results, the high dosing regimen and the BID (two times a day) dosing frequency needed to achieve efficacy have highlighted the need to develop more efficacious compounds with a more favourable pharmacokinetic and improved safety profile (Grace et al., 2019). The structure of mitapivat is as follows:

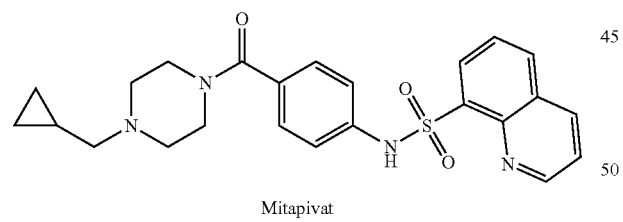

Mitapivat

WO2020/167976A1 (Agios Pharmaceuticals, Inc.) describes compounds that are said to regulate PK activity, for the treatment of cancer, obesity and diabetes related disorders. WO2023/052783, WO2023/079294 and WO2023/118875 (Sitryx Therapeutics Limited) disclose compounds which are PK modulators.

There remains a need to identify and develop new disease modifying PK modulators to meet several unmet medical needs linked to PK dysfunction, in particular the need to develop compounds that demonstrate suitable activity while also having favourable physical-chemical parameters. The compounds herein described as PK modulators, in particular PKM2 and/or PKLR modulators, in particular PKM2 and/or PKLR activators, address the aforementioned unmet needs by exhibiting suitable affinity and functional activity for PK enzymes, in particular PKM2 and/or PKLR, improved cellular pyruvate kinase activity compared with mitapivat, while having better overall physical/chemical properties with improved ADME and PK profiles making them suitable for the treatment of human diseases linked to an altered function of pyruvate kinase enzymes expression and/or activity.

SUMMARY OF THE INVENTION

The present invention provides a compound of formula (Ia):

(Ia)

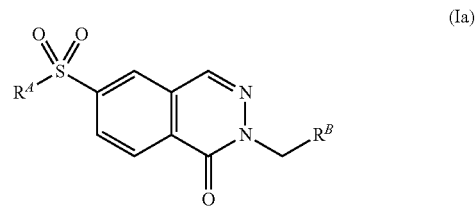

wherein:

(a) $R^A$ is pyrazolyl and $R^B$ is pyridinyl substituted by one OMe group to give 6-((1H-pyrazol-4-yl)sulfonyl)-2-((5-methoxypyridin-2-yl)methyl)phthalazin-1(2H)-one

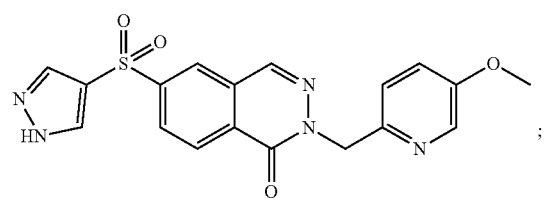 [SMILES: COc1ccc(Cn2ncc3cc(S(=O)(=O)c4cn[nH]c4)ccc3c2=O)nc1]

;

(b) $R^A$ is pyrazolyl substituted by $CHF_2$ and $R^B$ is pyrazolyl to give 2-((1H-pyrazol-3-yl)methyl)-6-((1-(difluoromethyl)-1H-pyrazol-4-yl)sulfonyl)phthalazin-1(2H)-one

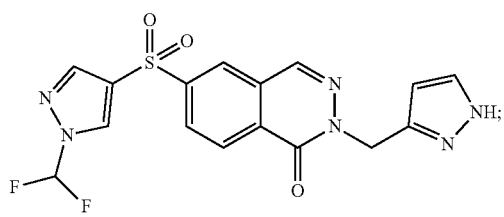

;

(c) $R^A$ is pyrazolyl substituted by $CH_2CH_2OH$ and $R^B$ is dihydrofuro[3,2-b]pyridinyl to give 2-((2,3-dihydrofuro[3,2-b]pyridin-5-yl)methyl)-6-((1-(2-hydroxyethyl)-1H-pyrazol-4-yl)sulfonyl)phthalazin-1(2H)-one

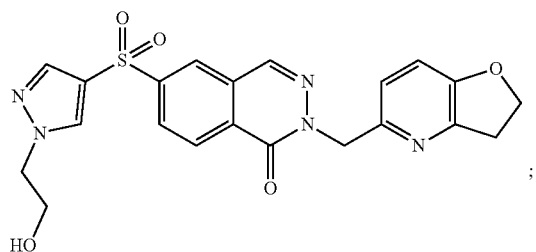

(d) $R^A$ is pyrazolyl and $R^B$ is 2,3-dihydropyrazolo[5,1-b]oxazolyl to give 6-((1H-pyrazol-4-yl)sulfonyl)-2-((2,3-dihydropyrazolo[5,1-b]oxazol-6-yl)methyl)phthalazin-1 (2H)-one

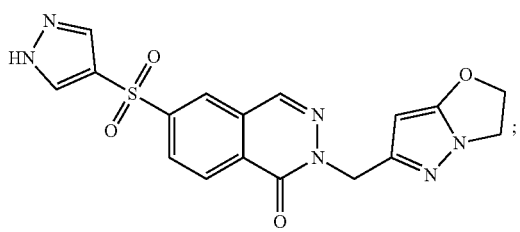

(e) $R^A$ is pyrazolyl substituted by methyl and $R^B$ is 2,3-dihydropyrazolo[5,1-b]oxazolyl to give 2-((2,3-dihydropyrazolo[5,1-b]oxazol-6-yl)methyl)-6-((1-methyl-1H-pyrazol-4-yl)sulfonyl)phthalazin-1(2H)-one

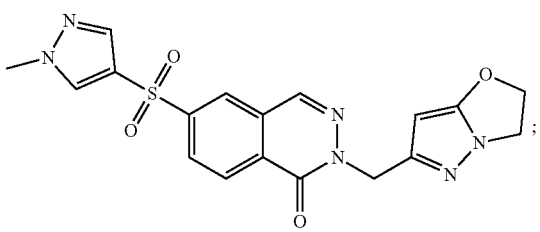 [SMILES: Cn1cc(S(=O)(=O)c2ccc3c(=O)n(Cc4cc5n(n4)CCO5)ncc3c2)cn1]

or (f) $R^A$ is pyrazolyl and $R^B$ is pyrazolyl substituted by one Cl and one methyl to give 6-((1H-pyrazol-3-yl)sulfonyl)-2-((4-chloro-5-methyl-1H-pyrazol-3-yl)methyl)phthalazin-1(2H)-one

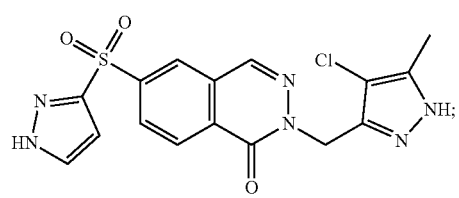

or a salt and/or solvate thereof.

DETAILED DESCRIPTION OF THE INVENTION

In one embodiment, there is provided 6-((1H-pyrazol-4-yl)sulfonyl)-2-((5-methoxypyridin-2-yl)methyl)phthalazin-1(2H)-one

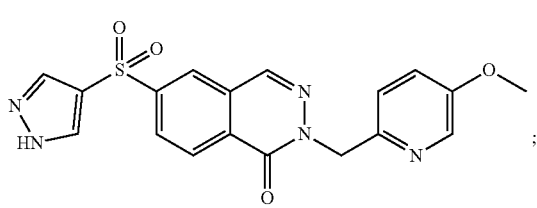 [SMILES: COc1ccc(Cn2ncc3cc(S(=O)(=O)c4cn[nH]c4)ccc3c2=O)nc1]

or a salt and/or solvate thereof.

In another embodiment, there is provided 6-((1H-pyrazol-4-yl)sulfonyl)-2-((5-methoxypyridin-2-yl)methyl)phthalazin-1(2H)-one

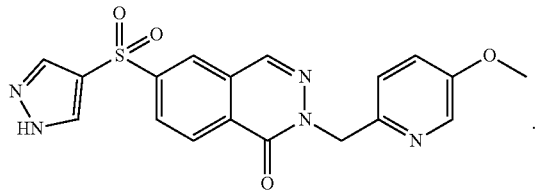 [SMILES: COc1ccc(Cn2ncc3cc(S(=O)(=O)c4cn[nH]c4)ccc3c2=O)nc1]

In another embodiment, there is provided a salt, such as a pharmaceutically acceptable salt, of 6-((1H-pyrazol-4-yl)sulfonyl)-2-((5-methoxypyridin-2-yl)methyl)phthalazin-1(2H)-one

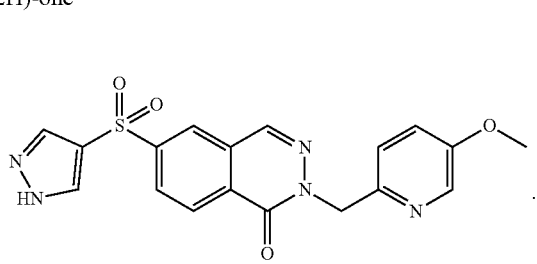

In one embodiment, there is provided 2-((1H-pyrazol-3-yl)methyl)-6-((1-(difluoromethyl)-1H-pyrazol-4-yl)sulfonyl)phthalazin-1(2H)-one

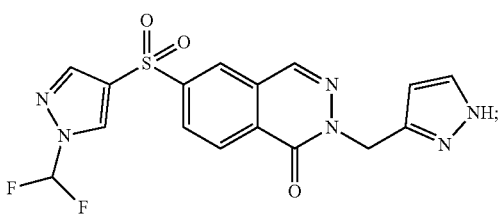

or a salt and/or solvate thereof.

In another embodiment, there is provided 2-((1H-pyrazol-3-yl)methyl)-6-((1-(difluoromethyl)-1H-pyrazol-4-yl)sulfonyl)phthalazin-1(2H)-one

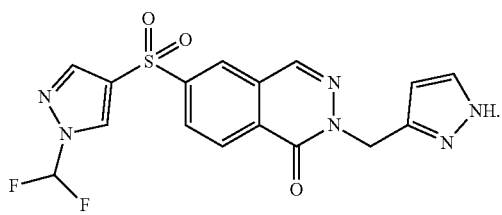

In another embodiment, there is provided a salt, such as a pharmaceutically acceptable salt, of 2-((1H-pyrazol-3-yl)methyl)-6-((1-(difluoromethyl)-1H-pyrazol-4-yl)sulfonyl)phthalazin-1(2H)-one

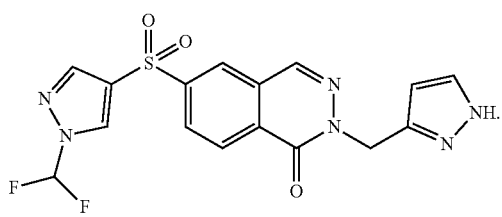

In one embodiment, there is provided 2-((2,3-dihydrofuro[3,2-b]pyridin-5-yl)methyl)-6-((1-(2-hydroxyethyl)-1H-pyrazol-4-yl)sulfonyl)phthalazin-1(2H)-one

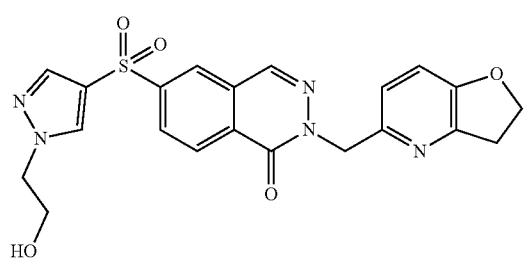

or a salt and/or solvate thereof.

In another embodiment, there is provided 2-((2,3-dihydrofuro[3,2-b]pyridin-5-yl)methyl)-6-((1-(2-hydroxyethyl)-1H-pyrazol-4-yl)sulfonyl)phthalazin-1(2H)-one

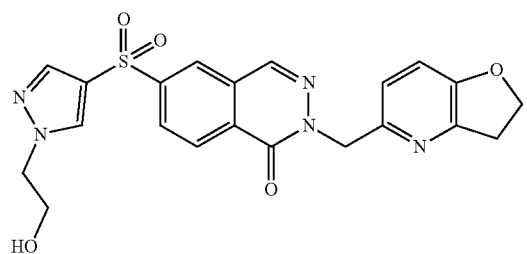

In another embodiment, there is provided a salt, such as a pharmaceutically acceptable salt, of 2-((2,3-dihydrofuro[3,2-b]pyridin-5-yl)methyl)-6-((1-(2-hydroxyethyl)-1H-pyrazol-4-yl)sulfonyl)phthalazin-1(2H)-one

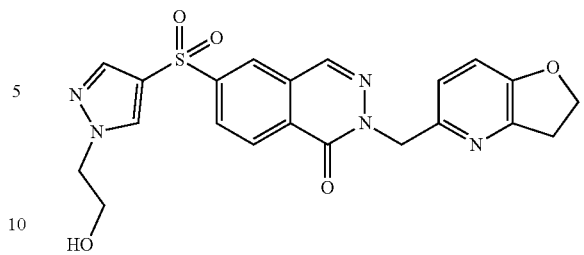

In one embodiment, there is provided 6-((1H-pyrazol-4-yl)sulfonyl)-2-((2,3-dihydropyrazolo[5,1-b]oxazol-6-yl)methyl)phthalazin-1 (2H)-one

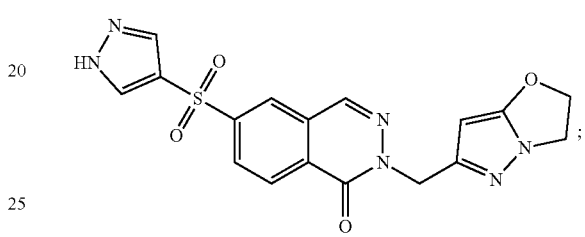

or a salt and/or solvate thereof.

In another embodiment, there is provided 6-((1H-pyrazol-4-yl)sulfonyl)-2-((2,3-dihydropyrazolo[5,1-b]oxazol-6-yl)methyl)phthalazin-1 (2H)-one

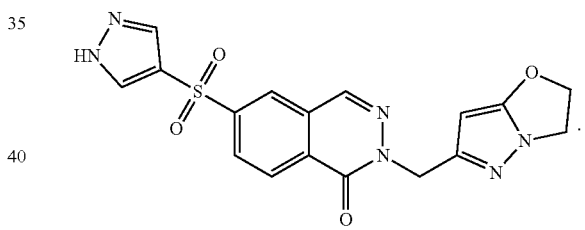

In another embodiment, there is provided a salt, such as a pharmaceutically acceptable salt, of 6-((1H-pyrazol-4-yl)sulfonyl)-2-((2,3-dihydropyrazolo[5,1-b]oxazol-6-yl)methyl)phthalazin-1(2H)-one

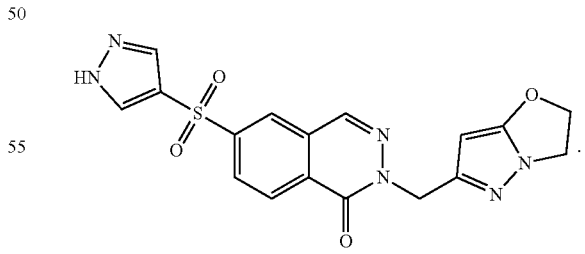

In one embodiment, there is provided 2-((2,3-dihydropyrazolo[5,1-b]oxazol-6-yl)methyl)-6-((1-methyl-1H-pyrazol-4-yl)sulfonyl)phthalazin-1(2H)-one

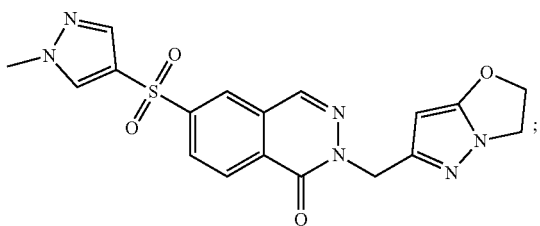 [SMILES: Cn1cc(S(=O)(=O)c2ccc3c(=O)n(Cc4cc5n(n4)CCO5)ncc3c2)cn1]

or a salt and/or solvate thereof.

In another embodiment, there is provided 2-((2,3-dihydropyrazolo[5,1-b]oxazol-6-yl)methyl)-6-((1-methyl-1H-pyrazol-4-yl)sulfonyl)phthalazin-1(2H)-one

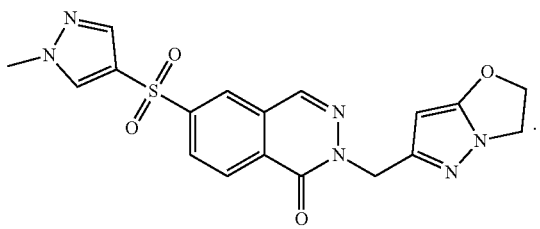 [SMILES: Cn1cc(S(=O)(=O)c2ccc3c(=O)n(Cc4cc5n(n4)CCO5)ncc3c2)cn1]

In another embodiment, there is provided a salt, such as a pharmaceutically acceptable salt, of 2-((2,3-dihydropyrazolo[5,1-b]oxazol-6-yl)methyl)-6-((1-methyl-1H-pyrazol-4-yl)sulfonyl)phthalazin-1(2H)-one

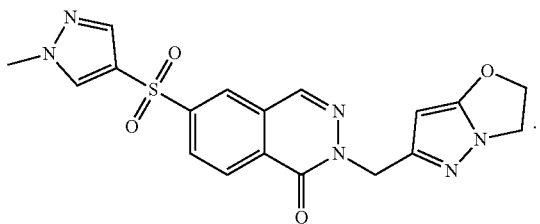 [SMILES: Cn1cc(S(=O)(=O)c2ccc3c(=O)n(Cc4cc5n(n4)CCO5)ncc3c2)cn1]

In one embodiment, there is provided 6-((1H-pyrazol-3-yl)sulfonyl)-2-((4-chloro-5-methyl-1H-pyrazol-3-yl)methyl)phthalazin-1(2H)-one

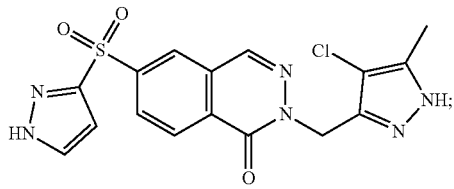

or a salt and/or solvate thereof.

In another embodiment, there is provided 6-((1H-pyrazol-3-yl)sulfonyl)-2-((4-chloro-5-methyl-1H-pyrazol-3-yl)methyl)phthalazin-1(2H)-one

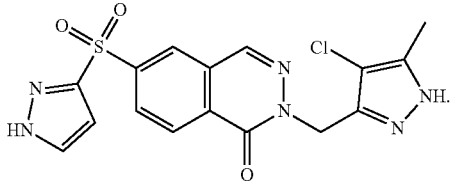 [SMILES: Cc1[nH]nc(Cn2ncc3cc(S(=O)(=O)c4cc[nH]n4)ccc3c2=O)c1Cl]

In another embodiment, there is provided a salt, such as a pharmaceutically acceptable salt, of 6-((1H-pyrazol-3-yl)sulfonyl)-2-((4-chloro-5-methyl-1H-pyrazol-3-yl)methyl)phthalazin-1(2H)-one

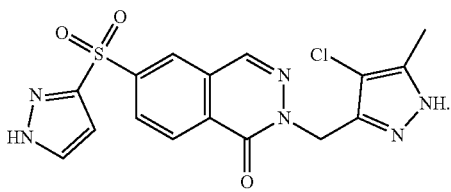

Thus the invention provides a compound which is selected from the group consisting of:
6-((1H-pyrazol-4-yl)sulfonyl)-2-((5-methoxypyridin-2-yl)methyl)phthalazin-1(2H)-one;
2-((1H-pyrazol-3-yl)methyl)-6-((1-(difluoromethyl)-1H-pyrazol-4-yl)sulfonyl)phthalazin-1(2H)-one;
2-((2,3-dihydrofuro[3,2-b]pyridin-5-yl)methyl)-6-((1-(2-hydroxyethyl)-1H-pyrazol-4-yl)sulfonyl)phthalazin-1(2H)-one;
6-((1H-pyrazol-4-yl)sulfonyl)-2-((2,3-dihydropyrazolo[5,1-b]oxazol-6-yl)methyl)phthalazin-1 (2H)-one;
2-((2,3-dihydropyrazolo[5,1-b]oxazol-6-yl)methyl)-6-((1-methyl-1H-pyrazol-4-yl)sulfonyl)phthalazin-1(2H)-one;
6-((1H-pyrazol-3-yl)sulfonyl)-2-((4-chloro-5-methyl-1H-pyrazol-3-yl)methyl)phthalazin-1(2H)-one;
or a salt and/or solvate thereof.

The compounds of formula (Ia) may be prepared as set out in the Examples section below.

The invention provides a compound which is selected from the group consisting of:
2-((5-methoxypyridin-2-yl)methyl)-6-((1-(tetrahydro-2H-pyran-2-yl)-1H-pyrazol-4-yl)thio)phthalazin-1(2H)-one;
6-((1-(difluoromethyl)-1H-pyrazol-4-yl)thio)-2-((1-(tetrahydro-2H-pyran-2-yl)-1H-pyrazol-3-yl)methyl)phthalazin-1(2H)-one;
6-((1-(2-((tert-butydimethylsilyl)oxy)ethyl)-1H-pyrazol-4-yl)thio)-2-((2,3-dihydrofuro[3,2-b]pyridin-5-yl)methyl)phthalazin-1(2H)-one;
2-((2,3-dihydropyrazolo[5,1-b]oxazol-6-yl)methyl)-6-((1-(tetrahydro-2H-pyran-2-yl)-1H-pyrazol-4-yl)thio)phthalazin-1(2H)-one;
2-((2,3-dihydropyrazolo[5,1-b]oxazol-6-yl)methyl)-6-((1-methyl-1H-pyrazol-4-yl)thio)phthalazin-1(2H)-one; and
2-((4-chloro-5-methyl-1H-pyrazol-3-yl)methyl)-6-((1-(tetrahydro-2H-pyran-2-yl)-1H-pyrazol-3-yl)sulfonyl)phthalazin-1(2H)-one;
or a salt and/or solvate thereof.

The present invention provides a process for the preparation of the compounds of formula (Ia) which comprises oxidising a compound of formula (IIa):

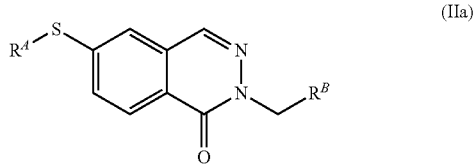

or a salt and/or solvate thereof;
using an oxidising agent such as Oxone;
wherein $R^A$ and $R^B$ are defined elsewhere herein.

Suitably, the compound of formula (IIa) is selected from the group consisting of:

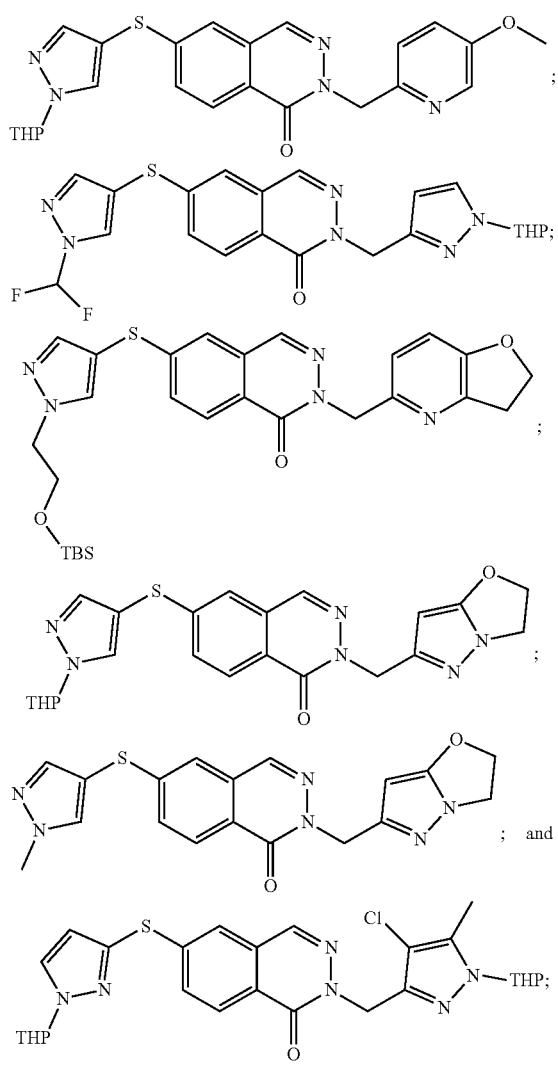

or a salt and/or solvate thereof.

It will be appreciated that for use in therapy the salts of the compounds of formula (Ia) should be pharmaceutically acceptable. Suitable pharmaceutically acceptable salts will be apparent to those skilled in the art. Pharmaceutically acceptable salts include acid addition salts, suitably salts of compounds of the invention comprising a basic group such as an amino group, formed with inorganic acids, e.g., hydrochloric acid, hydrobromic acid, sulfuric acid, nitric acid or phosphoric acid. Also included are salts formed with organic acids, e.g., succinic acid, maleic acid, acetic acid, fumaric acid, citric acid, tartaric acid, benzoic acid, p-toluenesulfonic acid, methanesulfonic acid, naphthalenesulfonic acid and 1,5-naphthalenedisulfonic acid. Other salts, e.g., oxalates or formates, may be used, for example in the isolation of compounds of formula (Ia) and are included within the scope of this invention, as are basic addition salts such as sodium, potassium, calcium, aluminium, zinc, magnesium and other metal salts.

Pharmaceutically acceptable salts may also be formed with organic bases such as basic amines, e.g., with ammonia, meglumine, tromethamine, piperazine, arginine, choline, diethylamine, benzathine or lysine. Thus, in one embodiment there is provided a compound of formula (Ia) in the form of a pharmaceutically acceptable salt. Alternatively, there is provided a compound of formula (Ia) in the form of a free acid. When the compound contains a basic group as well as the free acid it may be zwitterionic.

Suitably, the compound of formula (Ia) is not a salt, e.g., is not a pharmaceutically acceptable salt.

Suitably, the compound of formula (Ia) or a salt and/or solvate thereof is a pharmaceutically acceptable salt of the compound of formula (Ia).

Alternatively, the compound of formula (Ia) or a salt and/or solvate thereof is the compound of formula (Ia).

Suitably, where the compound of formula (Ia) is in the form of a salt, the pharmaceutically acceptable salt is an acid addition salt such as an ammonium salt (e.g. formed with an inorganic acid such as HCl).

The compounds of formula (Ia) may be prepared in crystalline or non-crystalline form and, if crystalline, may optionally be solvated, e.g., as the hydrate. This invention includes within its scope stoichiometric solvates (e.g., hydrates) as well as compounds containing variable amounts of solvent (e.g., water). Suitably, the compound of formula (Ia) is not a solvate.

The invention extends to a pharmaceutically acceptable derivative thereof, such as a pharmaceutically acceptable prodrug of compounds of formula (Ia). Typical prodrugs of compounds of formula (Ia) which comprise a carboxylic acid include ester (e.g. $C_{1-6}$ alkyl e.g. $C_{1-4}$ alkyl ester) derivatives thereof. Thus, in one embodiment, the compound of formula (Ia) is provided as a pharmaceutically acceptable prodrug. In another embodiment, the compound of formula (Ia) is not provided as a pharmaceutically acceptable prodrug.

It is to be understood that the present invention encompasses all isomers of compounds of formula (Ia) including all geometric, tautomeric and optical forms, and mixtures thereof (e.g. racemic mixtures). In particular, the invention extends to all tautomeric forms of the compounds of formula (Ia). Where additional chiral centres are present in compounds of formula (Ia), the present invention includes within its scope all possible diastereoisomers, including mixtures thereof. The different isomeric forms may be separated or resolved one from the other by conventional methods, or any given isomer may be obtained by conventional synthetic methods or by stereospecific or asymmetric syntheses.

The present invention also includes all isotopic forms of the compounds provided herein, whether in a form (i) wherein all atoms of a given atomic number have a mass number (or mixture of mass numbers) which predominates in nature (referred to herein as the "natural isotopic form") or (ii) wherein one or more atoms are replaced by atoms having the same atomic number, but a mass number different from the mass number of atoms which predominates in nature (referred to herein as an "unnatural variant isotopic form"). It is understood that an atom may naturally exist as a mixture of mass numbers. The term "unnatural variant isotopic form" also includes embodiments in which the proportion of an atom of given atomic number having a mass number found less commonly in nature (referred to herein as an "uncommon isotope") has been increased relative to that which is naturally occurring e.g. to the level of >20%, >50%, >75%, >90%, >95% or >99% by number of the atoms of that atomic number (the latter embodiment referred to as an "isotopically enriched variant form"). The term "unnatural variant isotopic form" also includes embodiments in which the proportion of an uncommon isotope has been reduced relative to that which is naturally occurring. Isotopic forms may include radioactive forms (i.e. they incorporate radioisotopes) and non-radioactive forms. Radioactive forms will typically be isotopically enriched variant forms.

An unnatural variant isotopic form of a compound may thus contain one or more artificial or uncommon isotopes such as deuterium ($^2$H or D), carbon-11 ($^{11}$C), carbon-13 ($^{13}$C), carbon-14 ($^{14}$C), nitrogen-13 ($^{13}$N), nitrogen-15 ($^{15}$N), oxygen-15 ($^{15}$O), oxygen-17 ($^{17}$O), oxygen-18 ($^{18}$O), phosphorus-32 ($^{32}$P), sulphur-35 ($^{35}$S), chlorine-36 ($^{36}$Cl), chlorine-37 ($^{37}$Cl), fluorine-18 ($^{18}$F) iodine-123 ($^{123}$I), iodine-125 ($^{125}$I) in one or more atoms or may contain an increased proportion of said isotopes as compared with the proportion that predominates in nature in one or more atoms.

Unnatural variant isotopic forms comprising radioisotopes may, for example, be used for drug and/or substrate tissue distribution studies. The radioactive isotopes tritium, i.e. $^3$H, and carbon-14, i.e. $^{14}$C, are particularly useful for this purpose in view of their ease of incorporation and ready means of detection. Unnatural variant isotopic forms which incorporate deuterium i.e. $^2$H or D may afford certain therapeutic advantages resulting from greater metabolic stability, for example, increased in vivo half-life or reduced dosage requirements, and hence may be preferred in some circumstances. Further, unnatural variant isotopic forms may be prepared which incorporate positron emitting isotopes, such as $^{11}$C, $^{18}$F, $^{15}$O and $^{13}$N, and would be useful in positron emission topography (PET) studies for examining substrate receptor occupancy.

In one embodiment, the compounds of formula (Ia) are provided in a natural isotopic form. In one embodiment, the compounds of formula (Ia) are provided in an unnatural variant isotopic form. In a specific embodiment, the unnatural variant isotopic form is a form in which deuterium (i.e. $^2$H or D) is incorporated where hydrogen is specified in the chemical structure in one or more atoms of a compound of formula (Ia). In one embodiment, the atoms of the compounds of formula (Ia) are in an isotopic form which is not radioactive. In one embodiment, one or more atoms of the compounds of formula (Ia) are in an isotopic form which is radioactive. Suitably radioactive isotopes are stable isotopes. Suitably the unnatural variant isotopic form is a pharmaceutically acceptable form.

In one embodiment, a compound of formula (Ia) is provided whereby a single atom of the compound exists in an unnatural variant isotopic form. In another embodiment, a compound of formula (Ia) is provided whereby two or more atoms exist in an unnatural variant isotopic form.

Unnatural isotopic variant forms can generally be prepared by conventional techniques known to those skilled in the art or by processes described herein e.g. processes analogous to those described in the accompanying Examples for preparing natural isotopic forms. Thus, unnatural isotopic variant forms could be prepared by using appropriate isotopically variant (or labelled) reagents in place of the normal reagents employed in the Examples. Since the compounds of formula (Ia) are intended for use in pharmaceutical compositions it will readily be understood that they are each preferably provided in substantially pure form, for example at least 60% pure, more suitably at least 75% pure and preferably at least 85% pure, especially at least 98% pure (% are on a weight for weight basis). Impure preparations of the compounds may be used for preparing the purer forms used in the pharmaceutical compositions.

Therapeutic Indications

Compounds of formula (Ia) are of use in therapy, particularly for treating or preventing an inflammatory disease, a disease associated with an undesirable immune response, cancer, obesity, a diabetic disease or a blood disorder. As shown in Biological Example 1 below, Example compounds of formula (Ia) tested exhibited improved modulatory activity for PKM2 compared with mitapivat. As shown in Biological Example 2 below, Example compounds of formula (Ia) tested exhibited improved modulatory activity for PKLR, again using mitapivat as comparator. As shown in Biological Example 3 below, Example compounds of formula (Ia) tested also exhibited an in vitro anti-proliferative effect. As such, compounds of formula (Ia) are expected to be suitable for the treatment of diseases associated with PK, in particular PKM2 and PKLR activity.

Thus, in a first aspect, the present invention provides a compound of formula (Ia) or a pharmaceutically acceptable salt and/or solvate thereof as defined herein, for use as a medicament. Also provided is a pharmaceutical composition comprising a compound of formula (Ia) or a pharmaceutically acceptable salt and/or solvate thereof as defined herein. Such a pharmaceutical composition contains the compound of formula (Ia) and one or more pharmaceutically acceptable diluents or carriers. Suitably, the invention provides the pharmaceutical composition as defined above for use as a medicament. The following fallbacks to the use of the compound of formula (Ia) apply equally to the pharmaceutical composition defined herein which comprises a compound of formula (Ia) or a pharmaceutically acceptable salt and/or solvate thereof as defined herein.

In a further aspect, the present invention provides a compound of formula (Ia) or a pharmaceutically acceptable salt and/or solvate as defined herein, for use in treating or preventing a disease, disorder or condition associated with the function of PK, in particular PKM2 and/or PKLR. In a further aspect, the present invention provides the use of a compound of formula (Ia) or a pharmaceutically acceptable salt and/or solvate thereof as defined herein, in the manufacture of a medicament for treating or preventing a disease, disorder or condition associated with the function of PK, in particular PKM2 and/or PKLR. In a further aspect, the present invention provides a method of treating or preventing a disease, disorder or condition associated with the function of PK, in particular PKM2 and/or PKLR, which comprises administering a compound of formula (Ia) or a pharmaceutically acceptable salt and/or solvate thereof as defined herein.

In a further aspect, the present invention provides a compound of formula (Ia) or a pharmaceutically acceptable salt and/or solvate as defined herein, for use in treating or preventing a symptom associated with a disease, disorder or condition associated with the function of PK, in particular PKM2 and/or PKLR. In a further aspect, the present invention provides the use of a compound of formula (Ia) or a pharmaceutically acceptable salt and/or solvate thereof as defined herein, in the manufacture of a medicament for treating or preventing a symptom associated with a disease, disorder or condition associated with the function of PK, in particular PKM2 and/or PKLR. In a further aspect, the present invention provides a method of treating or preventing a symptom associated with a disease, disorder or condition associated with the function of PK, in particular PKM2 and/or PKLR, which comprises administering a compound of formula (Ia) or a pharmaceutically acceptable salt and/or solvate thereof as defined herein.

In one embodiment, a compound of formula (Ia) is a modulator of PKM2. In another embodiment, a compound of formula (Ia) is an activator of PKM2. In one embodiment, a compound of formula (Ia) is a modulator of PKLR. In another embodiment, a compound of formula (Ia) is an activator of PKLR. A compound is an "activator" of PK (e.g. PKM2 and/or PKLR) if it increases the activity of the enzyme, which can be quantified by, for example, determining the concentration of ATP generated in a suitable assay (such as Biological Example 1 for PKM2 and Biological Example 2 for PKLR).

In a further aspect, the present invention provides a compound of formula (Ia) or a pharmaceutically acceptable salt and/or solvate thereof as defined herein, for use in treating or preventing an inflammatory disease, a disease associated with an undesirable immune response, cancer, obesity, a diabetic disease or a blood disorder. In a further aspect, the present invention provides the use of a compound of formula (Ia) or a pharmaceutically acceptable salt and/or solvate thereof as defined herein, in the manufacture of a medicament for treating or preventing an inflammatory disease, a disease associated with an undesirable immune response, cancer, obesity, a diabetic disease or a blood disorder. In a further aspect, the present invention provides a method of treating or preventing an inflammatory disease, a disease associated with an undesirable immune response, cancer, obesity, a diabetic disease or a blood disorder, which comprises administering a compound of formula (Ia) or a pharmaceutically acceptable salt and/or solvate thereof as defined herein.

In a further aspect, the present invention provides a compound of formula (Ia) or a pharmaceutically acceptable salt and/or solvate thereof as defined herein, for use in treating or preventing a symptom associated with an inflammatory disease, a disease associated with an undesirable immune response, cancer, obesity, a diabetic disease or a blood disorder. In a further aspect, the present invention provides the use of a compound of formula (Ia) or a pharmaceutically acceptable salt and/or solvate thereof as defined herein, in the manufacture of a medicament for treating or preventing a symptom associated with an inflammatory disease, a disease associated with an undesirable immune response, cancer, obesity, a diabetic disease or a blood disorder. In a further aspect, the present invention provides a method of treating or preventing a symptom associated with an inflammatory disease, a disease associated with an undesirable immune response, cancer, obesity, a diabetic disease or a blood disorder, which comprises administering a compound of formula (Ia) or a pharmaceutically acceptable salt and/or solvate thereof as defined herein.

For all aspects of the invention, suitably the compound is administered to a subject in need thereof, wherein the subject is suitably a human subject.

In one embodiment is provided a compound of formula (Ia) or a pharmaceutically acceptable salt and/or solvate thereof as defined herein, for use in treating an inflammatory disease, a disease associated with an undesirable immune response, cancer, obesity, a diabetic disease or a blood disorder. In one embodiment of the invention is provided the use of a compound of formula (Ia) or a pharmaceutically acceptable salt and/or solvate thereof as defined herein, in the manufacture of a medicament for treating an inflammatory disease, a disease associated with an undesirable immune response, cancer, obesity, a diabetic disease or a blood disorder. In one embodiment of the invention is provided a method of treating an inflammatory disease, a disease associated with an undesirable immune response, cancer, obesity, a diabetic disease or a blood disorder, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating a symptom associated with an inflammatory disease, a disease associated with an undesirable immune response, cancer, obesity, a diabetic disease or a blood disorder. In one embodiment of the invention is provided the use of a compound of formula (Ia) or a pharmaceutically acceptable salt and/or solvate thereof as defined herein, in the manufacture of a medicament for treating a symptom associated with an inflammatory disease, a disease associated with an undesirable immune response, cancer, obesity, a diabetic disease or a blood disorder. In one embodiment of the invention is provided a method of treating a symptom associated with an inflammatory disease, a disease associated with an undesirable immune response, cancer, obesity, a diabetic disease or a blood disorder, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in preventing an inflammatory disease, a disease associated with an undesirable immune response, cancer, obesity, a diabetic disease or a blood disorder. In one embodiment of the invention is provided the use of a compound of formula (Ia) or a pharmaceutically acceptable salt and/or solvate thereof as defined herein, in the manufacture of a medicament for preventing an inflammatory disease, a disease associated with an undesirable immune response, cancer, obesity, a diabetic disease or a blood disorder. In one embodiment of the invention is provided a method of preventing an inflammatory disease, a disease associated with an undesirable immune response, cancer, obesity, a diabetic disease or a blood disorder, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in preventing a symptom associated with an inflammatory disease, a disease associated with an undesirable immune response, cancer, obesity, a diabetic disease or a blood disorder. In one embodiment of the invention is provided the use of a compound of formula (Ia) or a pharmaceutically acceptable salt and/or solvate thereof as defined herein, in the manufacture of a medicament for preventing a symptom associated with an inflammatory disease, a disease associated with an undesirable immune response, cancer, obesity, a diabetic disease or a blood disorder. In one embodiment of the invention is provided a method of preventing a symptom associated with an inflammatory disease, a disease associated with an undesirable immune response, cancer, obesity, a diabetic disease or a blood disorder, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing an inflammatory disease. In one embodiment of the invention is provided the use of a compound of formula (Ia) or a pharmaceutically acceptable salt and/or solvate thereof as defined herein, in the manufacture of a medicament for treating or preventing an inflammatory disease. In one embodiment of the invention is provided a method of treating or preventing an inflammatory disease, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing a symptom associated with an inflammatory disease. In one embodiment of the invention is provided the use of a compound of formula (Ia) or a pharmaceutically acceptable salt and/or solvate thereof as defined herein, in the manufacture of a medicament for treating or preventing a symptom associated with an inflammatory disease. In one embodiment of the invention is provided a method of treating or preventing a symptom associated with an inflammatory disease, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing inflammation associated with an inflammatory disease. In one embodiment of the invention is provided the use of a compound of formula (Ia) or a pharmaceutically acceptable salt and/or solvate thereof as defined herein, in the manufacture of a medicament for treating or preventing inflammation associated with an inflammatory disease. In one embodiment of the invention is provided a method of treating or preventing inflammation associated with an inflammatory disease, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing a disease associated with an undesirable immune response. In one embodiment of the invention is provided the use of a compound of formula (Ia) or a pharmaceutically acceptable salt and/or solvate thereof as defined herein, in the manufacture of a medicament for treating or preventing a disease associated with an undesirable immune response. In one embodiment of the invention is provided a method of treating or preventing a disease associated with an undesirable immune response, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing a symptom associated with a disease associated with an undesirable immune response. In one embodiment of the invention is provided the use of a compound of formula (Ia) or a pharmaceutically acceptable salt and/or solvate thereof as defined herein, in the manufacture of a medicament for treating or preventing a symptom associated with a disease associated with an undesirable immune response. In one embodiment of the invention is provided a method of treating or preventing a symptom associated with a disease associated with an undesirable immune response, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing inflammation associated with a disease associated with an undesirable immune response. In one embodiment of the invention is provided the use of a compound of formula (Ia) or a pharmaceutically acceptable salt and/or solvate thereof as defined herein, in the manufacture of a medicament for treating or preventing inflammation associated with a disease associated with an undesirable immune response. In one embodiment of the invention is provided a method of treating or preventing inflammation associated with a disease associated with an undesirable immune response, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing cancer. In one embodiment of the invention is provided the use of a compound of formula (Ia) or a pharmaceutically acceptable salt and/or solvate thereof as defined herein, in the manufacture of a medicament for treating or preventing cancer. In one embodiment of the invention is provided a method of treating or preventing cancer, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing a symptom associated with cancer. In one embodiment of the invention is provided the use of a compound of formula (Ia) or a pharmaceutically acceptable salt and/or solvate thereof as defined herein, in the manufacture of a medicament for treating or preventing a symptom associated with cancer. In one embodiment of the invention is provided a method of treating or preventing a symptom associated with cancer, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing obesity. In one embodiment of the invention is provided the use of a compound of formula (Ia) or a pharmaceutically acceptable salt and/or solvate thereof as defined herein, in the manufacture of a medicament for treating or preventing obesity. In one embodiment of the invention is provided a method of treating or preventing obesity, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing a symptom associated with obesity. In one embodiment of the invention is provided the use of a compound of formula (Ia) or a pharmaceutically acceptable salt and/or solvate thereof as defined herein, in the manufacture of a medicament for treating or preventing a symptom associated with obesity. In one embodiment of the invention is provided a method of treating or preventing a symptom associated with obesity, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing a diabetic disease. In one embodiment of the invention is provided the use of a compound of formula (Ia) or a pharmaceutically acceptable salt and/or solvate thereof as defined herein, in the manufacture of a medicament for treating or preventing a diabetic disease. In one embodiment of the invention is provided a method of treating or preventing a diabetic disease, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing a symptom associated with a diabetic disease. In one embodiment of the invention is provided the use of a compound of formula (Ia) or a pharmaceutically acceptable salt and/or solvate thereof as defined herein, in the manufacture of a medicament for treating or preventing a symptom associated with a diabetic disease. In one embodiment of the invention is provided a method of treating or preventing a symptom associated with a diabetic disease, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing a blood disorder. In one embodiment of the invention is provided the use of a compound of formula (Ia) or a pharmaceutically acceptable salt and/or solvate thereof as defined herein, in the manufacture of a medicament for treating or preventing a blood disorder. In one embodiment of the invention is provided a method of treating or preventing a blood disorder, which comprises administering a compound of formula (Ia) or a pharmaceutically acceptable salt and/or solvate thereof as defined herein.

In one embodiment is provided a compound of formula (Ia) or a pharmaceutically acceptable salt and/or solvate thereof as defined herein, for use in treating or preventing a symptom associated with a blood disorder. In one embodiment of the invention is provided the use of a compound of formula (Ia) or a pharmaceutically acceptable salt and/or solvate thereof as defined herein, in the manufacture of a medicament for treating or preventing a symptom associated with a blood disorder. In one embodiment of the invention is provided a method of treating or preventing a symptom associated with a blood disorder, which comprises administering a compound of formula (Ia) or a pharmaceutically acceptable salt and/or solvate thereof as defined herein.

An undesirable immune response will typically be an immune response which gives rise to a pathology i.e. is a pathological immune response or reaction.

In one embodiment, the inflammatory disease or disease associated with an undesirable immune response is an auto-immune disease.

In one embodiment, the inflammatory disease or disease associated with an undesirable immune response is, or is associated with, a disease selected from the group consisting of: psoriasis (including chronic plaque, erythrodermic, pustular, guttate, inverse and nail variants), asthma, chronic obstructive pulmonary disease (COPD, including chronic bronchitis and emphysema), heart failure (including left ventricular failure), myocardial infarction, angina pectoris, other atherosclerosis and/or atherothrombosis-related disorders (including peripheral vascular disease and ischaemic stroke), a mitochondrial and neurodegenerative disease (such as Parkinson's disease, Alzheimer's disease, Huntington's disease, amyotrophic lateral sclerosis, retinitis pigmentosa or mitochondrial encephalomyopathy), autoimmune paraneoplastic retinopathy, transplantation rejection (including antibody-mediated and T cell-mediated forms), multiple sclerosis, transverse myelitis, ischaemia-reperfusion injury (e.g. during elective surgery such as cardiopulmonary bypass for coronary artery bypass grafting or other cardiac surgery, following percutaneous coronary intervention, following treatment of acute ST-elevation myocardial infarction or ischaemic stroke, organ transplantation, or acute compartment syndrome), AGE-induced genome damage, an inflammatory bowel disease (e.g. Crohn's disease or ulcerative colitis), primary sclerosing cholangitis (PSC), PSC-autoimmune hepatitis overlap syndrome, non-alcoholic fatty liver disease (non-alcoholic steatohepatitis), rheumatica, granuloma annulare, cutaneous lupus erythematosus (CLE), systemic lupus erythematosus (SLE), lupus nephritis, drug-induced lupus, autoimmune myocarditis or myopericarditis, Dressler's syndrome, giant cell myocarditis, post-pericardiotomy syndrome, drug-induced hypersensitivity syndromes (including hypersensitivity myocarditis), eczema, sarcoidosis, erythema nodosum, acute disseminated encephalomyelitis (ADEM), neuromyelitis optica spectrum disorders, MOG (myelin oligodendrocyte glycoprotein) antibody-associated disorders (including MOG-EM), optic neuritis, CLIPPERS (chronic lymphocytic inflammation with pontine perivascular enhancement responsive to steroids), diffuse myelinoclastic sclerosis, Addison's disease, alopecia areata, ankylosing spondylitis, other spondyloarthritides (including peripheral spondyloarthritis, that is associated with psoriasis, inflammatory bowel disease, reactive arthritis or juvenile onset forms), antiphospholipid antibody syndrome, autoimmune hemolytic anaemia, autoimmune hepatitis, autoimmune inner ear disease, pemphigoid (including bullous pemphigoid, mucous membrane pemphigoid, cicatricial pemphigoid, herpes gestationis or pemphigoid gestationis, ocular cicatricial pemphigoid), linear IgA disease, Behget's disease, celiac disease, Chagas disease, dermatomyositis, diabetes mellitus type I, endometriosis, Goodpasture's syndrome, Graves' disease, Guillain-Barre syndrome and its subtypes (including acute inflammatory demyelinating polyneuropathy, AIDP, acute motor axonal neuropathy (AMAN), acute motor and sensory axonal neuropathy (AMSAN), pharyngeal-cervical-brachial variant, Miller-Fisher variant and Bickerstaff's brainstem encephalitis), progressive inflammatory neuropathy, Hashimoto's disease, hidradenitis suppurativa, inclusion body myositis, necrotising myopathy, Kawasaki disease, IgA nephropathy, Henoch-Schonlein purpura, idiopathic thrombocytopenic purpura, thrombotic thrombocytopenic purpura (TTP), Evans' syndrome, interstitial cystitis, mixed connective tissue disease, undifferentiated connective tissue disease, morphea, myasthenia gravis (including MuSK antibody positive and seronegative variants), narcolepsy, neuromyotonia, pemphigus vulgaris, pernicious anaemia, psoriatic arthritis, polymyositis, primary biliary cholangitis (also known as primary biliary cirrhosis), rheumatoid arthritis, palindromic rheumatism, schizophrenia, autoimmune (meningo-)encephalitis syndromes, scleroderma (including limited and diffuse), Sjogren's syndrome, stiff person syndrome, polymylagia rheumatica, giant cell arteritis (temporal arteritis), Takayasu arteritis, polyarteritis nodosa, Kawasaki disease, granulomatosis with polyangitis (GPA; formerly known as Wegener's granulomatosis), eosinophilic granulomatosis with polyangiitis (EGPA; formerly known as Churg-Strauss syndrome), microscopic polyarteritis/polyangiitis, hypocomplementaemic urticarial vasculitis, hypersensitivity vasculitis, cryoglobulinemia, thromboangiitis obliterans (Buerger's disease), vasculitis, leukocytoclastic vasculitis, vitiligo, acute disseminated encephalomyelitis, adrenoleukodystrophy, Alexander's disease, Alper's disease, balo concentric sclerosis or Marburg disease, cryptogenic organising pneumonia (formerly known as bronchiolitis obliterans organizing pneumonia), Canavan disease, central nervous system vasculitic syndrome, Charcot-Marie-Tooth disease, childhood ataxia with central nervous system hypomyelination, chronic inflammatory demyelinating polyneuropathy (CIDP), diabetic retinopathy, globoid cell leukodystrophy (Krabbe disease), graft-versus-host disease (GVHD) (including acute and chronic forms, as well as intestinal GVHD), hepatitis C (HCV) infection or complication, herpes simplex viral infection or complication, human immunodeficiency virus (HIV) infection or complication, lichen planus, monomelic amyotrophy, fibrosis, cystic fibrosis, pulmonary arterial hypertension (PAH, including idiopathic PAH), lung sarcoidosis, idiopathic pulmonary fibrosis, kidney fibrosis, liver fibrosis, lung fibrosis, paediatric asthma, atopic dermatitis, allergic dermatitis, contact dermatitis, allergic rhinitis, rhinitis, sinusitis, conjunctivitis, allergic conjunctivitis, keratoconjunctivitis sicca, dry eye, xerophthalmia, glaucoma, macular oedema, diabetic macular oedema, central retinal vein occlusion (CRVO), macular degeneration (including dry and/or wet age related macular degeneration, AMD), post-operative cataract inflammation, uveitis (including posterior, anterior, intermediate and pan uveitis), iridocyclitis, scleritis, corneal graft and limbal cell transplant rejection, gluten sensitive enteropathy (coeliac disease), dermatitis herpetiformis, eosinophilic esophagitis, achalasia, autoimmune dysautonomia, autoimmune encephalomyelitis, autoimmune oophoritis, autoimmune orchitis, autoimmune pancreatitis, aortitis and periaortitis, autoimmune retinopathy, autoimmune urticaria, Behcet's disease, (idiopathic) Castleman's disease, Cogan's syndrome, IgG4-related disease, retroperitoneal fibrosis, juvenile idiopathic arthritis including systemic juvenile idiopathic arthritis (Still's disease), adult-onset Still's disease, ligneous conjunctivitis, Mooren's ulcer, pityriasis lichenoides et varioliformis acuta (PLEVA, also known as Mucha-Habermann disease), multifocal motor neuropathy (MMN), paediatric acute-onset neuropsychiatric syndrome (PANS) (including paediatric autoimmune neuropsychiatric disorders associated with streptococcal infections (PANDAS)), paraneoplastic syndromes (including paraneoplastic cerebellar degeneration, Lambert-Eaton myaesthenic syndrome, limbic encephalitis, brainstem encephalitis, opsoclonus myoclonus ataxia syndrome, anti-NMDA receptor encephalitis, thymoma-associated multiorgan autoimmunity), perivenous encephalomyelitis, reflex sympathetic dystrophy, relapsing polychondritis, sperm & testicular autoimmunity, Susac's syndrome, Tolosa-Hunt syndrome, Vogt-Koyanagi-Harada Disease, anti-synthetase syndrome, autoimmune enteropathy, immune dysregulation polyendocrinopathy enteropathy X-linked (IPEX), microscopic colitis, autoimmune lymphoproliferative syndrome (ALPS), autoimmune polyendocrinopathy-candidiasis-ectodermal dystrophy syndrome (APEX), gout, pseudogout, amyloid (including AA or secondary amyloidosis), eosinophilic fasciitis (Shulman syndrome) progesterone hypersensitivity (including progesterone dermatitis), familial Mediterranean fever (FMF), tumour necrosis factor (TNF) receptor-associated periodic fever syndrome (TRAPS), hyperimmunoglobulinaemia D with periodic fever syndrome (HIDS), PAPA (pyogenic arthritis, pyoderma gangrenosum, severe cystic acne) syndrome, deficiency of interleukin-1 receptor antagonist (DIRA), deficiency of the interleukin-36-receptor antagonist (DITRA), cryopyrin-associated periodic syndromes (CAPS) (including familial cold autoinflammatory syndrome [FCAS], Muckle-Wells syndrome, neonatal onset multisystem inflammatory disease [NOMID]), NLRP12-associated autoinflammatory disorders (NLRP12AD), periodic fever aphthous stomatitis (PFAPA), chronic atypical neutrophilic dermatosis with lipodystrophy and elevated temperature (CANDLE), Majeed syndrome, Blau syndrome (also known as juvenile systemic granulomatosis), macrophage activation syndrome, chronic recurrent multifocal osteomyelitis (CRMO), familial cold autoinflammatory syndrome, mutant adenosine deaminase 2 and monogenic interferonopathies (including Aicardi-Goutieres syndrome, retinal vasculopathy with cerebral leukodystrophy, spondyloenchondrodysplasia, STING [stimulator of interferon genes]-associated vasculopathy with onset in infancy, proteasome associated autoinflammatory syndromes, familial chilblain lupus, dyschromatosis symmetrica hereditaria), Schnitzler syndrome; familial cylindromatosis, congenital B cell lymphocytosis, OTULIN-related autoinflammatory syndrome, type 2 diabetes mellitus, insulin resistance and the metabolic syndrome (including obesity-associated inflammation), atherosclerotic disorders (e.g. myocardial infarction, angina, ischaemic heart failure, ischaemic nephropathy, ischaemic stroke, peripheral vascular disease, aortic aneurysm), renal inflammatory disorders (e.g. diabetic nephropathy, membranous nephropathy, minimal change disease, crescentic glomerulonephritis, acute kidney injury, renal transplantation), wound healing, keloid formation and prurigo nodularis.

In one embodiment, the inflammatory disease or disease associated with an undesirable immune response is, or is associated with, a disease selected from the following autoinflammatory diseases: familial Mediterranean fever (FMF), tumour necrosis factor (TNF) receptor-associated periodic fever syndrome (TRAPS), hyperimmunoglobulinaemia D with periodic fever syndrome (HIDS), PAPA (pyogenic arthritis, pyoderma gangrenosum, and severe cystic acne) syndrome, deficiency of interleukin-1 receptor antagonist (DIRA), deficiency of the interleukin-36-receptor antagonist (DITRA), cryopyrin-associated periodic syndromes (CAPS) (including familial cold autoinflammatory syndrome [FCAS], Muckle-Wells syndrome, and neonatal onset multisystem inflammatory disease [NOMID]), NLRP12-associated autoinflammatory disorders (NLRP12AD), periodic fever aphthous stomatitis (PFAPA), chronic atypical neutrophilic dermatosis with lipodystrophy and elevated temperature (CANDLE), Majeed syndrome, Blau syndrome (also known as juvenile systemic granulomatosis), macrophage activation syndrome, chronic recurrent multifocal osteomyelitis (CRMO), familial cold autoinflammatory syndrome, mutant adenosine deaminase 2 and monogenic interferonopathies (including Aicardi-Goutieres syndrome, retinal vasculopathy with cerebral leukodystrophy, spondyloenchondrodysplasia, STING [stimulator of interferon genes]-associated vasculopathy with onset in infancy, proteasome associated autoinflammatory syndromes, familial chilblain lupus, dyschromatosis symmetrica hereditaria) and Schnitzler syndrome.

In one embodiment, the inflammatory disease or disease associated with an undesirable immune response is, or is associated with, a disease selected from the following diseases mediated by excess NF-κB or gain of function in the NF-κB signalling pathway or in which there is a major contribution to the abnormal pathogenesis therefrom (including non-canonical NF-κB signalling): familial cylindromatosis, congenital B cell lymphocytosis, OTULIN-related autoinflammatory syndrome, type 2 diabetes mellitus, insulin resistance and the metabolic syndrome (including obesity-associated inflammation), atherosclerotic disorders (e.g. myocardial infarction, angina, ischaemic heart failure, ischaemic nephropathy, ischaemic stroke, peripheral vascular disease, aortic aneurysm), renal inflammatory disorders (e.g. diabetic nephropathy, membranous nephropathy, minimal change disease, crescentic glomerulonephritis, acute kidney injury, renal transplantation), asthma, COPD, type 1 diabetes mellitus, rheumatoid arthritis, multiple sclerosis, inflammatory bowel disease (including ulcerative colitis and Crohn's disease), and SLE.

In one embodiment, the inflammatory disease or disease associated with an undesirable immune response is, or is associated with, a disease is selected from the group consisting of Crohn's disease, ulcerative colitis, Type 2 diabetes, atopic dermatitis, hidradenitis suppurativa, psoriasis, bullous pemphigoid, pemphigus vulgaris, limited and diffuse scleroderma, Sjogren's syndrome, polymyositis, dermatomyositis, Behcet's disease, wound healing, rheumatoid arthritis, systemic lupus erythematosus, cutaneous lupus erythematosus, graft-vs-host disease, multiple sclerosis, organ fibrosis (including liver, lung, kidney), COPD and asthma.

In one embodiment, the inflammatory disease or disease associated with an undesirable immune response is, or is associated with, a disease is selected from the group consisting of rheumatoid arthritis, psoriatic arthritis, ankylosing spondylitis, systemic lupus erythematosus, multiple sclerosis, psoriasis, inflammatory bowel disease (including ulcerative colitis and Crohn's disease), atopic dermatitis, fibrosis, uveitis, cryopyrin-associated periodic syndromes, Muckle-Wells syndrome, juvenile idiopathic arthritis, chronic obstructive pulmonary disease and asthma.

In one embodiment, the disease is multiple sclerosis.
In one embodiment, the disease is psoriasis.
In one embodiment, the disease is asthma.
In one embodiment, the disease is chronic obstructive pulmonary disease.
In one embodiment, the disease is systemic lupus erythematosus.
In one embodiment, the disease is rheumatoid arthritis.
In one embodiment, the disease is inflammatory bowel disease (including ulcerative colitis and Crohn's disease).
In one embodiment, the disease is atopic dermatitis.
In one embodiment, the disease is fibrosis.

In one embodiment, cancer is selected from the group consisting of acute lymphoblastic leukaemia, adult; acute lymphoblastic leukaemia, childhood; acute myeloid leukaemia, adult; adrenocortical carcinoma; adrenocortical carcinoma, childhood; aids-related lymphoma; aids-related malignancies; anal cancer; astrocytoma, childhood cerebellar; astrocytoma, childhood cerebral; Barrett's esophagus (pre-malignant syndrome); bile duct cancer, extrahepatic; bladder cancer; bladder cancer, childhood; bone cancer, osteosarcoma/malignant fibrous histiocytoma; brain stem glioma, childhood; brain tumour, adult; brain tumour, brain stem glioma, childhood; brain tumour, cerebellar astrocytoma, childhood; brain tumour, cerebral astrocytoma/malignant glioma, childhood; brain tumour, ependymoma, childhood; brain tumour, medulloblastoma, childhood; brain tumour, supratentorial primitive neuroectodermal tumours, childhood; brain tumour, visual pathway and hypothalamic glioma, childhood; brain tumour, childhood (other); breast cancer; breast cancer and pregnancy; breast cancer, childhood; breast cancer, male; bronchial adenomas/carcinoids, childhood; carcinoid tumour, childhood; carcinoid tumour, gastrointestinal; carcinoma, adrenocortical; carcinoma, islet cell; carcinoma of unknown primary; central nervous system lymphoma, primary; cerebellar astrocytoma, childhood; cerebral astrocytoma/malignant glioma, childhood; cervical cancer; childhood cancers; chronic lymphocytic leukaemia; chronic myelogenous leukaemia; chronic myeloproliferative disorders; clear cell sarcoma of tendon sheaths; colon cancer; colorectal cancer; colorectal cancer, childhood; cutaneous t-cell lymphoma; endometrial cancer; ependymoma, childhood; epithelial cancer, ovarian; oesophageal cancer; oesophageal cancer, childhood; Ewing's family of tumours; extracranial germ cell tumour, childhood; extragonadal germ cell tumour; extrahepatic bile duct cancer; eye cancer, intraocular melanoma; eye cancer, retinoblastoma; gallbladder cancer; gastric (stomach) cancer; gastric (stomach) cancer, childhood; gastrointestinal carcinoid tumour; germ cell tumour, extracranial, childhood; germ cell tumour, extragonadal; germ cell tumour, ovarian; gestational trophoblastic tumour; glioma, childhood brain stem; glioma, childhood visual pathway and hypothalamic; hairy cell leukaemia; head and neck cancer; hepatocellular (liver) cancer; hepatocellular (liver) cancer, adult (primary); hepatocellular (liver) cancer, childhood (primary); cancer of the esophagus; Hodgkin's lymphoma; Hodgkin's lymphoma, adult; Hodgkin's lymphoma, childhood; Hodgkin's lymphoma during pregnancy; hypopharyngeal cancer; hypothalamic and visual pathway glioma, childhood; intraocular melanoma; islet cell carcinoma (endocrine pancreas); cancer of the endocrine system (e.g., cancer of the thyroid, pancreas, parathyroid or adrenal glands); Kaposi's sarcoma; kidney cancer; laryngeal cancer; laryngeal cancer, childhood; leukaemia, acute lymphoblastic, adult; leukaemia, acute lymphoblastic, childhood; leukaemia, acute myeloid, adult; leukaemia, acute myeloid, childhood; leukaemia, chronic lymphocytic; leukaemia, chronic myelogenous; leukaemia, hairy cell; lymphocytic lymphoma; lip and oral cavity cancer; liver cancer, adult (primary); liver cancer, childhood (primary); lung cancer; lung cancer, non-small cell; lung cancer, small cell; lymphoblastic leukaemia, adult acute; lymphoblastic leukaemia, childhood acute; lymphocytic leukaemia, chronic; lymphoma, aids-related; lymphoma, central nervous system (primary); lymphoma, cutaneous t-cell; lymphoma, Hodgkin's, adult; lymphoma, Hodgkin's, childhood; lymphoma, Hodgkin's during pregnancy; lymphoma, non-Hodgkin's, adult; lymphoma, non-Hodgkin's, childhood; lymphoma, non-Hodgkin's during pregnancy; lymphoma, primary central nervous system; macroglobulinemia, Waldenstrom's; male breast cancer; malignant mesothelioma, adult; malignant mesothelioma, childhood; malignant thymoma; medulloblastoma, childhood; melanoma; melanoma, intraocular; Merkel cell carcinoma; mesothelioma, malignant; metastatic squamous neck cancer with occult primary; multiple endocrine neoplasia syndrome, childhood; multiple myeloma/plasma cell neoplasm; mycosis fungoides; myelodysplastic syndromes; myelogenous leukaemia, chronic; myeloid leukaemia, childhood acute; myeloma, multiple; myeloproliferative disorders, chronic; nasal cavity and paranasal sinus cancer; nasopharyngeal cancer; nasopharyngeal cancer, childhood; neoplastic cutaneous disease; neuroblastoma; non-Hodgkin's lymphoma, adult; non-Hodgkin's lymphoma, childhood; non-Hodgkin's lymphoma during pregnancy; non-small cell lung cancer; neoplasms of the central nervous system (e.g., primary CNS lymphoma, spinal axis tumors, medulloblastoma, brain stem gliomas or pituitary adenomas; oat-cell cancer; oral cancer, childhood; oral cavity and lip cancer; oropharyngeal cancer; osteosarcoma/malignant fibrous histiocytoma of bone; ovarian cancer; ovarian cancer, childhood; ovarian epithelial cancer; ovarian germ cell tumour; ovarian low malignant potential tumour; pediatric malignancy; pancreatic cancer; pancreatic cancer, childhood; pancreatic cancer, islet cell; paranasal sinus and nasal cavity cancer; parathyroid cancer; penile cancer; pheochromocytoma; pineal and supratentorial primitive neuroectodermal tumours, childhood; pituitary tumour; plasma cell neoplasm/multiple myeloma; pleuropulmonary blastoma; pregnancy and breast cancer; pregnancy and Hodgkin's lymphoma; pregnancy and non-Hodgkin's lymphoma; primary central nervous system lymphoma; primary liver cancer, adult; primary liver cancer, childhood; prostate cancer (particularly hormone-refractory); chronic or acute leukemia; solid tumors of childhood; hypereosinophilia; rectal cancer; renal cell (kidney) cancer; renal cell cancer, childhood; renal pelvis and ureter, transitional cell cancer; retinoblastoma; rhabdomyosarcoma, childhood; salivary gland cancer; salivary gland cancer, childhood; sarcoma, Ewing's family of tumours; sarcoma, Kaposi's; sarcoma (osteosarcoma)/malignant fibrous histiocytoma of bone; sarcoma, rhabdomyosarcoma, childhood; sarcomas of soft tissues; sarcoma, soft tissue, adult; sarcoma, soft tissue, childhood; Sezary syndrome; skin cancer; skin cancer, childhood; skin cancer (melanoma); skin carcinoma, Merkel cell; small cell lung cancer; dermatofibrosarcoma protuberans; small intestine cancer; soft tissue sarcoma, adult; soft tissue sarcoma, childhood; cancer of the head and neck; squamous neck cancer with occult primary, metastatic; stomach (gastric) cancer; stomach (gastric) cancer, childhood; supratentorial primitive neuroectodermal tumours, childhood; t-cell lymphoma, cutaneous; testicular cancer; thymoma, childhood; thymoma, malignant; thyroid cancer; thyroid cancer, childhood; transitional cell cancer of the renal pelvis and ureter; trophoblastic tumour, gestational; unknown primary site, cancer of, childhood; unusual cancers of childhood; ureter and renal pelvis, transitional cell cancer; urethral cancer; cancer of the ureter (e.g., renal cell carcinoma, carcinoma of the renal pelvis); cancer of the penis; gynecologic tumors; uterine cancer; uterine sarcoma; carcinoma of the fallopian tubes; carcinoma of the endometrium; vaginal cancer; carcinoma of the vagina; carcinoma of the vulva; visual pathway and hypothalamic glioma, childhood; vulvar cancer; Waldenstrom's macro globulinemia; and Wilms' tumour.

In one embodiment, cancer is selected from the group consisting of lung cancer; NSCLC (non-small cell lung cancer); oat-cell cancer; bone cancer; pancreatic cancer; skin cancer; dermatofibrosarcoma protuberans; cancer of the head and neck; cutaneous or intraocular melanoma; uterine cancer; ovarian cancer; colo-rectal cancer; anal cancer; stomach cancer; colon cancer; breast cancer; gynecologic tumors (e.g., uterine sarcomas, carcinoma of the fallopian tubes, carcinoma of the endometrium, carcinoma of the cervix, carcinoma of the vagina or carcinoma of the vulva); Hodgkin's Disease; hepatocellular cancer; cancer of the esophagus; small intestine cancer; cancer of the endocrine system (e.g., cancer of the thyroid, pancreas, parathyroid or adrenal glands); sarcomas of soft tissues; urethral cancer; cancer of the penis; prostate cancer (particularly hormone-refractory); chronic or acute leukemia; solid tumors of childhood; hypereosinophilia; lymphocytic lymphomas; bladder cancer; kidney cancer; cancer of the ureter (e.g., renal cell carcinoma, carcinoma of the renal pelvis); pediatric malignancy; neoplasms of the central nervous system (e.g., primary CNS lymphoma, spinal axis tumors, medulloblastoma, brain stem gliomas or pituitary adenomas); Barrett's esophagus (pre-malignant syndrome) and neoplastic cutaneous disease.

"Obesity" refers to a condition in which a subject has a body mass index of greater than or equal to 30. The body mass index (BMI) is according to the "NIH Clinical Guidelines on the Identification and Evaluation, and Treatment of Overweight and Obesity in Adults" (1998).

In one embodiment, administration of a compound of formula (Ia) to a subject reduces the BMI of the subject to less than 30, for example less than 29, less than 28, less than 27, less than 26, or less than 25. In one embodiment, a compound of formula (Ia) is used to treat or prevent aberrant or inappropriate weight gain, metabolic rate, or fat deposition, for example is used to treat anorexia, bulimia, obesity, diabetes, or hyperlipidemia (e.g., elevated triglycerides and/or elevated cholesterol), as well as disorders of fat or lipid metabolism. In one embodiment, a compound of formula (Ia) is used to treat or prevent metabolic syndrome.

In one embodiment, a compound of formula (Ia) is used to treat obesity associated with Prader-Willi Syndrome (PWS). In one embodiment, a compound of formula (Ia) is used to reduce body fat, prevent increased body fat, reduce cholesterol (e.g., total cholesterol and/or ratios of total cholesterol to HDL cholesterol), and/or reduce appetite in individuals having PWS associated obesity, and/or reduce comorbidities such as diabetes, cardiovascular disease, and stroke.

A "diabetic disease" refers to diabetes mellitus ("diabetes") or a diabetic complication. The two main types of diabetes are (i) Type 1 diabetes resulting from the pancreas not producing insulin for which the usual treatment is insulin replacement therapy and (ii) Type 2 diabetes where patients either produce insufficient insulin or have insulin resistance. Diabetic complications include microvascular and macrovascular complications, and include coronary artery disease, peripheral artery disease, stroke, diabetic nephropathy, diabetic neuropathy, diabetic retinopathy, diabetic kidney disease and NASH.

In one embodiment, a "blood disorder" is selected from the group consisting of thalassemia (e.g. beta-thalassemia), hereditary spherocytosis, hereditary elliptocytosis, abetalipoproteinemia (or Bassen-Kornzweig syndrome), paroxysmal nocturnal hemoglobinuria, acquired hemolytic anaemia (e.g., congenital anaemias (e.g., enzymopathies)), anaemia of chronic diseases, pyruvate kinase deficiency (PKD) and sickle cell disease.

Administration

References to the compound of formula (Ia) in this section are taken to include the compound of formula (Ia) or a pharmaceutically acceptable salt and/or solvate thereof, suitably the compound of formula (Ia).

The compound of formula (Ia) is usually administered as a pharmaceutical composition. Thus, in one embodiment, is provided a pharmaceutical composition comprising a compound of formula (Ia) and one or more pharmaceutically acceptable diluents or carriers.

The compound of formula (Ia) may be administered by any convenient method, e.g. by oral, parenteral, buccal, sublingual, nasal, rectal, intrathecal or transdermal administration, and the pharmaceutical compositions adapted accordingly.

The compound of formula (Ia) may be administered topically to the target organ e.g. topically to the eye, lung, nose or skin. Hence the invention provides a pharmaceutical composition comprising a compound of formula (Ia) optionally in combination with one or more topically acceptable diluents or carriers.

A compound of formula (Ia) which is active when given orally can be formulated as a liquid or solid, e.g. as a syrup, suspension, emulsion, tablet, capsule or lozenge.

A liquid formulation will generally consist of a suspension or solution of the compound of formula (Ia) in a suitable liquid carrier(s). Suitably the carrier is non-aqueous e.g. polyethylene glycol or an oil. The formulation may also contain a suspending agent, preservative, flavouring and/or colouring agent.

A composition in the form of a tablet can be prepared using any suitable pharmaceutical carrier(s) routinely used for preparing solid formulations, such as magnesium stearate, starch, lactose, sucrose and cellulose.

A composition in the form of a capsule can be prepared using routine encapsulation procedures, e.g. pellets containing the active ingredient can be prepared using standard carriers and then filled into a hard gelatine capsule; alternatively, a dispersion or suspension can be prepared using any suitable pharmaceutical carrier(s), e.g. aqueous gums, celluloses, silicates or oils and the dispersion or suspension then filled into a soft gelatine capsule.

Typical parenteral compositions consist of a solution or suspension of the compound of formula (Ia) in a sterile aqueous carrier or parenterally acceptable oil, e.g. polyethylene glycol, polyvinyl pyrrolidone, lecithin, arachis oil or sesame oil. Alternatively, the solution can be lyophilised and then reconstituted with a suitable solvent just prior to administration.

Compositions for nasal administration may conveniently be formulated as aerosols, drops, gels and powders. Aerosol formulations typically comprise a solution or fine suspension of the compound of formula (Ia) in a pharmaceutically acceptable aqueous or non-aqueous solvent and are usually presented in single or multidose quantities in sterile form in a sealed container which can take the form of a cartridge or refill for use with an atomising device. Alternatively, the sealed container may be a disposable dispensing device such as a single dose nasal inhaler or an aerosol dispenser fitted with a metering valve. Where the dosage form comprises an aerosol dispenser, it will contain a propellant which can be a compressed gas e.g. air, or an organic propellant such as a chlorofluorocarbon (CFC) or a hydrofluorocarbon (HFC). Aerosol dosage forms can also take the form of pump-atomisers.

Topical administration to the lung may be achieved by use of an aerosol formulation. Aerosol formulations typically comprise the active ingredient suspended or dissolved in a suitable aerosol propellant, such as a chlorofluorocarbon (CFC) or a hydrofluorocarbon (HFC).

Topical administration to the lung may also be achieved by use of a non-pressurised formulation such as an aqueous solution or suspension. These may be administered by means of a nebuliser e.g. one that can be hand-held and portable or for home or hospital use (i.e. non-portable). The formulation may comprise excipients such as water, buffers, tonicity adjusting agents, pH adjusting agents, surfactants and co-solvents.

Topical administration to the lung may also be achieved by use of a dry-powder formulation. The formulation will typically contain a topically acceptable diluent such as lactose, glucose or mannitol (preferably lactose).

The compound of the invention may also be administered rectally, for example in the form of suppositories or enemas, which include aqueous or oily solutions as well as suspensions and emulsions and foams. Such compositions are prepared following standard procedures, well known by those skilled in the art. For example, suppositories can be prepared by mixing the active ingredient with a conventional suppository base such as cocoa butter or other glycerides. In this case, the drug is mixed with a suitable non-irritating excipient which is solid at ordinary temperatures but liquid at the rectal temperature and will therefore melt in the rectum to release the drug. Such materials are cocoa butter and polyethylene glycols.

Generally, for compositions intended to be administered topically to the eye in the form of eye drops or eye ointments, the total amount of the compound of the present invention will be about 0.0001 to less than 4.0% (w/w).

Preferably, for topical ocular administration, the compositions administered according to the present invention will be formulated as solutions, suspensions, emulsions and other dosage forms.

The compositions administered according to the present invention may also include various other ingredients, including, but not limited to, tonicity agents, buffers, surfactants, stabilizing polymer, preservatives, co-solvents and viscosity building agents. Suitable pharmaceutical compositions of the present invention include a compound of the invention formulated with a tonicity agent and a buffer. The pharmaceutical compositions of the present invention may further optionally include a surfactant and/or a palliative agent and/or a stabilizing polymer.

Various tonicity agents may be employed to adjust the tonicity of the composition, preferably to that of natural tears for ophthalmic compositions. For example, sodium chloride, potassium chloride, magnesium chloride, calcium chloride, simple sugars such as dextrose, fructose, galactose, and/or simply polyols such as the sugar alcohols mannitol, sorbitol, xylitol, lactitol, isomaltitol, maltitol, and hydrogenated starch hydrolysates may be added to the composition to approximate physiological tonicity. Such an amount of tonicity agent will vary, depending on the particular agent to be added. In general, however, the compositions will have a tonicity agent in an amount sufficient to cause the final composition to have an ophthalmically acceptable osmolality (generally about 150-450 mOsm, preferably 250-350 mOsm and most preferably at approximately 290 mOsm). In general, the tonicity agents of the invention will be present in the range of 2 to 4% w/w. Preferred tonicity agents of the invention include the simple sugars or the sugar alcohols, such as D-mannitol.

An appropriate buffer system (e.g. sodium phosphate, sodium acetate, sodium citrate, sodium borate or boric acid) may be added to the compositions to prevent pH drift under storage conditions. The particular concentration will vary, depending on the agent employed. Preferably however, the buffer will be chosen to maintain a target pH within the range of pH 5 to 8, and more preferably to a target pH of pH 5 to 7.

Surfactants may optionally be employed to deliver higher concentrations of compound of the present invention. The surfactants function to solubilise the compound and stabilise colloid dispersion, such as micellar solution, microemulsion, emulsion and suspension. Examples of surfactants which may optionally be used include polysorbate, poloxamer, polyosyl 40 stearate, polyoxyl castor oil, tyloxapol, Triton, and sorbitan monolaurate. Preferred surfactants to be employed in the invention have a hydrophile/lipophile/balance "HLB" in the range of 12.4 to 13.2 and are acceptable for ophthalmic use, such as TritonX114 and tyloxapol.

Additional agents that may be added to the ophthalmic compositions of compounds of the present invention are demulcents which function as a stabilising polymer. The stabilizing polymer should be an ionic/charged example with precedence for topical ocular use, more specifically, a polymer that carries negative charge on its surface that can exhibit a zeta-potential of (–)10-50 mV for physical stability and capable of making a dispersion in water (i.e. water soluble). A preferred stabilising polymer of the invention would be polyelectrolyte, or polyelectrolytes if more than one, from the family of cross-linked polyacrylates, such as carbomers and Pemulen(R), specifically Carbomer 974p (polyacrylic acid), at 0.1-0.5% w/w.

Other compounds may also be added to the ophthalmic compositions of the compound of the present invention to increase the viscosity of the carrier. Examples of viscosity enhancing agents include, but are not limited to: polysaccharides, such as hyaluronic acid and its salts, chondroitin sulfate and its salts, dextrans, various polymers of the cellulose family; vinyl polymers; and acrylic acid polymers.

Topical ophthalmic products are typically packaged in multidose form. Preservatives are thus required to prevent microbial contamination during use. Suitable preservatives include: benzalkonium chloride, chlorobutanol, benzododecinium bromide, methyl paraben, propyl paraben, phenylethyl alcohol, edentate disodium, sorbic acid, polyquaternium-1, or other agents known to those skilled in the art. Such preservatives are typically employed at a level of from 0.001 to 1.0% w/v. Unit dose compositions of the present invention will be sterile, but typically unpreserved. Such compositions, therefore, generally will not contain preservatives.

Compositions suitable for buccal or sublingual administration include tablets, lozenges and pastilles where the compound of formula (Ia) is formulated with a carrier such as sugar and acacia, tragacanth, or gelatine and glycerine.

Compositions suitable for transdermal administration include ointments, gels and patches.

The composition may contain from 0.1% to 100% by weight, for example from 10 to 60% by weight, of the compound of formula (Ia), depending on the method of administration. The composition may contain from 0% to 99.9% by weight, for example 40% to 90% by weight, of the carrier, depending on the method of administration. The composition may contain from 0.05 mg to 1000 mg, for example from 1.0 mg to 500 mg, such as from 1.0 mg to 50 mg, e.g. about 10 mg of the compound of formula (Ia), depending on the method of administration. The composition may contain from 50 mg to 1000 mg, for example from 100 mg to 400 mg of the carrier, depending on the method of administration. The dose of the compound used in the treatment of the aforementioned disorders will vary in the usual way with the seriousness of the disorders, the weight of the sufferer, and other similar factors. However, as a general guide suitable unit doses may be 0.05 to 1000 mg, more suitably 1.0 to 500 mg, such as from 1.0 mg to 50 mg, e.g. about 10 mg and such unit doses may be administered more than once a day, for example two or three times a day. Such therapy may extend for a number of weeks or months.

In one embodiment of the invention, the compound of formula (Ia) is used in combination with a further therapeutic agent or agents. When the compound of formula (Ia) is used in combination with other therapeutic agents, the compounds may be administered either sequentially or simultaneously by any convenient route. Alternatively, the compounds may be administered separately.

When the compound of formula (Ia) is used for treating or preventing an inflammatory disease or a disease associated with an undesirable immune response, therapeutic agents which may be used in combination with the compound of formula (Ia) include: corticosteroids (glucocorticoids), retinoids (e.g. acitretin, isotretinoin, tazarotene), anthralin, vitamin D analogues (e.g. cacitriol, calcipotriol), calcineurin inhibitors (e.g. tacrolimus, pimecrolimus), phototherapy or photochemotherapy (e.g. psoralen ultraviolet irradiation, PUVA) or other form of ultraviolet light irradiation therapy, ciclosporine, thiopurines (e.g. azathioprine, 6-mercaptopurine), methotrexate, anti-TNFα agents (e.g. infliximab, etanercept, adalimumab, certolizumab, golimumab and biosimilars), phosphodiesterase-4 (PDE4) inhibitors (e.g. apremilast, crisaborole), anti-IL-17 agents (e.g. brodalumab, ixekizumab, secukinumab), anti-IL12/IL-23 agents (e.g. ustekinumab, briakinumab), anti-IL-23 agents (e.g. guselkumab, tildrakizumab), JAK (Janus Kinase) inhibitors (e.g. tofacitinib, ruxolitinib, baricitinib, filgotinib, upadacitinib), plasma exchange, intravenous immune globulin (IVIG), cyclophosphamide, anti-CD20 B cell depleting agents (e.g. rituximab, ocrelizumab, ofatumumab, obinutuzumab), anthracycline analogues (e.g. mitoxantrone), cladribine, sphingosine 1-phosphate receptor modulators or sphingosine analogues (e.g. fingolimod, siponimod, ozanimod, etrasimod), interferon beta preparations (including interferon beta 1b/1a), glatiramer, anti-CD3 therapy (e.g. OKT3), anti-CD52 targeting agents (e.g. alemtuzumab), leflunomide, teriflunomide, gold compounds, laquinimod, potassium channel blockers (e.g. dalfampridine/4-aminopyridine), mycophenolic acid, mycophenolate mofetil, purine analogues (e.g. pentostatin), mTOR (mechanistic target of rapamycin) pathway inhibitors (e.g. sirolimus, everolimus), anti-thymocyte globulin (ATG), IL-2 receptor (CD25) inhibitors (e.g. basiliximab, daclizumab), anti-IL-6 receptor or anti-IL-6 agents (e.g. tocilizumab, siltuximab), Bruton's tyrosine kinase (BTK) inhibitors (e.g. ibrutinib), tyrosine kinase inhibitors (e.g. imatinib), ursodeoxycholic acid, hydroxychloroquine, chloroquine, B cell activating factor (BAFF, also known as BlyS, B lymphocyte stimulator) inhibitors (e.g. belimumab, blisibimod), other B cell targeted therapy including fusion proteins targeting both APRIL (A Proliferation-Inducing Ligand) and BlyS (e.g. atacicept), PI3K inhibitors including pan-inhibitors or those targeting the p110δ and/or p110γ containing isoforms (e.g. idelalisib, copanlisib, duvelisib), interferon α receptor inhibitors (e.g. anifrolumab, sifalimumab), T cell co-stimulation blockers (e.g. abatacept, belatacept), thalidomide and its derivatives (e.g. lenalidomide), dapsone, clofazimine, leukotriene antagonists (e.g. montelukast), theophylline, anti-IgE therapy (e.g. omalizumab), anti-IL-5 agents (e.g. mepolizumab, reslizumab), long-acting muscarinic agents (e.g. tiotropium, aclidinium, umeclidinium), PDE4 inhibitors (e.g. roflumilast), riluzole, free radical scavengers (e.g. edaravone), proteasome inhibitors (e.g. bortezomib), complement cascade inhibitors including those directed against C5 (e.g. eculizumab), immunoadsor, antithymocyte globulin, 5-aminosalicylates and their derivatives (e.g. sulfasalazine, balsalazide, mesalamine), anti-integrin agents including those targeting α4β1 and/or α4β7 integrins (e.g. natalizumab, vedolizumab), anti-CD11-α agents (e.g. efalizumab), non-steroidal anti-inflammatory drugs (NSAIDs)

including the salicylates (e.g. aspirin), propionic acids (e.g. ibuprofen, naproxen), acetic acids (e.g. indomethacin, diclofenac, etodolac), oxicams (e.g. meloxicam) and fenamates (e.g. mefenamic acid), selective or relatively selective COX-2 inhibitors (e.g. celecoxib, etroxicoxib, valdecoxib and etodolac, meloxicam, nabumetone), colchicine, IL-4 receptor inhibitors (e.g. dupilumab), topical/contact immunotherapy (e.g. diphenylcyclopropenone, squaric acid dibutyl ester), anti-IL-1 receptor therapy (e.g. anakinra), IL-1β inhibitor (e.g. canakinumab), IL-1 neutralising therapy (e.g. rilonacept), chlorambucil, specific antibiotics with immunomodulatory properties and/or ability to modulate NRF2 (e.g. tetracyclines including minocycline, clindamycin, macrolide antibiotics), anti-androgenic therapy (e.g. cyproterone, spironolactone, finasteride), pentoxifylline, ursodeoxycholic acid, obeticholic acid, fibrate, cystic fibrosis transmembrane conductance regulator (CFTR) modulators, VEGF (vascular endothelial growth factor) inhibitors (e.g. bevacizumab, ranibizumab, pegaptanib, aflibercept), pirfenidone, and mizoribine.

When the compound of formula (Ia) is used for treating or preventing cancer, therapeutic agents which may be used in combination with the compound of formula (Ia) include active agents which are used in conjunction with cancer therapy, such as agents used as palliative treatments to ameliorate unwanted side effects. Therefore, in one embodiment, the additional therapeutic agent is an agent used as a palliative treatment such as selected from the group consisting of: antiemetic agents, medication intended to alleviate pain such as opioids, medication used to decrease high blood uric acid levels such as allopurinol or rasburicase, anti-depressants, sedatives, anti-convulsant drugs, laxatives, anti-diarrhoeal drugs and/or antacids.

In another embodiment, the additional therapeutic agent is an additional cancer treatment such as chemotherapy, a targeted therapy, immunotherapy and hormonal therapy.

Examples of chemotherapy agents include antimetabolites (e.g., folic acid, purine, and pyrimidine derivatives) and alkylating agents (e.g., nitrogen mustards, nitrosoureas, platinum, alkyl sulfonates, hydrazines, triazenes, aziridines, spindle poison, cytotoxic agents, toposimerase inhibitors and others). In one embodiment, the additional therapeutic agent is a chemotherapy agent and is selected from the group consisting of Aclarubicin, Actinomycin, Alitretinon, Altretamine, Aminopterin, Aminolevulinic acid, Amrubicin, Amsacrine, Anagrelide, Arsenic trioxide, Asparaginase, Atrasentan, Belotecan, Bexarotene, endamustine, Bleomycin, Bortezomib, Busulfan, Camptothecin, Capecitabine, Carboplatin, Carboquone, Carmofur, Carmustine, Celecoxib, Chlorambucil, Chlormethine, Cisplatin, Cladribine, Clofarabine, Crisantaspase, Cyclophosphamide, Cytarabine, Dacarbazine, Dactinomycin, Daunorubicin, Decitabine, Demecolcine, Docetaxel, Doxorubicin, Efaproxiral, Elesclomol, Elsamitrucin, Enocitabine, Epirubicin, Estramustine, Etoglucid, Etoposide, Floxuridine, Fludarabine, Fluorouracil (5FU), Fotemustine, Gemcitabine, Gliadel implants, Hydroxycarbamide, Hydroxyurea, Idarubicin, Ifosfamide, Irinotecan, Irofulven, Ixabepilone, Larotaxel, Leucovorin, Liposomal doxorubicin, Liposomal daunorubicin, Lonidamine, Lomustine, Lucanthone, Mannosulfan, Masoprocol, Melphalan, Mercaptopurine, Mesna, Methotrexate, Methyl aminolevulinate, Mitobronitol, Mitoguazone, Mitotane, Mitomycin, Mitoxantrone, Nedaplatin, Nimustine, Oblimersen, Omacetaxine, Ortataxel, Oxaliplatin, Paclitaxel, Pegaspargase, Pemetrexed, Pentostatin, Pirarubicin, Pixantrone, Plicamycin, Porfimer sodium, Prednimustine, Procarbazine, Raltitrexed, Ranimustine, Rubitecan, Sapacitabine, Semustine, Sitimagene ceradenovec, Satraplatin, Streptozocin, Talaporfin, Tegafur-uracil, Temoporfin, Temozolomide, Teniposide, Tesetaxel, Testolactone, Tetranitrate, Thiotepa, Tiazofurin, Tioguanine, Tipifarnib, Topotecan, Trabectedin, Triaziquone, Triethylenemelamine, Triplatin, Tretinoin, Treosulfan, Trofosfamide, Uramustine, Valrubicin, Verteporfin, Vinblastine, Vincristine, Vindesine, Vinfhmine, Vinorelbine, Vorinostat, and Zorubicin.

Examples of targeted therapies include tyrosine kinase inhibitors, cyclin-dependent kinase inhibitors, monoclonal antibodies and fusion proteins. In one embodiment, the additional therapeutic agent is selected from the group consisting of Axitinib, Bosutinib, Cediranib, dasatinib, erlotinib, imatinib, gefitinib, lapatinib, Lestaurtinib, Nilotinib, Semaxanib, Sorafenib, Sunitinib, Vandetanib, Alvocidib, Seliciclib, Herceptin, rituximab, Tositumomab, Cetuximab, Panitumumab, Trastuzumab, Alemtuzumab, Bevacizumab, Edrecolomab, Gemtuzumab, Aflibercept, Denileukin diftitox and Bexxar.

When the compound of formula (Ia) is used for treating or preventing obesity, therapeutic agents which may be used in combination with the compound of formula (Ia) include a gastric or pancreatic lipase inhibitor (such as orlistat); a lipid lowering agent (such as a statin, a fibrate, niacin or a derivative thereof (such as acipimox), lecithin, a bile acid sequesterant, ezetimibe, lomitapide, a phytosterol, an omega-3 supplement, a PCSK9 inhibitor); a CB-1 antagonist; a lipoxygenase inhibitor; a somostatin analogue; an insulin compound or insulin analogue (such as human insulin, insulin lispro, insulin aspart, insulin glulisine, insulin glargine, insulin degludec); an insulin sensitising agent such as a PPAR-gamma agonist, PPAR-alpha agonist or mixed PPAR-gamma/alpha agonist (such as metformin, pioglitazone or rosiglitazone); an insulin secretagogue (such as a nateglinide or repaglinide, or a sulfonylurea such as gliclazide, glimeperide, limepiride, glyburide); an SGLT2 inhibitor (such as dapagliflozin, canagliflozin or empagliflozin); an amylin analogue (such as pramlintide); a DPPIV inhibitor (such as sitagliptin, saxagliptin, linagliptin, alogliptin or vildagliptin); a GLP-1 agonist (such as albiglutide, dulaglutide, exenatide, liraglutide, semaglutide or lixisenatide); an alpha-glucosidase inhibitor (such as acarbose, miglitol or voglibose); a phosphodiesterase inhibitor (such as pentoxifylline); a glycogen phosphorylase inhibitor; an MCH-1 antagonist; a glucokinase activator; a glucagon antagonist; an insulin signalling agonist; a PTP1B inhibitor; a gluconeogenesis inhibitor; a GSK inhibitor or a galanin receptor agonist.

When the compound of formula (Ia) is used for treating or preventing a diabetic disease, therapeutic agents which may be used in combination with the compound of formula (Ia) include a gastric or pancreatic lipase inhibitor (such as orlistat); a lipid lowering agent (such as a statin, a fibrate, niacin or a derivative thereof (such as acipimox), lecithin, a bile acid sequesterant, ezetimibe, lomitapide, a phytosterol, an omega-3 supplement, a PCSK9 inhibitor); a CB-1 antagonist; a lipoxygenase inhibitor; a somostatin analogue; an insulin compound or insulin analogue (such as human insulin, insulin lispro, insulin aspart, insulin glulisine, insulin glargine, insulin degludec); an insulin sensitising agent such as a PPAR-gamma agonist, PPAR-alpha agonist or mixed PPAR-gamma/alpha agonist (such as metformin, pioglitazone or rosiglitazone); an insulin secretagogue (such as a nateglinide or repaglinide, or a sulfonylurea such as gliclazide, glimeperide, limepiride, glyburide); an SGLT2 inhibitor (such as dapagliflozin, canagliflozin or empagliflozin); an amylin analogue (such as pramlintide); a DPPIV inhibitor (such as sitagliptin, saxagliptin, linagliptin, alogliptin or vildagliptin); a GLP-1 agonist (such as albiglutide, dulaglutide, exenatide, liraglutide, semaglutide or lixisenatide); an alpha-glucosidase inhibitor (such as acarbose, miglitol or voglibose); a phosphodiesterase inhibitor (such as pentoxifylline); a glycogen phosphorylase inhibitor; an MCH-1 antagonist; a glucokinase activator; a glucagon antagonist; an insulin signalling agonist; a PTP1B inhibitor; a gluconeogenesis inhibitor; a GSK inhibitor or a galanin receptor agonist.

Compounds of formula (Ia) may display one or more of the following desirable properties:
  low $EC_{50}$ and/or high $E_{max}$ values for activating PKM2;
  low $EC_{50}$ and/or high $E_{max}$ values for activating PKLR;
  low $EC_{50}$ and/or high $E_{max}$ values for activating PKM2 and PKLR;
  low $IC_{50}$ values for reducing cellular proliferation;
  reduced dose and dosing frequency through improved pharmacokinetics;
  improved oral systemic bioavailability;
  reduced plasma clearance following intravenous dosing;
  augmented cell permeability;
  low toxicity at the relevant therapeutic dose.

ABBREVIATIONS

Ac acetyl
ADP adenosine diphosphate
ADME absorption, distribution, metabolism, and excretion
Aq. aqueous
ATP adenosine triphosphate
BBFO broadband fluorine observe
BEH ethylene bridged hybrid
t-Bu tert-butyl
CB-1 cannabinoid-1
CSH charged surface hybrid
DAD diode array detector
DCM dichloromethane
DHP dihydropyran
DIPEA N,N-diisopropylethylamine
DMF dimethylformamide
DMSO dimethyl sulfoxide
DPPIV dipeptidyl peptidase-4
$ES^+$ electrospray
Eq equivalents
Et ethyl
FBP fructose-1,6-bisphosphate
FBS fetal bovine serum
g gram(s)
GLP-1 glucagon-like peptide 1
GSK glycogen synthase kinase
h hour(s)
HIF hypoxia-inducible factor
HPLC high-performance liquid chromatography
IL interleukin
LAH lithium aluminium hydride
LCMS liquid chromatography-mass spectrometry
M molar concentration/molar mass
MeCN acetonitrile
MCH melanin-concentrating hormone
Me methyl
mm millimetre
(M)Hz (mega)hertz
min(s) minute(s)
mL millilitres
mmol millimole
MS mass spectrometry
nm nanometre
NASH non-alcoholic fatty liver disease
NCS N-chlorosuccinimide
NMP N-methyl-2-pyrrolidone
NMR nuclear magnetic resonance
o/n overnight
PBS phosphate buffered saline
PDA photodiode array
PEP phosphoenolpyruvic acid
PK pyruvate kinase
PPAR peroxisome proliferator-activated receptor
PTP1B protein tyrosine phosphatase 1B
Red-Al sodium bis(2-methoxyethoxy)aluminium hydride
rpm revolutions per minute
RT/r.t. room temperature
SGLT2 sodium-glucose transport protein 2
STAT3 signal transducer and activator of transcription 3
TBS tert-butyldimethylsilyl
TCA tricarboxylic acid cycle
TFA trifluoroacetic acid
THF tetrahydrofuran
THP tetrahydropyranyl
TNF tumour necrosis factor
Ts toluenesulfonyl
μL microlitre
μM micromolar
wt. weight
° C. degrees centigrade

Examples

Analytical Equipment

NMR spectra were recorded using a Bruker 400 MHz Avance Ill spectrometer fitted with a BBFO 5 mm probe, or a Bruker 500 MHz Avance Ill HD spectrometer equipped with a Bruker 5 mm SmartProbe™. Spectra were measured at 298 K, unless indicated otherwise, and were referenced relative to the solvent resonance. The chemical shifts are reported in parts per million. Data were acquired using Bruker TopSpin software.

LCMS analysis was carried out on an Agilent LCMS system using either a Waters Acquity CSH C18 (4.6×30 mm) or BEH C18 column (4.6×30 mm) maintained at a temperature of 40° C. and eluted with a linear acetonitrile gradient appropriate for the lipophilicity of the compound over 4 or 15 minutes at a constant flow rate of 2.5 mL/min. The aqueous portion of the mobile phase was either 0.1% Formic Acid (CSH C18 column) or 10 mM Ammonium Bicarbonate (BEH C18 column). LC-UV chromatograms were recorded using an Agilent VWD or DAD detector at 254 nm. Mass spectra were recorded using an Agilent MSD detector with electrospray ionisation switching between positive and negative ion mode. Sample concentration was adjusted to give adequate UV response.

Preparative HPLC Purification Methods
Acidic Method (A):

Product was dissolved in DMSO (mL), filtered and purified by reversed phase preparative HPLC (Waters 2767 Sample Manager, Waters 2545 Binary Gradient Module, Waters Systems Fluidics Organiser, Waters 515 ACD pump, Waters 515 Makeup pump, Waters 2998 Photodiode Array Detector, Waters Qda) using a Waters X-Select CSH C18 ODB prep column, 130A, 5 μm, 30 mm×100 mm, flow rate 40 mL min-1 eluting with a 0.1% formic acid in water-MeCN gradient over 12.5. At-column dilution pump gives 2 mL min-1 MeCN over the entire method, which is included in the following MeCN percentages. Gradient information: 0.0-0.5 min, lp % MeCN; 0.5-10.5 min, ramped from lp % MeCN to fp % MeCN; 10.5-10.6 min, ramped from fp % MeCN to 100% MeCN; 10.6-12.5 min, held at 100% MeCN. The clean fractions were evaporated in a Genevac.

Basic Method (B):

Product was dissolved in DMSO (0.5 mL), filtered and purified by reversed phase preparative HPLC on a Waters X-Bridge BEH C18 ODB prep column, 130A, 5 µm, 30 mm×100 mm, flow rate 40 mL min-1 eluting with a 0.3% ammonia in water-MeCN gradient over 12.5 mins using UV detection across all wavelengths with PDA as well as a QDA and ELS detector. At-column dilution pump gives 2 mL min-1 MeCN over the entire method, which is included in the following MeCN percentages. Gradient information: 0.0-0.5 min, 20% MeCN; 0.5-10.5 min, ramped from 20% MeCN to 50% MeCN; 10.5-10.6 min, ramped from 50% MeCN to 100% MeCN; 10.6-12.5 min, held at 100% MeCN. The clean fractions were evaporated in a Genevac.

Alternatively, the following analytical LCMS equipment and methods were also used:

| | LCMS/HPLC Instrument Details | | | |
|---|---|---|---|---|
| System | Instrument Name | LC Detector | ELS detector | Mass detector |
| 1 | Agilent LCMS 1200 | G1315D DAD | 380 ELSD | Agilent G6120B |
| 2 | Agilent LCMS 1200 | G1315C DAD | 380 ELSD | Agilent G6110A |

| | LCMS/HPLC Method Details | | | | | | |
|---|---|---|---|---|---|---|---|
| Method Name | Solvent System | Column | Gradient | UV range | Mass Range | Column Temp. ° C. | Flow Rate ml/min |
| A | A) water + 10 mM NH₄HCO₃ B) acetonitrile | Waters X-Bridge C18 (50 mm × 4.6 mm × 3.5 µm) | From 95:5 to 0:100 in 1.6 min, 0:100 for 1.4 min, from 0:100 to 95:5 in 0.1 min, 95:5 for 0.7 min | 190-400 nm | 100-1800 amu | 40 | 2.0 |
| B | A) water + 0.05% TFA B) acetonitrile + 0.05% TFA | Waters X-Bridge C18 (50 mm × 4.6 mm × 3.5 µm) | From 95:5 to 0:100 in 1.6 min, 0:100 for 1.4 min, from 0:100 to 95:5 in 0.05 min, 95:5 for 0.7 min | 190-400 nm | 100-1100 amu | 40 | 2.0 |
| C | A) water + 0.05% TFA | Halo C18 (30 mm × 4.6 mm × 2.7 µm) | From 95:5 to 0:100 in 0.8 min, 0:100 for 0.4 min, from 0:100 to 95:5 in 0.01 min, 95:5 for 0.2 min | 190-400 nm | 100-1100 amu | 40 | 3.0 |

Commercial Materials

All starting materials and solvents were obtained either from commercial sources or prepared according to the literature citation.

General Methods

Unless otherwise stated all reactions were stirred. Organic solutions were routinely dried over anhydrous magnesium sulfate. Hydrogenations were performed on a Thales H-cube flow reactor under the conditions stated or under pressure in a gas autoclave (bomb).

Synthesis of Intermediates

Intermediate 1: 6-(chloromethyl)-2,3-dihydropyrazolo[5,1-b]oxazole

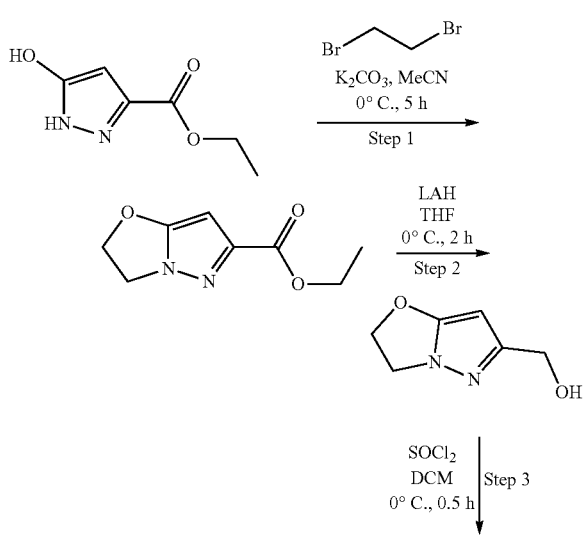

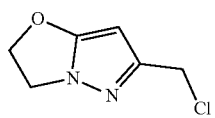

Step 1

A mixture of ethyl 5-hydroxy-1H-pyrazole-3-carboxylate (1 g, 6.4 mmol) and 1,2-dibromoethane (1302 mg, 7 mmol) in MeCN (5 mL) was added K$_2$CO$_3$ (1.9 g, 14 mmol) at 0° C. The reaction was stirred at room temperature for 5 hours. After LCMS indicated the reaction was completed, the reaction mixture was added water (10 ml). The mixture was extracted with EtOAc (10 mL×3). The organic layers were concentrated at 40° C. under reduced pressure. The residue was purified by flash column chromatography (12 g, petroleum ether/tert-Butyl methyl ether=100:0-40: 60) to give ethyl 2,3-dihydropyrazolo[5,1-b]oxazole-6-carboxylate (800 mg, 100% purity) as a yellow solid.

MS (ES+): 183.3 (M+H)+.

Step 2

To a solution of ethyl 2,3-dihydropyrazolo[5,1-b]oxazole-6-carboxylate (800 mg, 4.4 mmol) in THF (10 mL) was added LAH (2.8 mL, 5.7 mmol, 2 M of solution THF) at 0° C. The reaction mixture was stirred at 0° C. for 2 hours. After LCMS indicated the reaction was completed, the mixture was added water (10 mL) and extracted with EtOAc (10 mL×3). The organic layers were concentrated at 40° C. under reduced pressure. The residue was purified by flash column chromatography (20 g, petroleum ether/tert-Butyl methyl ether=100:00~20:80) to give (2,3-dihydropyrazolo [5,1-b]oxazol-6-yl)methanol (260 mg, 100% purity) as a yellow solid.

MS (ES+): 141.4 (M+H)+.

Step 3

A solution of (2,3-dihydropyrazolo[5,1-b]oxazol-6-yl) methanol (200 mg, 1.43 mmol) in DCM (5 mL) was added SOCl$_2$ (221 mg, 1.8 mmol) at 0° C., the reaction mixture was stirred at room temperature for 0.5 hour. After LCMS indicated the reaction was completed, the mixture was concentrated at 30° C. under reduced pressure to remove DCM and most of over amounted SOCl$_2$. The residue was quenched with ice water (10 mL), adjusted to pH=9 with 2N K$_2$CO$_3$ aqueous solution, and extracted with DCM (10 mL×3). The organic layer was washed with brine, dried over Na$_2$SO$_4$, filtered and concentrated at 30° C. under reduced pressure to the title compound (200 mg, 100% purity) as a yellow oil, which was used to the next step directly without further purification. MS (ES+): 159.3 (M+H)+.

Intermediate 2: 6-((1-(tetrahydro-2H-pyran-2-yl)-1H-pyrazol-4-yl)thio)phthalazin-1(2H)-one

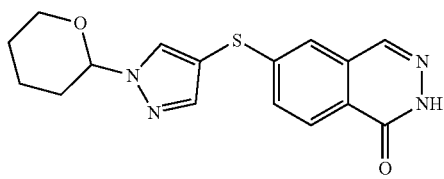 [SMILES: O=c1[nH]ncc2cc(Sc3cnn(C4CCCCO4)c3)ccc12]

A suspension of 6-mercaptophthalazin-1(2H)-one (1.26 g, 80% Wt, 1 Eq, 5.66 mmol), 4-iodo-1-(tetrahydro-2H-pyran-2-yl)-1H-pyrazole (1.82 g, 95% Wt, 1.1 Eq, 6.22 mmol), K$_2$CO$_3$ (1.56 g, 2.0 Eq, 11.3 mmol) and 1,10-phenanthroline (408 mg, 0.4 Eq, 2.26 mmol) in DMF (28.0 mL) was purged with N$_2$ for 10-15 min before adding copper(I) iodide (215 mg, 0.2 Eq, 1.13 mmol). The reaction mixture was purged for 10 min with N$_2$ then heated at 100° C. overnight. The reaction was cooled to RT and poured onto a mixture of ice and water leading to the formation of a precipitate that was filtered washed with water (50 mL). The dark brown gummy solid obtained was dissolved in DCM (250 mL) and was washed with half concentrated brine (200 mL). The organic was dried (MgSO$_4$), filtered and concentrated under reduced pressure to give a solid (1.87 g). The crude was combined with a crude mixture obtained from a separate experiment (1.63 g), dissolved in DCM (20 mL) and MeOH (2 mL), concentrated onto silica and purified by chromatography to afford the title compound (982.9 mg, 2.9 mmol) as a pale tan solid. MS (ES+): 195.1 (M+H)+.

Intermediate 3: 1-(tetrahydro-2H-pyran-2-yl)-1H-pyrazole-4-thiol

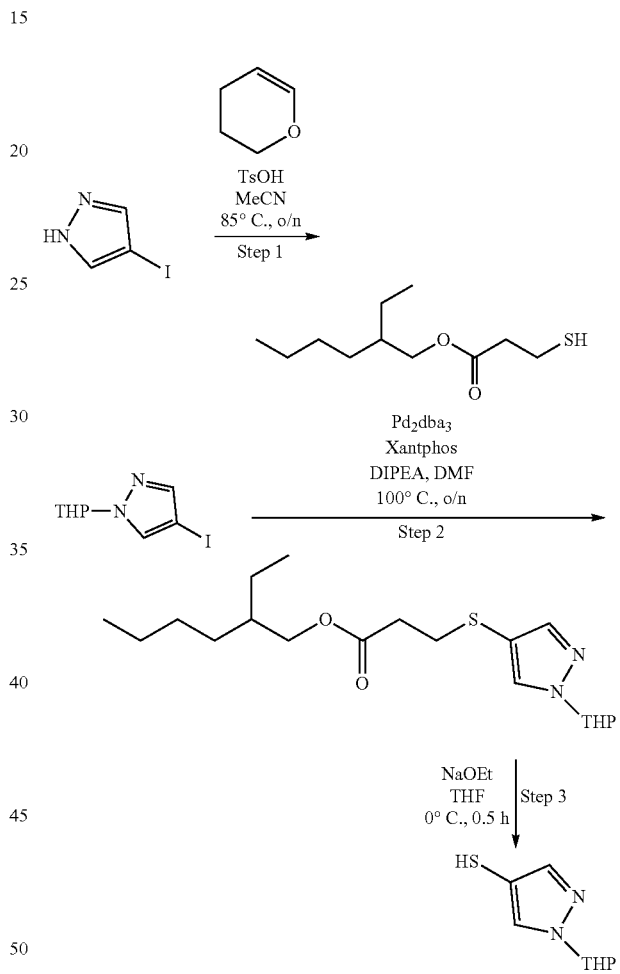

Step 1

To a solution of 4-iodo-1H-pyrazole (80 g, 412 mmol) and 3,4-dihydro-2H-pyran (54 g, 618 mmol) in MeCN (1.2 L) was added TsOH (708 mg, 4.2 mmol) at RT. The reaction mixture was stirred at 85° C. for 16 h. After LCMS indicated the reaction was complete, The mixture was concentrated at 45° C. under reduced pressure. The residue was purified by flash column chromatography to give 4-iodo-1-(tetrahydro-2H-pyran-2-yl)-1H-pyrazole (100 g) as a white solid. MS (ES+): 279.2 (M+H)+

Step 2

To a solution of 4-iodo-1-(tetrahydro-2H-pyran-2-yl)-1H-pyrazole (100 g, 360 mmol), 2-ethylhexyl 3-mercaptopropanoate (94 g, 432 mmol), Pd$_2$dba$_3$ (13 g, 14.4 mmol) and Xantphos (16.6 g, 28.8 mmol) in DMF (1 L) was added DIPEA (140 g, 1080 mmol) at RT. The reaction mixture was stirred at 100° C. for 16 h. After LCMS indicated the reaction was complete, the mixture was extracted with EtOAc (600 mL×3) and concentrated at 45° C. under reduced pressure. The residue was purified by flash column chromatography to give 2-ethylhexyl 3-((1-(tetrahydro-2H-pyran-2-yl)-1H-pyrazol-4-yl)thio)propanoate (116 g) as a yellow oil. MS (ES+): 369.3 (M+H)+

Step 3

A mixture of 2-ethylhexyl 3-((1-(tetrahydro-2H-pyran-2-yl)-1H-pyrazol-4-yl)thio)propanoate (116 g, 315 mmol) in THF (2 L) was added NaOEt (252 mL, 630 mmol, 2.5 M of solution EtOH) at 0° C. The reaction was stirred at 0° C. for 0.5 h. After LCMS indicated the reaction was complete, the reaction mixture was quenched with HCl (1M) until pH to 6. The mixture was extracted with EtOAc (600 mL×3). The organic layers were concentrated at 40° C. under reduced pressure and purified by flash column chromatography to give 1-(tetrahydro-2H-pyran-2-yl)-1H-pyrazole-4-thiol (45 g) as an oil, which was used in the next step without further purification. MS (ES+): 101.4 (M+H)+

Intermediate 4: 1-(tetrahydro-2H-pyran-2-yl)-1H-pyrazole-3-thiol

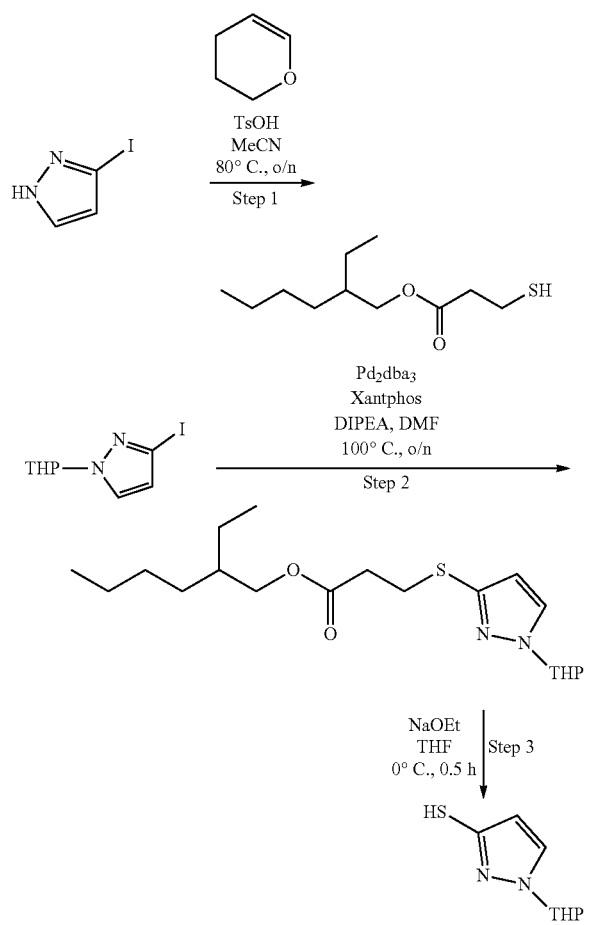

Step 1

To a solution of 3-iodo-1H-pyrazole (5.0 g, 25.8 mmol) and 3,4-dihydro-2H-pyran (3.3 g, 38.7 mmol) in MeCN (50 mL) was added p-TsOH (43 mg, 0.3 mmol) at room temperature, and the reaction mixture was stirred at 80° C. for 16 hours. After LCMS indicated the reaction was completed, the reaction mixture was concentrated at 45° C. under reduced pressure. The residue was purified by flash column chromatography (25 g, petroleum ether/tert-Butyl methyl ether=100:0~90:10) to give 3-iodo-1-(tetrahydro-2H-pyran-2-yl)-1H-pyrazole (6.6 g, 100% purity) as a yellow oil. MS (ES+): 279.1 (M+H)+.

Step 2

To a solution of 3-iodo-1-(tetrahydro-2H-pyran-2-yl)-1H-pyrazole (6.6 g, 23.7 mmol), 2-ethylhexyl 3-mercaptopropanoate (6.7 g, 30.8 mmol), Pd2dba3 (540 mg, 0.59 mmol) and Xantphos (685 mg, 1.19 mmol) in DMF (100 mL) was added DIPEA (9.2 g, 71.1 mmol) at room temperature. The reaction mixture was stirred at 100° C. for 16 hours. After LCMS indicated the reaction was completed, water (50 mL) was added and the mixture was extracted with EtOAc (50 mL×3). The combined organic layer was concentrated at 45° C. under reduced pressure. The residue was purified by flash column chromatography (120 g, petroleum ether/tert-Butyl methyl ether=100:00~80:20) to give 2-ethylhexyl 3-((1-(tetrahydro-2H-pyran-2-yl)-1H-pyrazol-3-yl)thio)propanoate (7.1 g, 44.18% purity) as a yellow oil. MS (ES+): 369.3 (M+H)+

Step 3

A mixture of 2-ethylhexyl 3-((1-(tetrahydro-2H-pyran-2-yl)-1H-pyrazol-3-yl)thio)propanoate (7.1 g, 19.3 mmol) in THF (150 mL) was added EtONa (15 mL, 2.5 M of solution EtOH) at 0° C. The reaction was stirred at 0° C. for 0.5 hours. After LCMS indicated the reaction was completed, the reaction mixture pH was adjusted with careful addition of aq. HCl (1M) until pH=6. The mixture was extracted with EtOAc (800 mL×3). The organic layers were concentrated at 40° C. under reduced pressure. The residue was purified by flash column chromatography (40 g, petroleum ether/tert-Butyl methyl ether=100: 0-60: 40) to give 1-(tetrahydro-2H-pyran-2-yl)-1H-pyrazole-3-thiol (2.8 g, 100% purity) as a yellow oil. MS (ES+): 185.3 (M+H)+.

Intermediate 5: (4-chloro-5-methyl-1-(tetrahydro-2H-pyran-2-yl)-1H-pyrazol-3-yl)methanol

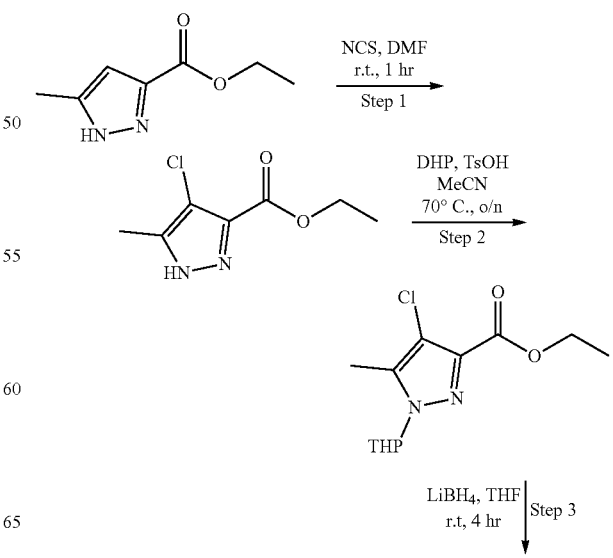

-continued

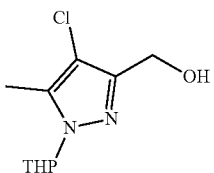

Step 1

A mixture of ethyl 5-methyl-1H-pyrazole-3-carboxylate (2.0 g, 12.97 mmol) and NCS (2.42 g, 18.16 mmol) in DMF (30 mL) was stirred at room temperature for 1 hour. After LCMS indicated the reaction was completed, the reaction mixture was reaction mixture was diluted with water (30 mL) and extracted with EtOAc (50 mL×4). The organic layers were washed with sat.aq.NH₄Cl (100 mL×2), concentrated and purified by flash column chromatography (40 g, petroleum ether/tert-butyl methyl ether=100:00~20:80) to give ethyl 4-chloro-5-methyl-1H-pyrazole-3-carboxylate (2.0 g, 68% purity) as a white solid. MS (ES⁺): 189.1 (M+H)⁺.

Step 2

A mixture of ethyl 4-chloro-5-methyl-1H-pyrazole-3-carboxylate (2.0 g, 5.30 mmol), 3,4-dihydro-2H-pyran (892 mg, 10.6 mmol) and 4-methylbenzenesulfonic acid (86 mg, 0.5 mmol) in MeCN (15 mL) was stirred at 70° C. overnight. After LCMS indicated the reaction was completed, the reaction mixture was concentrated to remove MeCN. The crude product was purified by flash column chromatography (20 g, petroleum ether/tert-butyl methyl ether=100:00~85:15) to give ethyl 4-chloro-5-methyl-1-(tetrahydro-2H-pyran-2-yl)-1H-pyrazole-3-carboxylate (760 mg, 79% purity) as a yellow oil. MS (ES⁺): 189.2 (M+H)+.

Step 3

To a solution of ethyl 4-chloro-5-methyl-1-(tetrahydro-2H-pyran-2-yl)-1H-pyrazole-3-carboxylate (760 mg, 2.79 mmol) in THF (4 mL) was added LiBH₄ (5.6 mL, 5.60 mmol, 1 M in THF) and the reaction mixture was stirred at room temperature for 4 hours. After LCMS indicated the reaction was completed, the reaction mixture was quenched with sat.aq. NH₄Cl until the gas evolution subsided. The suspension was extracted with DCM (50 mL×4). The organic layers were then dried over Na₂SO₄, filtered and concentrated at 40° C. under reduced pressure to give the title product (540 mg, 86% purity) as a white solid. MS (ES⁺): 231.2 (M+H)⁺.

Intermediate 6: 6-mercapto-2-((1-(tetrahydro-2H-pyran-2-yl)-1H-pyrazol-3-yl)methyl)phthalazin-1(2H)-one

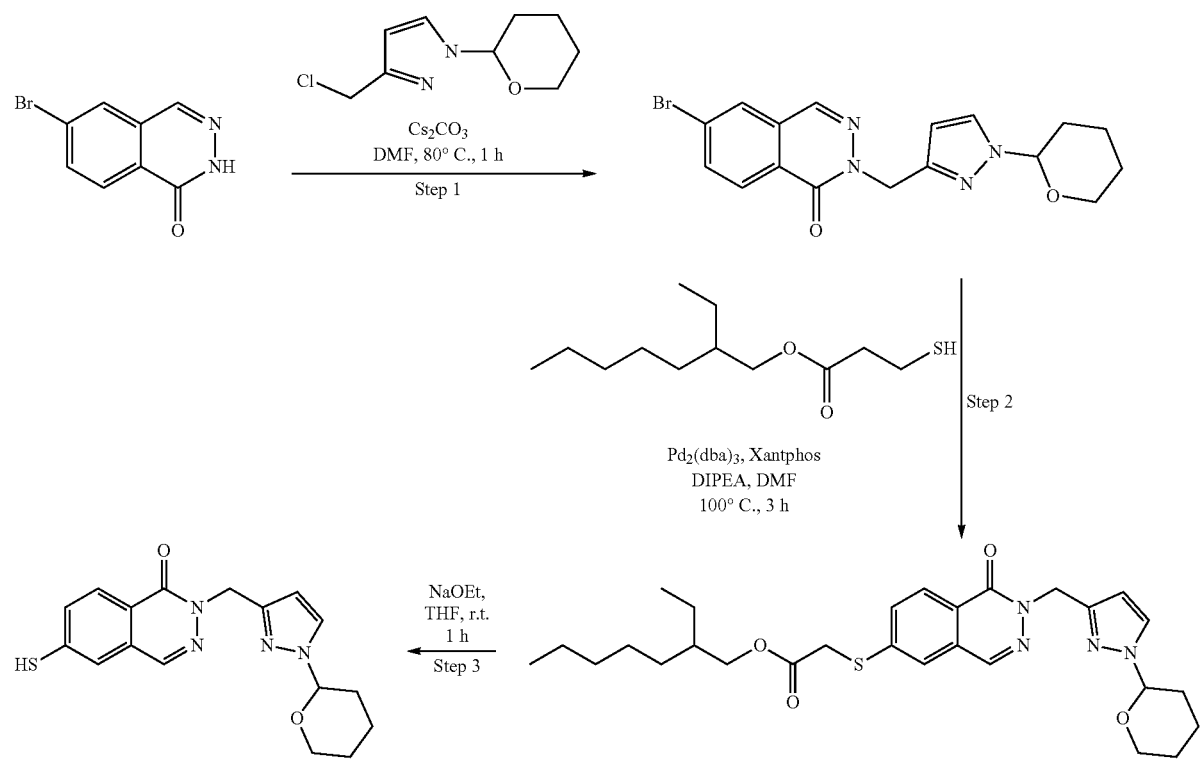

Step 1

A suspension of 6-bromophthalazin-1(2H)-one (2.117 g, 98% Wt, 1 Eq, 9.217 mmol) and cesium carbonate (6.006 g, 2.0 Eq, 18.43 mmol) in DMF (40 mL) was stirred at 80° C. for 1 h and then allowed to cool to RT. A solution of 3-(chloromethyl)-1-(tetrahydro-2H-pyran-2-yl)-1H-pyrazole (2.055 g, 9.217 mmol) in DMF (10 mL) was added and the reaction mixture was stirred at RT for 20 h. EtOAc (150 mL) was added and the reaction mixture was washed with water (100 mL). The organic layer was collected and the aqueous was extracted with EtOAc (3×100 mL). The combined organic extracts were washed with 50% brine (2×100 mL), brine (100 mL) and concentrated in vacuo to afford the crude product. The crude product was purified by chromatography on silica gel to afford 6-bromo-2-((1-(tetrahydro- 2H-pyran-2-yl)-1H-pyrazol-3-yl)methyl)phthalazin-1(2H)-one (Intermediate 6A, 2.192 g) as an off-white solid. MS (ES+): 389/391 (M+H)+.

Step 2

A solution of 6-bromo-2-((1-(tetrahydro-2H-pyran-2-yl)-1H-pyrazol-3-yl)methyl)phthalazin-1(2H)-one (1.47 g, 3.40 mmol) in DMF (30 mL) was sparged with N₂ for 5 minutes. DIPEA (879 mg, 1.18 mL, 2.00 Eq, 6.80 mmol), Xantphos (197 mg, 340 µmol), Pd₂(dba)₃ (156 mg, 170 µmol) and 2-ethylhexyl 3-mercaptopropanoate (852 mg, 3.90 mmol) were added sequentially and the reaction mixture was stirred at 100° C. for 90 min. 2-ethylhexyl 3-mercaptopropanoate (0.20 mL, 0.876 mmol) was added and stirred at 100° C. for 90 min. The reaction mixture was concentrated in vacuo and the residue was azeotroped with toluene (3 times) to afford the crude product. The crude product was purified by chromatography on silica gel to afford 2-ethylhexyl 3-((1-oxo-2-((1-(tetrahydro-2H-pyran-2-yl)-1H-pyrazol-3-yl)methyl)-1,2-dihydrophthalazin-6-yl)thio)propanoate (1.648 g) as a thick yellow oil. MS (ES+): 527 (M+H)+.

Step 3

A stirred solution of 2-ethylhexyl 3-((1-oxo-2-((1-(tetrahydro-2H-pyran-2-yl)-1H-pyrazol-3-yl)methyl)-1,2-dihydrophthalazin-6-yl)thio)propanoate (1.64 g, 2.77 mmol) in THF (25 mL) was treated with sodium ethoxide (2.13 g, 6.56 mmol) dropwise. The reaction mixture was stirred at room temperature for 1 h and then diluted with DCM (100 mL) and sat. aq. NH₄Cl (100 mL). The organic layer was collected and the aqueous was extracted with DCM (2×50 mL). The combined organic extracts were washed with 50% brine (50 mL), dried (phase separator) and concentrated in vacuo to afford the crude product. The crude product was purified by chromatography on silica gel to afford the title compound (715 mg) as a pale pink solid. ¹H NMR (400 MHz, DMSO-d6) δ 8.29 (s, 1H), 8.10 (d, J=8.4 Hz, 1H), 7.83-7.72 (m, 3H), 6.34 (s, 1H), 6.15 (d, J=2.4 Hz, 1H), 5.31 (dd, J=10.3, 2.4 Hz, 1H), 5.24 (s, 2H), 3.94-3.85 (m, 1H), 3.58 (ddd, J=11.5, 8.6, 6.3 Hz, 1H), 2.03 (tdd, J=12.5, 10.0, 3.6 Hz, 1H), 1.95-1.81 (m, 2H), 1.70-1.57 (m, 1H), 1.50 (tq, J=8.0, 3.9 Hz, 2H). MS (ES+): 343 (M+H)+.

Intermediate 7: 6-mercaptophthalazin-1(2H)-one

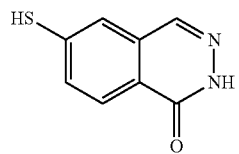 [SMILES: O=c1[nH]ncc2cc(S)ccc12]

A mixture of 6-bromophthalazin-1(2H)-one (0.60 g, 1 Eq, 2.7 mmol), 2-ethylhexyl 3-mercaptopropanoate (0.61 g, 0.64 mL, 1.05 Eq, 2.8 mmol), cesium carbonate (1.7 g, 2 Eq, 5.3 mmol), Xantphos (0.15 g, 0.1 Eq, 0.27 mmol), and Pd₂(dba)₃ (0.12 g, 0.05 Eq, 0.13 mmol) in DMF (12 mL) was heated to 100° C. for 12 h. After cooling to RT the reaction mixture was diluted with water (50 mL). then extracted with DCM (20 mL). The aqueous layer was acidified with 1 M HCl, then extracted with EtOAc (2×50 mL). The organic phase was collected, dried (MgSO₄) and evaporated under reduced pressure, giving the title compound (0.33 g) as a sticky orange solid.

MS (ES+): 179 (M+H)+.

Intermediate 8: 1-(2-((tert-butyldimethylsilyl)oxy)ethyl)-4-iodo-1H-pyrazole

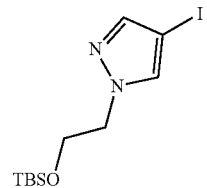 [SMILES: CC(C)(C)[Si](C)(C)OCCn1cc(I)cn1]

A mixture of 3-iodopyrazole (300 mg, 1 Eq, 1.55 mmol), (2-bromoethoxy)dimethyl-tert-butylsilane (407 mg, 366 µL, 1.1 Eq, 1.70 mmol) and potassium carbonate (321 mg, 1.5 Eq, 2.32 mmol) in MeCN (10.0 mL) was heated at 85° C. for 24 h. The reaction mixture was cooled to RT, diluted with DCM (10 mL) then filtered through celite with further wash with DCM (20 mL) and MeOH (10 mL). The residue (oil and solid) was partitioned between EtOAc (20 mL) and water (10 mL). The organic was washed with brine (10 mL×2), dried with MgSO₄ and concentrated under reduced pressure to afford crude product as a clear yellow liquid (536 mg) containing a mixture of regioisomers. The crude was dissolved in DCM (5 mL), concentrated onto silica and purified by chromatography to afford the title compound (108.5 mg) as a clear colourless oil. ¹H NMR (400 MHz, MeOD) δ 7.51 (d, J=2.3 Hz, 1H), 6.45 (d, J=2.3 Hz, 1H), 4.25 (t, J=5.1 Hz, 2H), 3.96 (t, J=5.1 Hz, 2H), 0.86 (s, 9H), −0.03 (s, 6H). MS (ES+): 353 (M+H)+.

Intermediate 9: 5-(chloromethyl)-2,3-dihydrofuro[3,2-b]pyridine

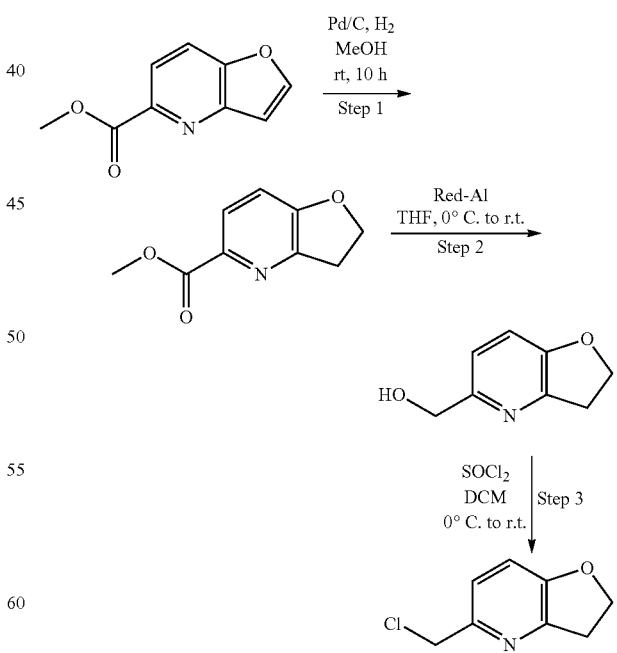

Step 1

To a solution of methyl furo[3,2-b]pyridine-5-carboxylate (800 mg, 4.52 mmol) was added 10% Pd/C (320 mg, containing 50% water) in MeOH (10 mL), The mixture was stirred at 25° C. for 10 h under H₂. After LCMS indicated the reaction is completed, the mixture was dried over Na₂SO₄, filtered, and concentrated at 30° C. under reduced pressure the residue was purified by flash column chromatography to give methyl 2,3-dihydrofuro[3,2-b]pyridine-5-carboxylate (750 mg) as a yellow solid. MS (ES⁺): 180.3 (M+H)⁺.

Step 2

To the solution of methyl 2,3-dihydrofuro[3,2-b]pyridine-5-carboxylate (750 mg, 4.19 mmol) in THF (10 mL) was add Red-Al (2.42 g, 8.38 mmol, 70 wt % in toluene) at 0° C., and the reaction mixture was stirred at RT for 2 h. After LCMS indicated the reaction is completed, the mixture was added NH₄Cl (1 mL). The mixture was quenched over Na₂SO₄, filtered and concentrated at 30° C. under reduced pressure the residue was purified by flash column chromatography to give (2,3-dihydrofuro[3,2-b]pyridin-5-yl) methanol (360 mg) as a yellow solid. MS (ES⁺): 152.4 (M+H)⁺.

Step 3

To the solution of (2,3-dihydrofuro[3,2-b]pyridin-5-yl) methanol (140 mg, 0.93 mmol) in DCM (5 mL) was added drop-wise SOCl₂ (221 mg, 1.86 mmol) at 0° C., and the reaction mixture was stirred at RT for 2 h. After LCMS indicated the reaction was complete, the mixture was concentrated at 30° C. under reduced pressure to remove DCM and SOCl₂ to give 5-(chloromethyl)-2,3-dihydrofuro[3,2-b] pyridine (150 mg) as a yellow oil, which was used to the next step directly. MS (ES⁺): 170.4 (M+H)⁺.

Intermediate 10: 1-methyl-1H-pyrazole-4-thiol

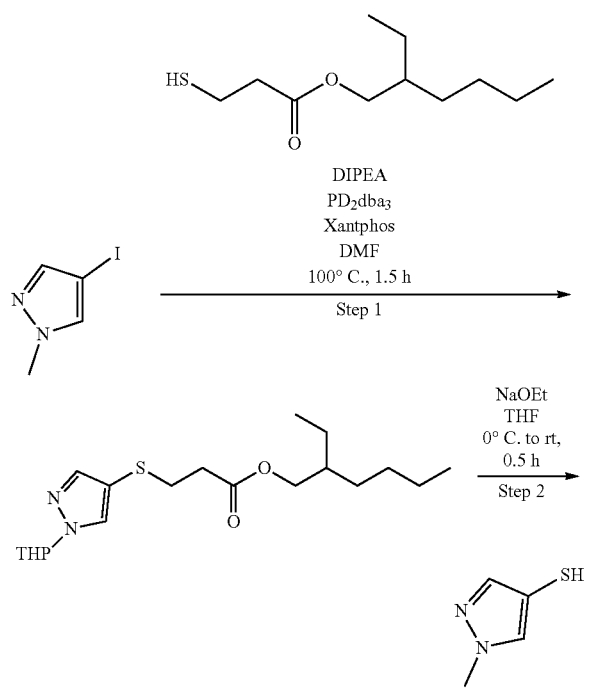

Step 1

A mixture of 4-iodo-1-methyl-1H-pyrazole (1.00 g, 1 Eq, 4.81 mmol), 2-ethylhexyl 3-mercaptopropanoate (1.05 g, 1.10 mL, 1 Eq, 4.81 mmol), DIPEA (684 mg, 921 µL, 1.1 Eq, 5.29 mmol), Pd₂dba₃ (220 mg, 0.05 Eq, 240 µmol) and Xantphos (278 mg, 0.1 Eq, 481 µmol) in DMF (25 mL) was stirred at 100° C. under nitrogen for 1.5 h, then allowed to cool to room temperature. Water and DCM were added, and the layers were separated. The organic layer was washed with water, brine, dried (MgSO₄) and absorbed on silica. The crude product was purified by chromatography on silica gel (40 g cartridge, 0-50% EtOAc/isohexane) to afford 2-ethylhexyl 3-((1-methyl-1Hpyrazol-4-yl)thio)propanoate (1.27 g, 4.1 mmol, 85%, 96% Purity) as a pale yellow oil. MS (ES⁺): 299 (M+H)⁺

Step 2

Sodium ethanolate (543 mg, 625 µL, 21% Wt, 2.5 Eq, 1.68 mmol) was added dropwise to a solution of 2-ethylhexyl 3-((1-methyl-1H-pyrazol-4-yl)thio)propanoate (200 mg, 1 Eq, 670 µmol) in THF (3.00 mL) at 0° C. under nitrogen and the mixture was allowed to warm to room temperature and stirred for 20 minutes. 1N HCl (1 mL) and DCM were added, and the layers separated through a phase separator. The organic layer was washed with brine, dried (MgSO₄) and concentrated under vacuum to afford the crude title product as a pale yellow oil. The product was used without further purification in the next step.

SYNTHESIS OF EXAMPLES

Example 1: 6-((1H-pyrazol-4-yl)sulfonyl)-2-((5-methoxypyridin-2-yl)methyl)phthalazin-1(2H)-one

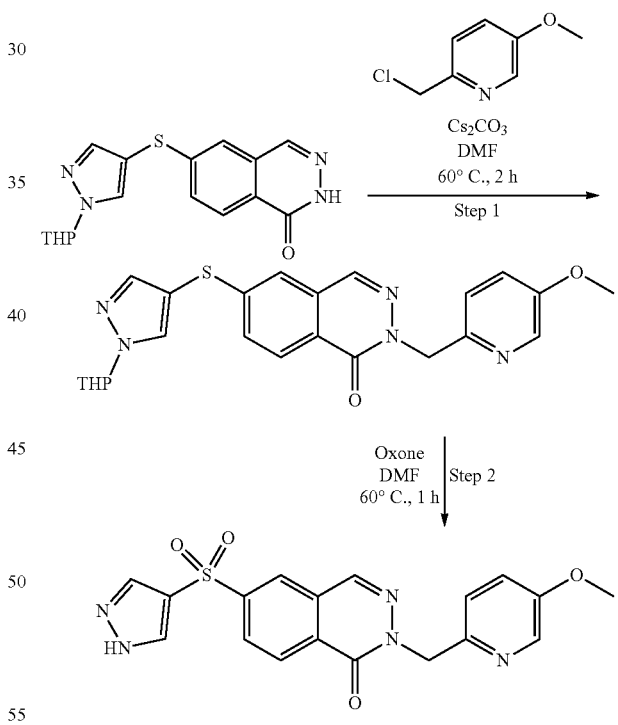

Step 1

A mixture of 6-((1-(tetrahydro-2H-pyran-2-yl)-1H-pyrazol-4-yl)thio)phthalazin-1(2H)-one (Intermediate 2, 75.0 mg, 1 Eq, 228 µmol) and cesium carbonate (223 mg, 3 Eq, 685 µmol) in DMF (1.50 mL) was stirred at 70° C. for 30 minutes. 2-(chloromethyl)-5-methoxypyridine hydrochloride (48.8 mg, 1.1 Eq, 25 µmol) was added and the mixture stirred at room temperature overnight. Water and DCM were added, and the layers separated through a phase separator. The organic layer was washed with brine, dried (MgSO₄) and concentrated under vacuum to afford crude 2-((5- methoxypyridin-2-yl)methyl)-6-((1-(tetrahydro-2H-pyran-2-yl)-1H-pyrazol-4-yl)thio)phthalazin-1(2H)-one.

The product was used without further purification in the next step. Quantitative yield was assumed.

Step 2

A mixture of 2-((5-methoxypyridin-2-yl)methyl)-6-((1-(tetrahydro-2H-pyran-2-yl)-1H-pyrazol-4-yl)thio)phthalazin-1(2H)-one and Oxone(309 mg, 2.2 Eq, 502 μmol) in DMF (1.50 mL) was stirred overnight. Sat. NaHCO$_3$ and DCM were added and the layers separated. The organic layer was washed with brine, dried (MgSO$_4$) and concentrated under vacuum to afford a crude mixture of 2-((5-methoxypyridin-2-yl)methyl)-6-((1-(tetrahydro-2H-pyran-2-yl)-1H-pyrazol-4-yl)sulfonyl)phthalazin-1(2H)-one and 6-((1H-pyrazol-4-yl)sulfonyl)-2-((5-methoxypyridin-2-yl)methyl)phthalazin-1(2H)-one. The mixture was dissolved in MeOH (1.5 mL) and hydrogen chloride (4N in dioxane) (41.6 mg, 285 μL, 4.00 molar, 5 Eq, 1.14 mmol) was added. The mixture was stirred for 1 h, then concentrated under vacuum. Sat. NaHCO$_3$, 2N NaOH and DCM were added, and the layers separated. The organic layer was washed with brine, then absorbed on silica.

The crude product was purified by chromatography on silica gel (4 g cartridge, 0-50% 10% (MeOH (0.7M NH$_3$):DCM)):DCM) to afford 6-((1H-pyrazol-4-yl)sulfonyl)-2-((5-methoxypyridin-2-yl)methyl)phthalazin-1(2H)-one (40.8 mg, 98% Purity) as a white solid. 1H NMR (DMSO) δ:13.91 (s, 1H), 8.64-8.59 (m, 2H), 8.57-7.96 (s (br), 2H), 8.43 (d, J=8.4 Hz, 1H), 8.31 (dd, J=8.4, 1.9 Hz, 1H), 8.16 (d, J=2.9 Hz, 1H), 7.33 (dd, J=8.6, 3.0 Hz, 1H), 7.24 (d, J=8.6 Hz, 1H), 5.38 (s, 2H), 3.78 (s, 3H). MS (ES+): 398 (M+H)+.

Example 2: 2-((1H-pyrazol-3-yl)methyl)-6-((1-(difluoromethyl)-1H-pyrazol-4-yl)sulfonyl)phthalazin-1(2H)-one

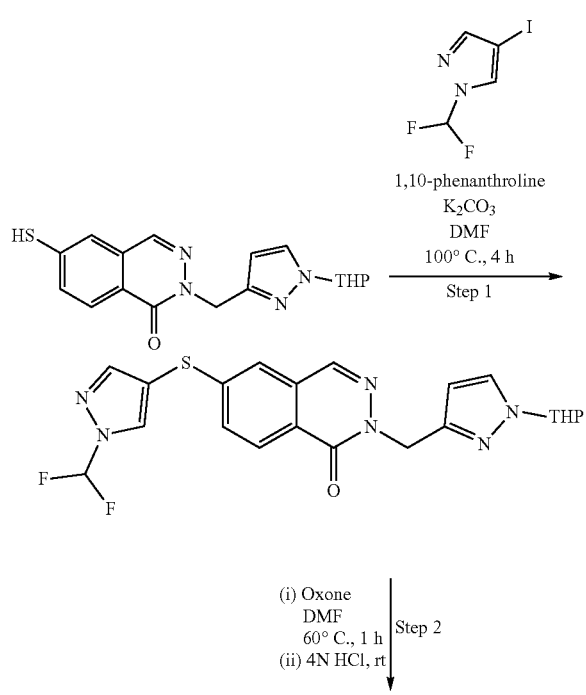

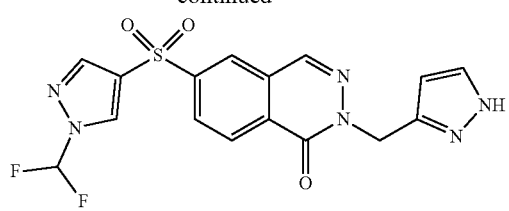

Step 1

Nitrogen was bubbled through a mixture of 6-mercapto-2-((1-(tetrahydro-2H-pyran-2-yl)-1H-pyrazol-3-yl)methyl)phthalazin-1(2H)-one (Intermediate 6, 150 mg, 91% Wt, 1 Eq, 399 μmol), 1-(difluoromethyl)-4-iodo-1H-pyrazole (126 mg, 1.3 Eq, 518 μmol), 1,10-phenanthroline (32.3 mg, 0.45 Eq, 179 μmol) and potassium carbonate (93.7 mg, 1.7 Eq, 678 μmol) in DMF (2.5 mL) for 5 minutes. copper(I) iodide (16.7 mg, 0.22 Eq, 87.7 μmol) was added and the mixture stirred under nitrogen at 100° C. for 4 h, then allowed to cool to room temperature. Water and EtOAc were added and the layers separated. The organic layer was washed with brine, then absorbed on silica. The crude product was purified by chromatography on silica gel (12 g cartridge, 0-100% EtOAc/isohexane) to afford 6-((1-(difluoromethyl)-1H-pyrazol-4-yl)thio)-2-((1-(tetrahydro-2H-pyran-2-yl)-1H-pyrazol-3-yl)methyl)phthalazin-1(2H)-one (165 mg, 0.36 mmol, 99% Purity) as a white solid. MS (ES+): 459 (M+H)+

Step 2

A mixture of 6-((1-(difluoromethyl)-1H-pyrazol-4-yl)thio)-2-((1-(tetrahydro-2H-pyran-2-yl)-1H-pyrazol-3-yl)methyl)phthalazin-1(2H)-one (165 mg, 99% Wt, 1 Eq, 356 μmol) and Oxone (482 mg, 2.2 Eq, 784 μmol) in DMF (1.5 mL) was stirred overnight. Sat. NaHCO$_3$ and DCM were added, and the layers separated through a phase separator. The organic layer was washed with brine, dried (MgSO$_4$) and concentrated under vacuum to afford crude mixture of 6-((1-methyl-1H-pyrazol-3-yl)sulfonyl)-2-((1-(tetrahydro-2H-pyran-2-yl)-1H-pyrazol-3 yl)methyl)phthalazin-1(2H)-one and 2-((1H-pyrazol-3-yl)methyl)-6-((1-(difluoromethyl)-1H-pyrazol-4-yl)sulfonyl)phthalazin-1(2H)-one. The mixture was dissolved in MeOH (1.5 mL) and hydrogen chloride (4N in dioxane) (64.9 mg, 445 μL, 4.00 molar, 5 Eq, 1.78 mmol) was added. The mixture was stirred for 1.5 h, then concentrated under vacuum. Sat. NaHCO$_3$, 2N NaOH and DCM were added, and the layers separated. The organic layer was washed with brine, then absorbed on silica. The crude product was purified by chromatography on silica gel (4 g cartridge, 0-50% 10% (MeOH (0.7M NH$_3$):DCM)):DCM) to afford the title compound (48.5 mg, 99% Purity) as a white solid. 1H NMR (DMSO) δ: 12.65 (s, 1H), 9.15 (s, 1H), 8.67 (d, J=1.8 Hz, 1H), 8.61 (s, 1H), 8.47 (d, J=8.5 Hz, 1H), 8.40 (s, 1H), 8.36 (dd, J=8.5, 1.9 Hz, 1H), 7.85 (t, J=58.3, 1H), 7.62 (s, 1H), 7.37 (s, 1H), 6.16-6.11 (m, 1H), 5.31 (s, 2H).

MS (ES+): 407 (M+H)+

Example 3: 2-((2,3-dihydrofuro[3,2-b]pyridin-5-yl)methyl)-6-((1-(2-hydroxyethyl)-1H-pyrazol-4-yl)sulfonyl)phthalazin-1(2H)-one

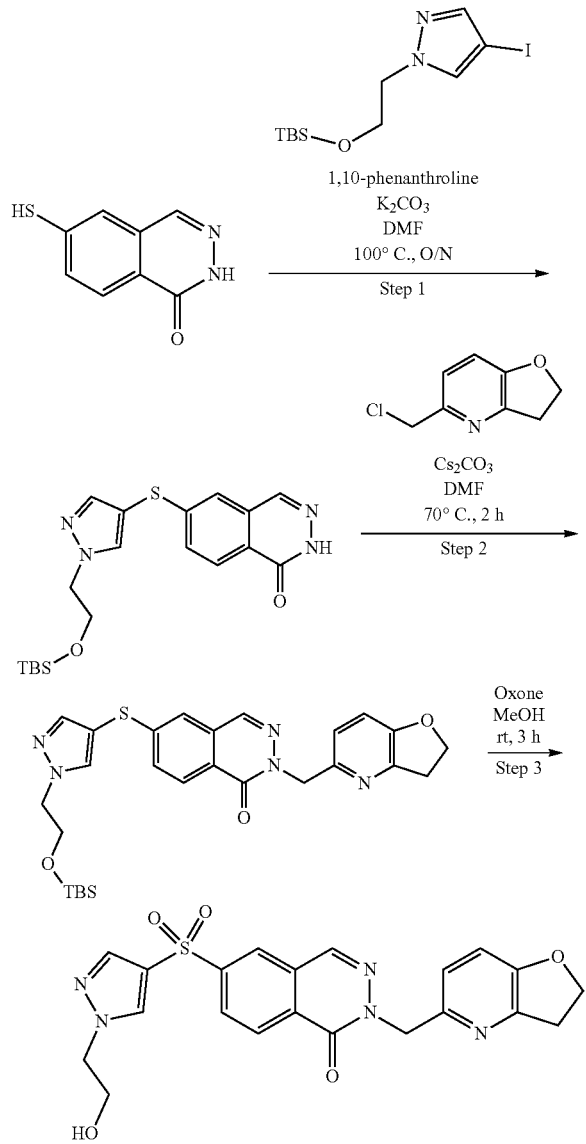

Step 1

A suspension of 6-mercaptophthalazin-1 (2H)-one (Intermediate 7, 235 mg, 92% Wt, 1 Eq, 1.21 mmol), 1-(2-((tert-butyldimethylsilyl)oxy)ethyl)-4-iodo-1H-pyrazole (Intermediate 8, 540 mg, 86% Wt, 1.09 Eq, 1.32 mmol), 1,10-phenanthroline (87.5 mg, 0.4 Eq, 485 µmol) and potassium carbonate (335 mg, 2 Eq, 2.43 mmol) in DMF (6.00 mL) was sparged with $N_2$ for 5-10 min before adding copper(I) iodide (46.2 mg, 0.2 Eq, 243 µmol) and further sparging with $N_2$ for 5-10 min. The reaction was stirred at 100° C. overnight then allowed to cool to rt. The reaction mixture was partitioned between DCM (20 mL) and water (10 mL). The organic was further washed with half concentrated brine (20 mL×2), filtered through a phase separator, and concentrated under reduced pressure to give a dark green crude oil (964 mg). The crude was dissolved in DCM (20 mL), concentrated onto silica and purified by chromatography on silica gel (24 g cartridge, 0-100% (3:1 EtOAc/EtOH)/isohexane) to afford 6-((1-(2-((tert-butyldimethylsilyl)oxy)ethyl)-1H-pyrazol-4-yl)thio)phthalazin-1(2H)-one (308.6 mg, 0.74 mmol, 97% Purity) as an off-white solid. MS (ES+): 403.1 (M+H)+. 1H NMR (400 MHz, DMSO) δ 12.59 (s, 1H), 8.19 (d, J=0.8 Hz, 1H), 8.13 (d, J=0.7 Hz, 1H), 8.05 (d, J=8.4 Hz, 1H), 7.75 (d, J=0.7 Hz, 1H), 7.53 (d, J=1.9 Hz, 1H), 7.46 (dd, J=8.5, 1.9 Hz, 1H), 4.28 (t, J=5.1 Hz, 2H), 3.95 (t, J=5.2 Hz, 2H), 0.78 (s, 9H), −0.06 (s, 6H).

Step 2

A suspension of 6-((1 tert-butydimethylsilyl)oxy)ethyl)-1H-pyrazol-4-yl)thio)phthalazin-1(2H)-one (164 mg, 97% Wt, 1.00 Eq, 395 µmol) and cesium carbonate (463 mg, 3.6 Eq, 1.42 mmol) in DMF (2.00 mL) was stirred at 70° C. for 45 min before adding a solution of 5-(chloromethyl)-2,3-dihydrofuro[3,2-b]pyridine, HOI (intermediate 9, 90.0 mg, 92% Wt, 1.02 Eq, 402 µmol) in DMF (1.80 nL). The reaction mixture was stirred at 50° C. for 5 h then left to stand at rt overnight. The reaction mixture was heated at 50° C. for another 5 h. The reaction mixture was precipitated with water (15 mL) and extracted with diluted in EtOAc (30 mL×3). The combined organics was washed with a half-concentrated brine (50 mL×3), dried with $Mg_2SO_4$, filtered, concentrated under reduced pressure to give a yellow oil (204 mg). The crude was dissolved in DOM (10 mL), concentrated onto silica and purified by chromatography on silica gel (12 g cartridge, 0-50% (3:1, EtOAc/EtOH)/isohexane) to afford 6-((1-(2-((tert-butyldimethylsilyl)oxy)ethyl)-1H-pyrazol-4-yl)thio)-2-((2,3-dihydrofuro[3,2-b]pyridin-5-yl)methyl)phthalazin-1(2H)-one (109.1 mg, 0.20 mmol, 97% Purity) as a yellow solid.

MS (ES+): 536.1 (M+H)+. 1H NMR (400 MHz, MeOD) δ 8.19 (s, 1H), 8.16 (d, J=8.6 Hz, 1H), 7.96 (s, 1H), 7.71 (s, 1H), 7.54 (dd, J=8.5, 1.9 Hz, 1H), 7.49 (d, J=1.8 Hz, 1H), 7.03 (s, 2H), 5.39 (s, 2H), 4.64 (t, J=8.9 Hz, 2H), 4.33 (t, J=5.0 Hz, 2H), 4.02 (t, J=5.0 Hz, 2H), 3.26 (t, J=8.9 Hz, 2H), 0.82 (s, 9H), −0.02 (s, 6H).

Step 3

To a solution of 6-((1-(2-((tert-butydimethylsilyl)oxy)ethyl)-1H-pyrazol-4-yl)thio)-2-((2,3-dihydrofuro[3,2-b]pyridin-5-yl)methyl)phthalazin-1(2H)-one (109 mg, 97% Wt, 1 Eq, 197 µmol) in MeOH (2.00 mL) was added Oxone (243 mg, 2.0 Eq, 395 µmol). The reaction was stirred at rt on before adding Oxone (24.3 mg, 0.2 Eq, 39.5 µmol) and stirring at rt for another 3 h. The reaction mixture was diluted with MeOH (15 mL) to give a white solid (359 mg). The crude was dissolved in DCM (20 mL) and MeOH (3 mL), concentrated onto silica and purified by chromatography on silica gel (12 g cartridge, 0-5% (0.7 M Ammonia/MeOH)/DCM) to afford 2-((2,3-dihydrofuro[3,2-b]pyridin-5-yl)methyl)-6-((1-(2-hydroxyethyl)-1H-pyrazol-4-yl)sulfonyl)phthalazin-1(2H)-one (41.4 mg, 89 µmol, 98% Purity) as a white solid. MS (ES+): 454.2 (M+H)+. 1H NMR (400 MHz, DMSO) δ 8.62 (d, J=2.5 Hz, 2H), 8.53 (s, 1H), 8.44 (d, J=8.5 Hz, 1H), 8.31 (dd, J=8.4, 1.8 Hz, 1H), 8.05 (d, J=0.7 Hz, 1H), 7.05 (d, J=8.3 Hz, 1H), 6.98 (d, J=8.3 Hz, 1H), 5.34 (s, 2H), 4.94 (s, 1H), 4.59 (t, J=8.8 Hz, 2H), 4.18 (t, J=5.3 Hz, 2H), 3.74-3.70 (m, 2H), 3.18 (t, J=8.8 Hz, 2H).

Example 4: 6-((1H-pyrazol-4-yl)sulfonyl)-2-((2,3-dihydropyrazolo[5,1-b]oxazol-6-yl)methyl)phthalazin-1(2H)-one

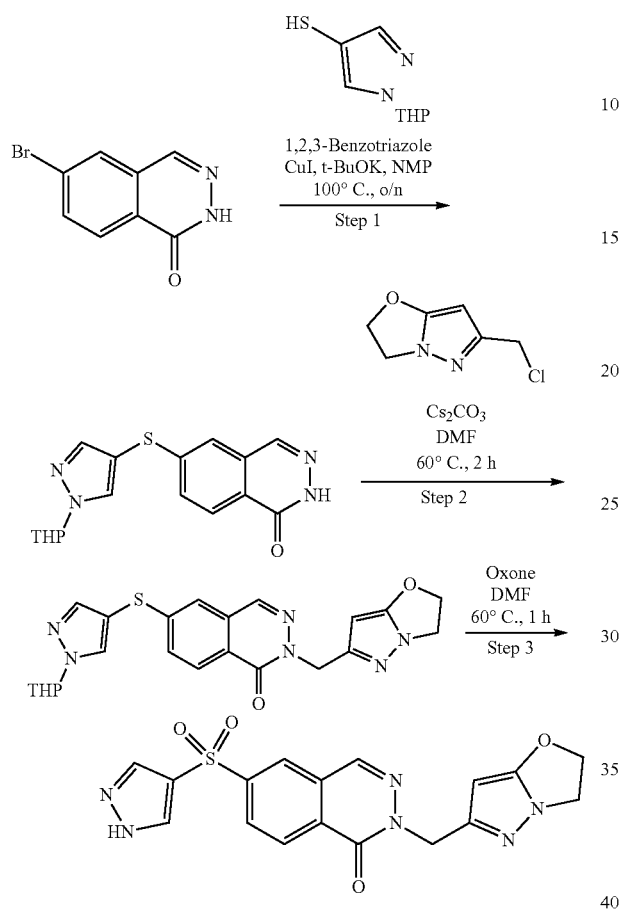

Step 1
A mixture of 1-(tetrahydro-2H-pyran-2-yl)-1H-pyrazole-4-thiol (Intermediate 3, 62 g, 337 mmol), 6-bromophthalazin-1(2H)-one (54 g, 241 mmol), CuI (6.4 g, 33.7 mmol) and 1,2,3-Benztriazole (8 g, 67.4 mmol) in NMP (2 L) was added t-BuOK (54 g, 482 mmol) at room temperature. The reaction was stirred at 100° C. overnight under nitrogen atmosphere. After LCMS indicated the reaction was completed, the reaction mixture was added to the water (10 L), stirred at room temperature for 3 hours and filtered. The residue was lyophilized to give 6-((1-(tetrahydro-2H-pyran-2-yl)-1H-pyrazol-4-yl)thio)phthalazin-1(2H)-one (75 g, 98% purity) as a yellow solid. MS (ES+): 329.1 (M+H)+.

Step 2
To the solution of 6-((1-(tetrahydro-2H-pyran-2-yl)-1H-pyrazol-4-yl)thio)phthalazin-1(2H)-one (328 mg, 1 mmol) and 6-(chloromethyl)-2,3-dihydropyrazolo[5,1-b]oxazole (Intermediate 1, 200 mg, 1.3 mmol) in DMF (10 mL) was added Cs2CO3 (652 mg, 2 mmol) at room temperature, and the reaction mixture was stirred at 60° C. for 16 hours. After LCMS indicated the reaction was completed, to the reaction mixture was added water (30 mL) and the organics extracted with EtOAc (20 mL×3). The combined organic layer was washed by NH4Cl aq, dried over Na2SO4, filtered and concentrated at 45° C. under reduced pressure. The residue was purified by flash column chromatography (12 g, dichloromethane/ethyl acetate=100:0~60:40) to give 2-((2,3-dihydropyrazolo[5,1-b]oxazol-6-yl)methyl)-6-((1-(tetrahydro-2H-pyran-2-yl)-1H-pyrazol-4-yl)thio)phthalazin-1(2H)-one (170 mg, 89.77% purity) as a yellow solid. MS (ES+): 451.1 (M+H)+.

Step 3
To the solution of 2-((2,3-dihydropyrazolo[5,1-b]oxazol-6-yl)methyl)-6-((1-(tetrahydro-2H-pyran-2-yl)-1H-pyrazol-4-yl)thio)phthalazin-1(2H)-one (170 mg, 0.38 mmol) in DMF (3 mL) was added OXONE (700 mg, 1.14 mmol) at room temperature. The reaction was stirred at 60° C. for 0.5 hours. After LCMS indicated the reaction was completed, to the reaction mixture was added water (10 ml). The mixture was extracted with EtOAc (10 mL×3). The organic layers were concentrated at 40° C. under reduced pressure. The residue was purified by prep-HPLC (Column: Waters X-Bridge C18 OBD 10 μm 19*250 mm; Flow Rate: 20 mL/min; solvent system: MeCN/(10 mmol/L NH4HCO3/water) gradient: MeCN: 38%-95%; collection wavelength: 214 nm). The relevant fractions were concentrated at 42° C. under reduced pressure to remove MeCN, and the residue was lyophilized to afford the title compound (27.87 mg, 100% purity) as a white solid.

MS (ES+): 399.2 (M+H)+. 1H NMR (400 MHz, DMSO-d6) δ: 13.91 (s, 1H), 8.60 (d, J=1.6 Hz, 1H), 8.59 (d, J=0.4 Hz, 1H), 8.44-8.29 (m, 4H), 5.31 (s, 1H), 5.16 (s, 2H), 4.99 (t, J=8.0 Hz, 2H), 4.17 (t, J=8.0 Hz, 2H). 1H NMR (400 MHz, DMSO-d6+TFA-D) δ: 8.60 (d, J=0.4 Hz, 1H), 8.59 (d, J=2.0 Hz, 1H), 8.43 (d, J=8.4 Hz, 1H), 8.34 (s, 2H), 8.30 (dd, J=8.4, 2.0 Hz, 1H), 5.31 (s, 1H), 5.16 (s, 2H), 4.99 (t, J=7.6 Hz, 2H), 4.17 (d, J=8.4 Hz, 2H).

Example 5: 2-((2,3-dihydropyrazolo[5,1-b]oxazol-6-yl)methyl)-6-((1-methyl-1H-pyrazol-4-yl)sulfonyl)phthalazin-1(2H)-one

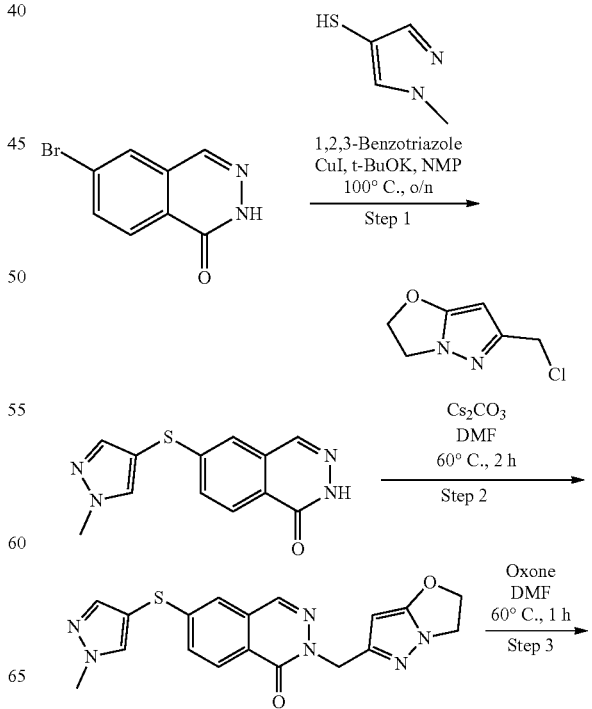

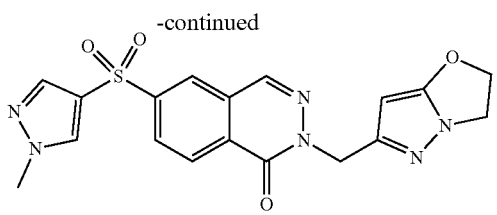

Step 1

A mixture of 1-methyl-1H-pyrazole-4-thiol (Intermediate 10, 27 g, 237 mmol), 6-bromophthalazin-1(2H)-one (38 g, 169 mmol), CuI (3.2 g, 16.9 mmol) and 1,2,3-Benztriazole (4 g, 33.8 mmol) in NMP (1 L) was added t-BuOK (38 g, 338 mmol) at room temperature. The reaction was stirred at 100° C. overnight under nitrogen atmosphere. After LCMS indicated the reaction was completed, the reaction mixture was added to the water (10 L), stirred at room temperature for 3 hours and then filtered. The residue was lyophilized to give 7-((1-methyl-1H-pyrazol-4-yl)thio)phthalazin-1(2H)-one (32.5 g, 100% purity) as a yellow solid. MS (ES$^+$): 259.1 (M+H)$^+$.

Step 2

To a solution of 7-((1-methyl-1H-pyrazol-4-yl)thio)phthalazin-1 (2H)-one (258 mg, 1 mmol) and 6-(chloromethyl)-2,3-dihydropyrazolo[5,1-b]oxazole (Intermediate 1, 200 mg, 1.3 mmol) in DMF (10 mL) was added $Cs_2CO_3$ (652 mg, 2 mmol) at room temperature, and the reaction mixture was stirred at 60° C. for 16 hours. After LCMS indicated the reaction is completed, the reaction mixture was added water (30 mL) and extracted with EtOAc (20 mL×3). The combined organic layer was washed by $NH_4Cl$ aq, dried over $Na_2SO_4$, filtered and concentrated at 45° C. under reduced pressure. The residue was purified by flash column chromatography (12 g, dichloromethane/ethyl acetate=100:0~60:40) to give 2-((2,3-dihydropyrazolo[5,1-b]oxazol-6-yl)methyl)-6-((1-methyl-1H-pyrazol-4-yl)thio)phthalazin-1 (2H)-one (140 mg, 89.77% purity) as a yellow solid. MS (ES$^+$): 381.1 (M+H)$^+$.

Step 3

To a mixture of 2-((2,3-dihydropyrazolo[5,1-b]oxazol-6-yl)methyl)-6-((1-methyl-1H-pyrazol-4-yl)thio)phthalazin-1 (2H)-one (140 mg, 0.37 mmol) in DMF (3 mL) was added OXONE (700 mg, 1.14 mmol) at room temperature. The reaction was stirred at 60° C. for 0.5 hours. After LCMS indicated the reaction was completed, to the reaction mixture was added water (10 ml). The mixture was then extracted with EtOAc (10 mL×3). The organic layers were concentrated at 40° C. under reduced pressure. The residue was purified by prep-HPLC (Column: Waters X-Bridge C18 OBD 10 μm 19*250 mm; Flow Rate: 20 mL/min; solvent system: MeCN/(10 mmol/L NH4HCO3/water) gradient: MeCN: 38%~95%; collection wavelength: 214 nm). The relevant fractions were concentrated at 42° C. under reduced pressure to remove MeCN, and the residue was lyophilized afford the title compound (44.63 mg, 100% purity) as a white solid. MS (ES+): 413.2 (M+H)+. 1H NMR (400 MHz, DMSO-d6) δ: 8.59 (s, 2H), 8.56 (s, 1H), 8.43 (d, J=8.4 Hz, 1H), 8.29 (dd, J=8.4, 2.0 Hz, 1H), 8.02 (d, J=0.8 Hz, 1H), 5.31 (s, 1H), 5.16 (s, 2H), 4.99 (t, J=7.8 Hz, 2H), 4.17 (t, J=8.0 Hz, 2H), 3.87 (s, 3H).

Example 6: 6-((1H-pyrazol-3-yl)sulfonyl)-2-((4-chloro-5-methyl-1H-pyrazol-3-yl)methyl)phthalazin-1(2H)-one

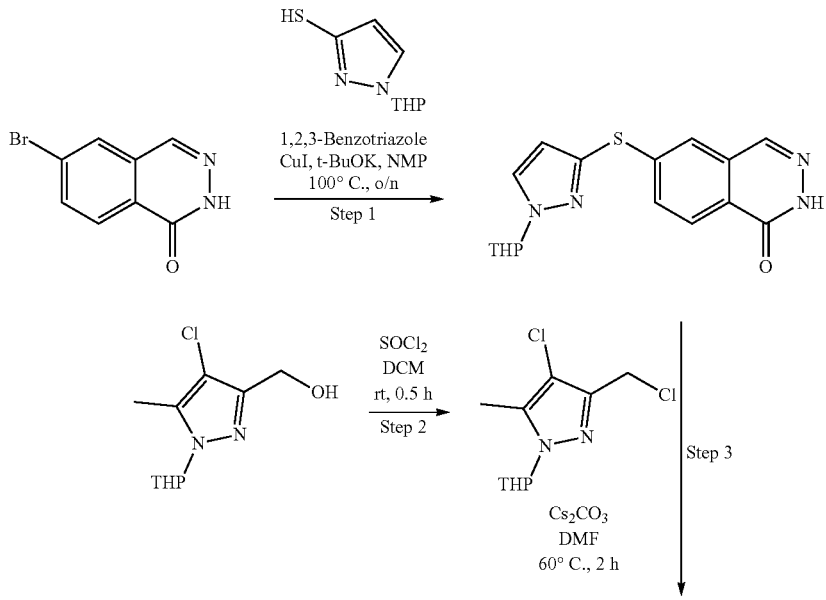

-continued

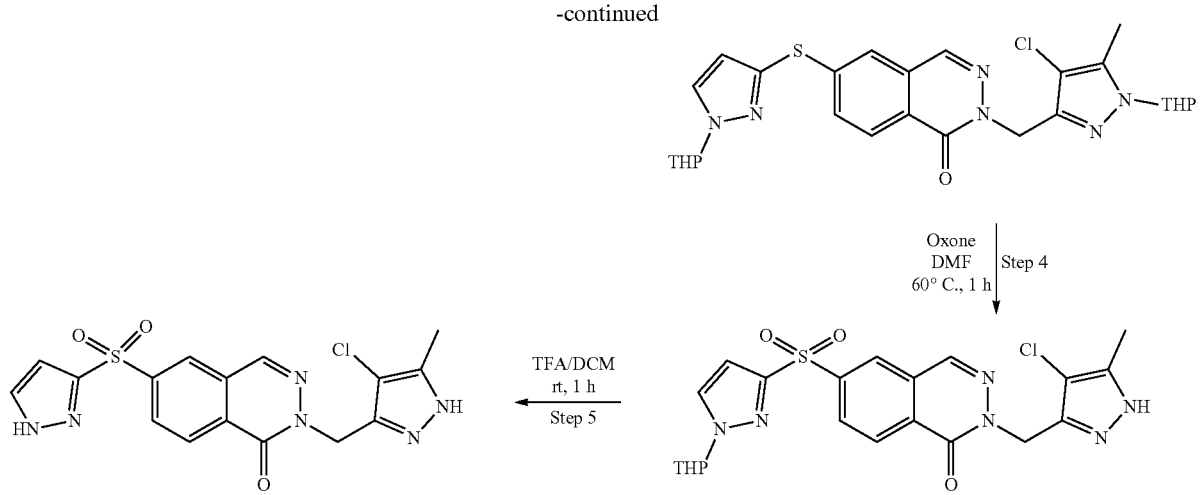

Step 1

A mixture of 1-(tetrahydro-2H-pyran-2-yl)-1H-pyrazole-3-thiol (Intermediate 4, 2.8 g, 15.2 mmol), 6-bromophthalazin-1(2H)-one (2.9 g, 12.9 mmol), CuI (246 mg, 1.29 mmol) and 1,2,3-Benztriazole (307 mg, 2.58 mmol) in DMF (30 mL) was added t-BuOK (3.4 g, 30.4 mmol) at room temperature. The reaction was stirred at 100° C. overnight under nitrogen atmosphere. After LCMS indicated the reaction is completed, the reaction mixture was added to the water (200 mL), the solid was filtered and dried to give 6-((1-(tetrahydro-2H-pyran-2-yl)-1H-pyrazol-3-yl)thio)phthalazin-1(2H)-one (2.4 g, 72.75% purity) as a yellow solid. MS (ES+): 329.1 (M+H)+.

Step 2

To a mixture of (4-chloro-5-methyl-1-(tetrahydro-2H-pyran-2-yl)-1H-pyrazol-3-yl)methanol (Intermediate 5, 230 mg, 1.0 mmol) in DCM (4 mL) was added $SOCl_2$ (178 mg, 1.5 mmol). The reaction mixture was stirred at room temperature for 30 minutes. After LCMS analysis indicated the reaction was completed, the mixture was concentrated to remove the excess $SOCl_2$ and DCM to afford 4-chloro-3-(chloromethyl)-5-methyl-1-(tetrahydro-2H-pyran-2-yl)-1H-pyrazole as a crude product. This was used in the next step without further purification.

Step 3

To the solution of the crude 4-chloro-3-(chloromethyl)-5-methyl-1-(tetrahydro-2H-pyran-2-yl)-1H-pyrazole in DMF (4 mL) was added $Cs_2CO_3$ (1.95 g, 6.0 mmol) and 6-((1-(tetrahydro-2H-pyran-2-yl)-1H-pyrazol-3-yl)thio)phthalazin-1(2H)-one (328 mg, 1.0 mmol) at room temperature, and the reaction mixture was stirred at room temperature overnight. After LCMS indicated the reaction was completed, the reaction mixture was diluted with water (15 mL) and extracted with EtOAc (50 mL×3). The combined organic layers were washed with saturated ammonium chloride solution (40 mL×2), dried over $Na_2SO_4$, filtered, and concentrated at 40° C. under reduced pressure. The residual solid was purified by flash column chromatography (12 g, petroleum ether/ethyl actate=100:00~60:30) to give 2-((4-chloro-5-methyl-1-(tetrahydro-2H-pyran-2-yl)-1H-pyrazol-3-yl)methyl)-6-((1-(tetrahydro-2H-pyran-2-yl)-1H-pyrazol-3-yl)thio)phthalazin-1(2H)-one (200 mg, 100% purity) as a yellow solid. MS (ES+): 541.2 (M+H)+.

Step 4

A solution of 2-((4-chloro-5-methyl-1-(tetrahydro-2H-pyran-2-yl)-1H-pyrazol-3-yl)methyl)-6-((1-(tetrahydro-2H-pyran-2-yl)-1H-pyrazol-3-yl)thio)phthalazin-1(2H)-one (200 mg, 0.37 mmol) in DMF (3 mL) was added OXONE (682 mg, 1.11 mmol) and stirred at 60° C. for 1 hour. After LCMS indicated the reaction was completed, the reaction mixture was diluted with water (5 mL), neutralized with $K_2CO_3$ and extracted with EtOAc (10 mL×4). The organic layers were washed with sat.aq.$NH_4Cl$ (100 mL×2), concentrated and purified by flash column chromatography (12 g, dichloromethane/methanol=100:00~95:5) to give 2-((4-chloro-5-methyl-1H-pyrazol-3-yl)methyl)-6-((1-(tetrahydro-2H-pyran-2-yl)-1H-pyrazol-3-yl)sulfonyl)phthalazin-1(2H)-one (180 mg, 81% purity) as white solid. MS (ES+): 489.2 (M+H)+.

Step 5

To a solution of 2-((4-chloro-5-methyl-1H-pyrazol-3-yl)methyl)-6-((1-(tetrahydro-2H-pyran-2-yl)-1H-pyrazol-3-yl)sulfonyl)phthalazin-1(2H)-one (180 mg, 0.37 mol) in DCM (1 mL) was added TFA (3 mL) and the mixture was stirred at room temperature for 1 hour. After LCMS indicated the reaction completed, the mixture was concentrated under reduced pressure. The residue was diluted with $H_2O$ (15 mL) and adjusted pH to 8 with $K_2CO_3$. Solid precipitated and the suspension was filtered. The filtered cake was purified by prep-HPLC (Column: Waters Xbridge Prep C18 OBD 10 μm 19*250 mm; Flow Rate: 20 mL/min; solvent system: MeCN/(10 mmol/L $NH_4HCO_3$/water) gradient: MeCN: 25%-95%; collection wavelength: 214 nm). The fractions were concentrated at 40° C. under reduced pressure to remove MeCN, and the residue was lyophilized to afford the title compound (24.64 mg, 100% purity) as white solid. MS (ES+): 405.2 (M+H)+. $^1$H NMR (400 MHz, DMSO-d6) δ: 13.98 (br, 1H), 12.79 (br, 1H), 8.62 (s, 2H), 8.46 (d, J=8.4 Hz, 1H), 8.29 (dd, J=8.4 Hz, 1.6 Hz, 1H), 8.03 (d, J=2.4 Hz, 1H), 6.96 (d, J=2.4 Hz, 1H), 5.28 (s, 2H), 2.14 (s, 3H).

Biological Example 1—Human PKM2 Activation Assay

Measuring In Vitro Activation of Recombinant Human PKM2

Compound activation of recombinant human PKM2 pyruvate kinase activity was determined by biochemical assay. N-terminal His-tagged hPKM2 was sourced from R&D Systems and its substrates phosphoenolpyruvate (PEP) and ADP from Sigma-Aldrich and 2Bscientific Ltd, respectively. The Kinase-Glo® Plus luminescence assay was from Promega. All other reagents were from Sigma-Aldrich. Test Compounds were prepared as 10 mM DMSO stocks and dilution series prepared in DMSO for direct dilution into Assay Buffer comprising 50 mM imidazole, 50 mM KCl, 7 mM $MgCl_2$, 0.01% Tween20, 0.05% BSA (pH 7.2).

Assay Procedure

Human PKM2 was diluted into Assay Buffer comprising 50 mM imidazole, 50 mM KCl, 7 mM $MgCl_2$, 0.01% Tween20, 0.05% BSA (pH 7.2) to a final concentration of 5 µM. Enzyme-Assay Buffer mix was dispensed into a 384-well shallow-well white-walled plate (PerkinElmer) and Test Compounds added by acoustic dispense (Echo®, Labcyte Inc.). Following 10 minutes' incubation at room temperature, the enzyme reaction was initiated by acoustic dispensing of ADP+PEP substrate to final concentrations of 254 µM ADP and 53 µM ADP.

After 60 minutes' incubation on an orbital shaker (300 rpm, 26° C.), enzyme activity was quantified by the luminescent detection of generated ATP. Kinase-Glo® Plus reagent was added to each well and the plates incubated for a further 15 minutes on an orbital shaker in the dark (300 rpm, 26° C.) before luminescence measurement on a plate reader (PHERAstar® FSX, BMG Labtech).

Percentage activation was calculated by normalising fluorescence signals to plate LOW (DMSO vehicle) and HIGH (5 µM TEPP-46) controls. $EC_{50}$ and $E_{max}$ values were determined from 4-parameter logistic fits of compound concentration-response curves.

The compounds of formula (Ia) were tested and the results are shown in Table 1 below.

TABLE 1

PKM2 $EC_{50}$ values (µM) and $E_{max}$ values (%)

| Compound | hPKM2 $EC_{50}$ (µM) | hPKM2 $E_{max}$ (%) |
|---|---|---|
| Mitapivat | 0.3208 | 55.05 |
| Example 1 | 0.114 | 111 |
| Example 2 | 0.104 | 100 |
| Example 3 | 0.0500 | 108 |
| Example 4 | 0.0510 | 91 |
| Example 5 | 0.0989 | 110 |
|  | 0.207* | 104* |
| Example 6 | 0.0430 | 94 |

*indicates data from repeat experiments

Examples 1 to 6 were tested in this assay and exhibited improved PKM2-modulatory activity compared with mitapivat, as demonstrated by their lower $EC_{50}$ and/or higher $E_{max}$ values for PKM2 activation.

Biological Example 2—Human PKLR Activation Assay

Measuring In Vitro Activation of Recombinant Human PKLR

Compound activation of recombinant human PKLR pyruvate kinase activity was determined by biochemical assay. N-terminal His-tagged enzyme was sourced from R&D Systems and its substrates phosphoenolpyruvate (PEP) and ADP from Sigma-Aldrich and 2Bscientific Ltd, respectively. The Kinase-Glo® Plus luminescence assay was from Promega. All other reagents were from Sigma-Aldrich. Test Compounds were prepared as 10 mM DMSO stocks and dilution series prepared in DMSO for direct dilution into Assay Buffer comprising 50 mM imidazole, 50 mM KCl, 7 mM $MgCl_2$, 0.01% Tween20, 0.05% BSA (pH 7.2).

Assay Procedure

Human PKLR was diluted into Assay Buffer to a final concentration of 5 µM. Enzyme-Assay Buffer mix was dispensed into 384-well shallow-well white-walled plates and Test Compounds added by acoustic dispense (Echo®, Labcyte Inc). Following 10 minutes' incubation at room temperature, the enzyme reaction was initiated by acoustic dispensing of ADP+PEP substrate to final concentrations of 254 µM ADP and 53 µM ADP.

After 60 minutes' incubation on an orbital shaker (300 rpm, 26° C.), enzyme activity was quantified by the luminescent detection of generated ATP. Kinase-Glo® Plus reagent was added to each well and the plates incubated for a further 15 minutes on an orbital shaker in the dark (300 rpm, 26° C.) before luminescence measurement on a plate reader (PHERAstar® FSX, BMG Labtech).

Percentage activation was calculated by normalising fluorescence signals to plate LOW (DMSO vehicle) and HIGH (5 µM TEPP-46) controls. $EC_{50}$ and $E_{max}$ values were determined from 4-parameter logistic fits of compound concentration-response curves.

A number of Example compounds of formula (Ia) were tested and the results are shown in Table 2 below.

TABLE 2

PKLR $EC_{50}$ values (µM) and $E_{max}$ values (%)

| Compound | hPKLR $EC_{50}$ (µM) | hPKLR $E_{max}$ (%) |
|---|---|---|
| Mitapivat | 0.0321 | 107.2 |
| Example 1 | 0.016 | 119 |
| Example 2 | 0.0331 | 123 |
| Example 3 | 0.0066 | 118 |
| Example 4 | 0.0064 | 122 |
| Example 5 | 0.0233 | 121 |
|  | 0.0276* | 128* |

*indicates data from repeat experiments

Examples 1 to 5 were tested in this assay and exhibited improved PKLR-modulatory activity compared with mitapivat, as demonstrated by their lower $EC_{50}$ and/or higher $E_{max}$ values for PKLR activation.

Biological Example 3—CD4+ T Cell Pyruvate Kinase Assay

Measuring Pyruvate Kinase (PK) Activity in Human CD4+ T Cell Lysates

PKM2 activators increase the pyruvate kinase activity of both recombinant human PKM2 protein and PKM2 in human cell lysates (Kung et al., 2012). Compound activation of pyruvate kinase in human CD4+ T cell lysates was determined by biochemical assay. Primary CD4+ T cells were used rather than cancer cell lines to improve the disease relevance of the assay. The PK assay was sourced from Abcam. All other reagents were sourced from ThermoFisher. Test compounds were prepared as 10 mM DMSO stocks and dilution series prepared in DMSO for addition to intact CD4+ T cells cultured in RPMI media containing 10% FBS.

Assay Procedure

Human CD4+ T cells were incubated with compound for 20 minutes and then washed twice in 1×PBS before resuspension in Abcam PK lysis buffer to prepare cell lysates. 10 µl PK assay Reaction Mix was added per well, including OXIRED™ PROBE. The plates were read using a BMG Labtech Pherastar plate reader at OD570 nm in kinetic mode for 48 minutes (25 cycles of 2 minutes) at 25° C., protecting from light.

Data Analysis

Plates were blank-subtracted and ΔAbsorbance calculated by subtracting the first plate read within the linear range from the plate read at the timepoint of interest. PK activity is expressed as ΔAbsorbance and plotted against log [Compound].

Examples 1 to 6 were tested and the results are shown in Table 3 below. Mitapivat was tested as a comparator compound.

TABLE 3

CD4+ T cell Pyruvate Kinase Activity

| Compound | PK activity $EC_{50}$ (μM) |
| --- | --- |
| Mitapivat | 0.311 |
| Example 1 | 0.097 |
| Example 2 | 0.168 |
| Example 3 | 0.070 |
| Example 4 | 0.125 |
| Example 5 | 0.093 |
| Example 6 | 0.094 |

Examples 1 to 6 were tested in this assay and exhibited improved pyruvate kinase activity, as demonstrated by its $EC_{50}$ value, compared with mitapivat.

REFERENCES

Abulizi et al. *Cell Metab.* 2020, 32(5):751-766.e11.
Alves-Filho et al. *Front Immunol.* 2016, 7(145), 1-7.
Barazzoni et al. *Eating and Weight Disorders—Studies on Anorexia, Bulimia and Obesity* 2018, 23, 149-157.
Bettaieb et al. *The Journal of Biological Chemistry* 2013, 288(24), 17360-17371.
Bianchi et al. *Haematologica* 2020, 105(9), 2218-2228.
Cangado et al., *Hematology, Transfusion and Cell Therapy,* 2018, 40 (1), 1-2.
Chhipa et al. *Life Sciences* 2018, 280, DOI: 10.1016/j.lfs.2021.119694.
Dong et al. *Oncol Lett.* 2016, 11(3), 1980-1986.
Grace et al. *N. Engl. J. Med.* 2019, 381(10), 933-944
Kung et al. *Chemistry & Biology* 2012, 19, 1187-1198
Kung et al. *Blood* 2017, 14; 130(11), 1347-1356.
Lewandowski et al. *Cell Metab.* 2020, 32(5):736-750.e5.
Liu et al. *J. Diabetes Investig.* 2020, 12(5):697-709.
Palsson-McDermott et al. *Cell Research* 2020, 30:300-314.
Puckett et al. *International Journal of Molecular Sciences* 2021, 22, 1171.
Qi et al. *Nat Med.* 2017, 23(6), 753-762
Yi et al. *Front. Immunol.* 2021, DOI: 10.3389/fimmu.2020.595316.

Miscellaneous

All references referred to in this application, including patent and patent applications, are incorporated herein by reference to the fullest extent possible.

Throughout the specification and the claims which follow, unless the context requires otherwise, the word 'comprise', and variations such as 'comprises' and 'comprising', will be understood to imply the inclusion of a stated integer, step, group of integers or group of steps but not to the exclusion of any other integer, step, group of integers or group of steps.

The application, of which this description and claims form part, may be used as a basis for priority in respect of any subsequent application. The claims of such subsequent application may be directed to any feature or combination of features described herein. They may take the form of product, composition, process, or use claims and may include, by way of example and without limitation, the following claims.

The invention claimed is:
1. A compound selected from the group consisting of:
(a) 6-((1H-pyrazol-4-yl)sulfonyl)-2-((5-methoxypyridin-2-yl)methyl)phthalazin-1 (2H)-one

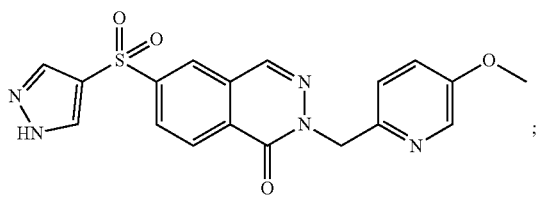 [SMILES: COc1ccc(Cn2ncc3cc(S(=O)(=O)c4cn[nH]c4)ccc3c2=O)nc1]

(b) 2-((1H-pyrazol-3-yl)methyl)-6-((1-(difluoromethyl)-1H-pyrazol-4-yl)sulfonyl)phthalazin-1 (2H)-one

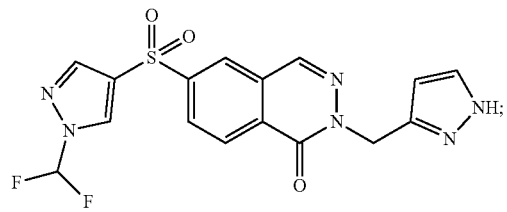

(c) 2-((2,3-dihydrofuro[3,2-b]pyridin-5-yl)methyl)-6-((1-(2-hydroxyethyl)-1H-pyrazol-4-yl)sulfonyl)phthalazin-1 (2H)-one

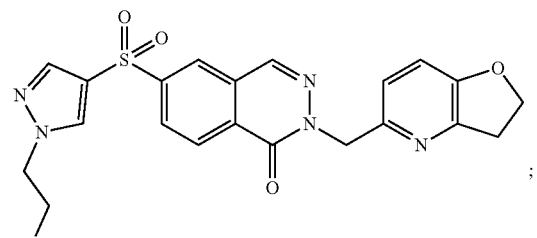

(d) 6-((1H-pyrazol-4-yl)sulfonyl)-2-((2,3-dihydropyrazolo[5,1-b]oxazol-6-yl)methyl)phthalazin-1 (2H)-one

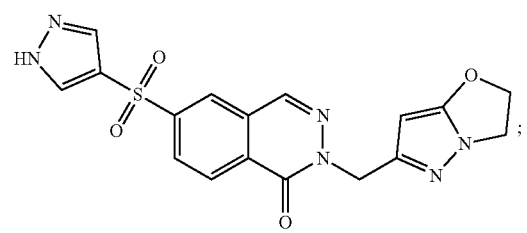 [SMILES: O=c1c2ccc(S(=O)(=O)c3cn[nH]c3)cc2cnn1Cc1cc2n(n1)CCO2]

(e) 2-((2,3-dihydropyrazolo[5,1-b]oxazol-6-yl)methyl)-6-((1-methyl-1H-pyrazol-4-yl)sulfonyl)phthalazin-1 (2H)-one

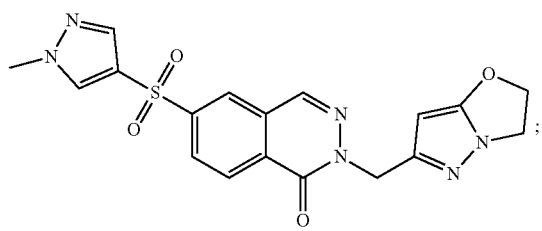 [SMILES: Cn1cc(S(=O)(=O)c2ccc3c(=O)n(Cc4cc5n(n4)CCO5)ncc3c2)cn1]

or (f) 6-((1H-pyrazol-3-yl)sulfonyl)-2-((4-chloro-5-methyl-1H-pyrazol-3-yl)methyl)phthalazin-1(2H)-one

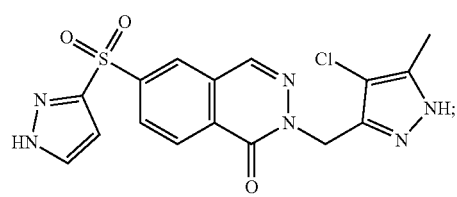

and a pharmaceutically acceptable salt and/or solvate thereof.

2. The compound or a pharmaceutically acceptable salt and/or solvate thereof according to claim 1 which is 6-((1H-pyrazol-4-yl)sulfonyl)-2-((5-methoxypyridin-2-yl)methyl)phthalazin-1 (2H)-one

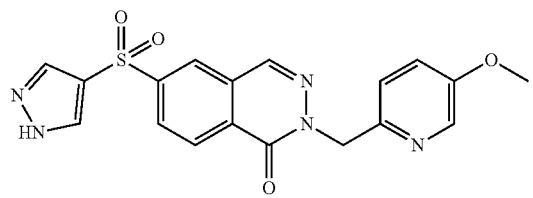

3. The compound or a pharmaceutically acceptable salt and/or solvate thereof according to claim 1 which is a pharmaceutically acceptable salt of 6-((1H-pyrazol-4-yl)sulfonyl)-2-((5-methoxypyridin-2-yl)methyl)phthalazin-1 (2H)-one

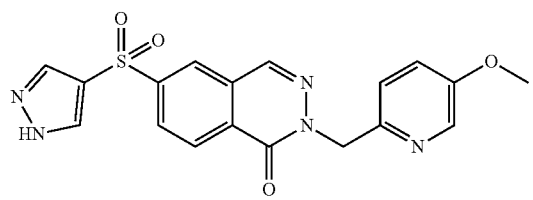

4. The compound or a pharmaceutically acceptable salt and/or solvate thereof according to claim 1 which is 2-((1H-pyrazol-3-yl)methyl)-6-((1-(difluoromethyl)-1H-pyrazol-4-yl)sulfonyl)phthalazin-1 (2H)-one

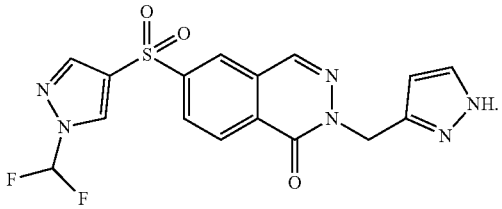

5. The compound or a pharmaceutically acceptable salt and/or solvate thereof according to claim 1 which is a pharmaceutically acceptable salt of 2-((1H-pyrazol-3-yl)methyl)-6-((1-(difluoromethyl)-1H-pyrazol-4-yl)sulfonyl)phthalazin-1(2H)-one

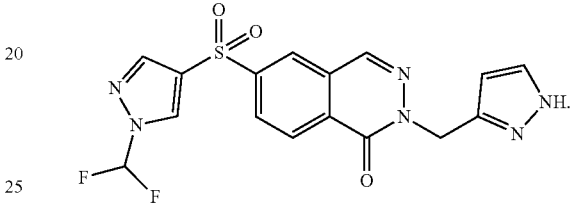

6. The compound or a pharmaceutically acceptable salt and/or solvate thereof according to claim 1 which is 2-((2,3-dihydrofuro[3,2-b]pyridin-5-yl)methyl)-6-((1-(2-hydroxyethyl)-1H-pyrazol-4-yl)sulfonyl)phthalazin-1 (2H)-one

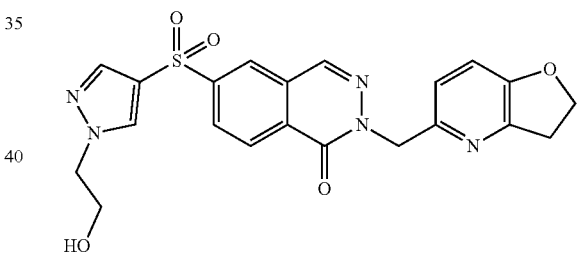

7. The compound or a pharmaceutically acceptable salt and/or solvate thereof according to claim 1 which is a pharmaceutically acceptable salt of 2-((2,3-dihydrofuro[3,2-b]pyridin-5-yl)methyl)-6-((1-(2-hydroxyethyl)-1H-pyrazol-4-yl)sulfonyl)phthalazin-1 (2H)-one

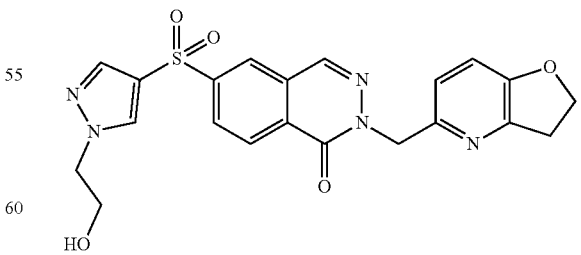

8. The compound or a pharmaceutically acceptable salt and/or solvate thereof according to claim 1 which is 6-((1H-pyrazol-4-yl)sulfonyl)-2-((2,3-dihydropyrazolo[5,1-b]oxazol-6-yl)methyl)phthalazin-1 (2H)-one

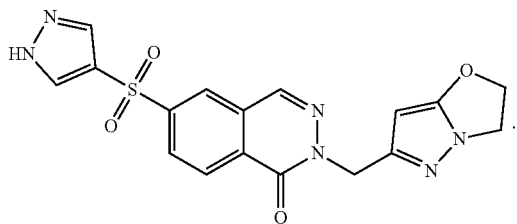 [SMILES: O=c1c2ccc(S(=O)(=O)c3cn[nH]c3)cc2cnn1Cc1cc2n(n1)CCO2]

9. The compound or a pharmaceutically acceptable salt and/or solvate thereof according to claim 1 which is a pharmaceutically acceptable salt of 6-((1H-pyrazol-4-yl)sulfonyl)-2-((2,3-dihydropyrazolo[5,1-b]oxazol-6-yl)methyl)phthalazin-1 (2H)-one

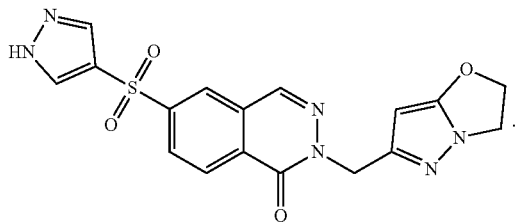 [SMILES: O=c1c2ccc(S(=O)(=O)c3cn[nH]c3)cc2cnn1Cc1cc2n(n1)CCO2]

10. The compound or a pharmaceutically acceptable salt and/or solvate thereof according to claim 1 which is 2-((2,3-dihydropyrazolo[5,1-b]oxazol-6-yl)methyl)-6-((1-methyl-1H-pyrazol-4-yl)sulfonyl)phthalazin-1 (2H)-one

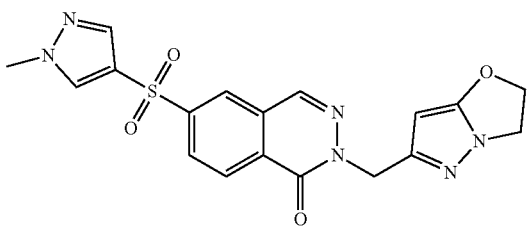

11. The compound or a pharmaceutically acceptable salt and/or solvate thereof according to claim 1 which is a pharmaceutically acceptable salt of 2-((2,3-dihydropyrazolo[5,1-b]oxazol-6-yl)methyl)-6-((1-methyl-1H-pyrazol-4-yl)sulfonyl)phthalazin-1 (2H)-one

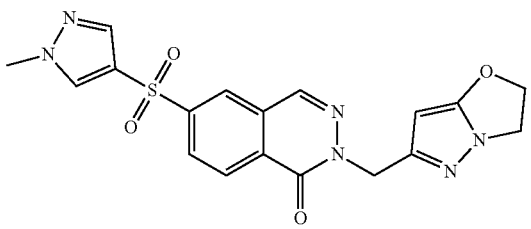

12. The compound or a pharmaceutically acceptable salt and/or solvate thereof according to claim 1 which is 6-((1H-pyrazol-3-yl)sulfonyl)-2-((4-chloro-5-methyl-1H-pyrazol-3-yl)methyl)phthalazin-1 (2H)-one

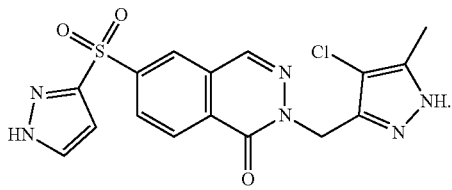 [SMILES: Cc1[nH]nc(Cn2ncc3cc(S(=O)(=O)c4cc[nH]n4)ccc3c2=O)c1Cl]

13. The compound or a pharmaceutically acceptable salt and/or solvate thereof according to claim 1 which is a pharmaceutically acceptable salt of 6-((1H-pyrazol-3-yl)sulfonyl)-2-((4-chloro-5-methyl-1H-pyrazol-3-yl)methyl)phthalazin-1 (2H)-one

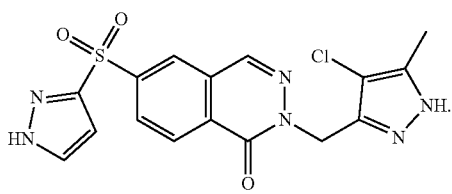 [SMILES: Cc1[nH]nc(Cn2ncc3cc(S(=O)(=O)c4cc[nH]n4)ccc3c2=O)c1Cl]

14. A pharmaceutical composition comprising the compound or a pharmaceutically acceptable salt and/or solvate thereof according to claim 1, and one or more pharmaceutically acceptable diluents or carriers.

15. The pharmaceutical composition according to claim 14, wherein the compound or pharmaceutically acceptable salt and/or solvate thereof is 6-((1H-pyrazol-4-yl)sulfonyl)-2-((5-methoxypyridin-2-yl)methyl)phthalazin-1 (2H)-one

16. The pharmaceutical composition according to claim 14, wherein the compound or pharmaceutically acceptable salt and/or solvate thereof is a pharmaceutically acceptable salt of 6-((1H-pyrazol-4-yl)sulfonyl)-2-((5-methoxypyridin-2-yl)methyl)phthalazin-1 (2H)-one

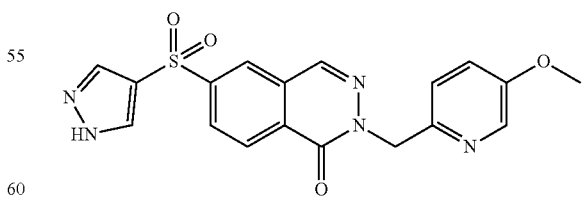

17. The pharmaceutical composition according to claim 14, wherein the compound or pharmaceutically acceptable salt and/or solvate thereof is 2-((1H-pyrazol-3-yl)methyl)-6-((1-(difluoromethyl)-1H-pyrazol-4-yl)sulfonyl)phthalazin-1 (2H)-one

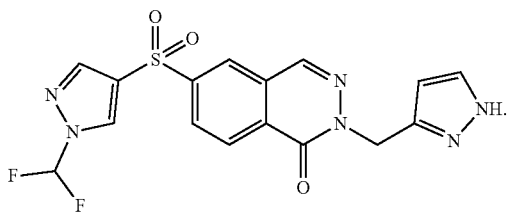

18. The pharmaceutical composition according to claim 14, wherein the compound or pharmaceutically acceptable salt and/or solvate thereof is a pharmaceutically acceptable salt of 2-((1H-pyrazol-3-yl)methyl)-6-((1-(difluoromethyl)-1H-pyrazol-4-yl)sulfonyl)phthalazin-1 (2H)-one 19. The pharmaceutical composition according to claim 14, wherein the compound or pharmaceutically acceptable salt and/or solvate thereof is 2-((2,3-dihydrofuro[3,2-b]pyridin-5-yl)methyl)-6-((1-(2-hydroxyethyl)-1H-pyrazol-4-yl)sulfonyl)phthalazin-1 (2H)-one 20. The pharmaceutical composition according to claim 14, wherein the compound or pharmaceutically acceptable salt and/or solvate thereof is a pharmaceutically acceptable salt of 2-((2,3-dihydrofuro[3,2-b]pyridin-5-yl)methyl)-6-((1-(2-hydroxyethyl)-1H-pyrazol-4-yl)sulfonyl)phthalazin-1 (2H)-one 21. The pharmaceutical composition according to claim 14, wherein the compound or pharmaceutically acceptable salt and/or solvate thereof is 6-((1H-pyrazol-4-yl)sulfonyl)-2-((2,3-dihydropyrazolo[5,1-b]oxazol-6-yl)methyl)phthalazin-1 (2H)-one

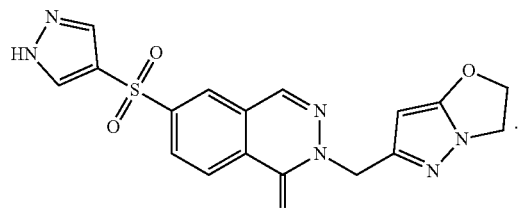

22. The pharmaceutical composition according to claim 14, wherein the compound or pharmaceutically acceptable salt and/or solvate thereof is a pharmaceutically acceptable salt of 6-((1H-pyrazol-4-yl)sulfonyl)-2-((2,3-dihydropyrazolo[5,1-b]oxazol-6-yl)methyl)phthalazin-1 (2H)-one 23. The pharmaceutical composition according to claim 14, wherein the compound or pharmaceutically acceptable salt and/or solvate thereof is 2-((2,3-dihydropyrazolo[5,1-b]oxazol-6-yl)methyl)-6-((1-methyl-1H-pyrazol-4-yl)sulfonyl)phthalazin-1(2H)-one 24. The pharmaceutical composition according to claim 14, wherein the compound or pharmaceutically acceptable salt and/or solvate thereof is a pharmaceutically acceptable salt of 2-((2,3-dihydropyrazolo[5,1-b]oxazol-6-yl)methyl)-6-((1-methyl-1H-pyrazol-4-yl)sulfonyl)phthalazin-1 (2H)-one 25. The pharmaceutical composition according to claim 14, wherein the compound or pharmaceutically acceptable salt and/or solvate thereof is 6-((1H-pyrazol-3-yl)sulfonyl)-2-((4-chloro-5-methyl-1H-pyrazol-3-yl)methyl)phthalazin-1 (2H)-one

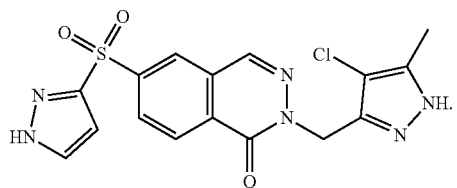 [SMILES: Cc1[nH]nc(Cn2ncc3cc(S(=O)(=O)c4cc[nH]n4)ccc3c2=O)c1Cl]
26. The pharmaceutical composition according to claim 14, wherein the compound or pharmaceutically acceptable salt and/or solvate thereof is a pharmaceutically acceptable salt of 6-((1H-pyrazol-3-yl)sulfonyl)-2-((4-chloro-5-methyl-1H-pyrazol-3-yl)methyl)phthalazin-1 (2H)-one
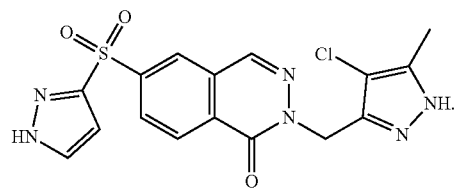 [SMILES: Cc1[nH]nc(Cn2ncc3cc(S(=O)(=O)c4cc[nH]n4)ccc3c2=O)c1Cl]
* * * * *